(12) United States Patent
English et al.

(10) Patent No.: US 11,467,327 B2
(45) Date of Patent: Oct. 11, 2022

(54) BEAM STEERING DEVICE USING LIQUID CRYSTAL POLARIZATION GRATINGS

(71) Applicant: Analog Devices International Unlimited Company, Limerick (IE)

(72) Inventors: Eoin E. English, Pallasgreen (IE); Andrew William Sparks, Arlington, MA (US); Scott Robert Davis, Denver, CO (US); Tyler Adam Dunn, North Reading, MA (US); Maurizio Zecchini, San Jose, CA (US); Michael Ziemkiewicz, Boulder, CO (US); Ronald A. Kapusta, Carlisle, MA (US); Javier Calpe Maravilla, Valencia (ES); Paul O'Sullivan, San Jose, CA (US); Jonathan Ephraim David Hurwitz, Edinburgh (GB); Erik D. Barnes, Cambridge, MA (US); Monica Redon Segrera, Valencia (ES); Krystian Balicki, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 49 days.

(21) Appl. No.: 16/792,757

(22) Filed: Feb. 17, 2020

(65) Prior Publication Data
US 2020/0271841 A1  Aug. 27, 2020

Related U.S. Application Data

(60) Provisional application No. 62/809,408, filed on Feb. 22, 2019, provisional application No. 62/814,552, (Continued)

(51) Int. Cl.
*G02B 5/30* (2006.01)
*G02F 1/1337* (2006.01)

(52) U.S. Cl.
CPC ......... *G02B 5/3016* (2013.01); *G02B 5/3083* (2013.01); *G02F 1/1337* (2013.01); *G02F 1/133757* (2021.01)

(58) Field of Classification Search
CPC ... G02B 5/3016; G02B 5/3083; G02F 1/1337; G02F 1/133757; G02F 1/29; G02F 1/292
See application file for complete search history.

(56) References Cited

U.S. PATENT DOCUMENTS

| | | | |
|---|---|---|---|
| 9,897,892 B2 | 2/2018 | Auxier et al. | |
| 2017/0109865 A1* | 4/2017 | Kim | G02B 3/0006 |
| 2021/0041712 A1* | 2/2021 | Bilik | H04N 5/23238 |

* cited by examiner

*Primary Examiner* — Edward J Glick
*Assistant Examiner* — David Y Chung
(74) *Attorney, Agent, or Firm* — Schwegman Lundberg & Woessner, P.A.

(57) ABSTRACT

The present disclosure provides numerous applications for the use of liquid crystal polarization gratings (LCPGs) to controllably steer light. When combined with an image sensor, light generated or reflected from different fields of view (FOV) can be steered, allowing an increase in the FOV or the resolution of the image. Further, the LCPG can stabilize the resulting image, counteracting any movement of the image sensor. The combination of LCPGs and liquid crystal waveguides (LCWGs) allows fine deflection control of light (from the LCWG) over a wild field of view (from the LCPG). Further applications of LCPGs include object tracking and the production of depth images using multiple imaging units and independently steered LCPGs. The LCPG may be used in controlling both the projection and reception of light.

20 Claims, 69 Drawing Sheets

Related U.S. Application Data filed on Mar. 6, 2019, provisional application No. 62/814,579, filed on Mar. 6, 2019, provisional application No. 62/824,655, filed on Mar. 27, 2019, provisional application No. 62/825,383, filed on Mar. 28, 2019, provisional application No. 62/924,350, filed on Oct. 22, 2019.

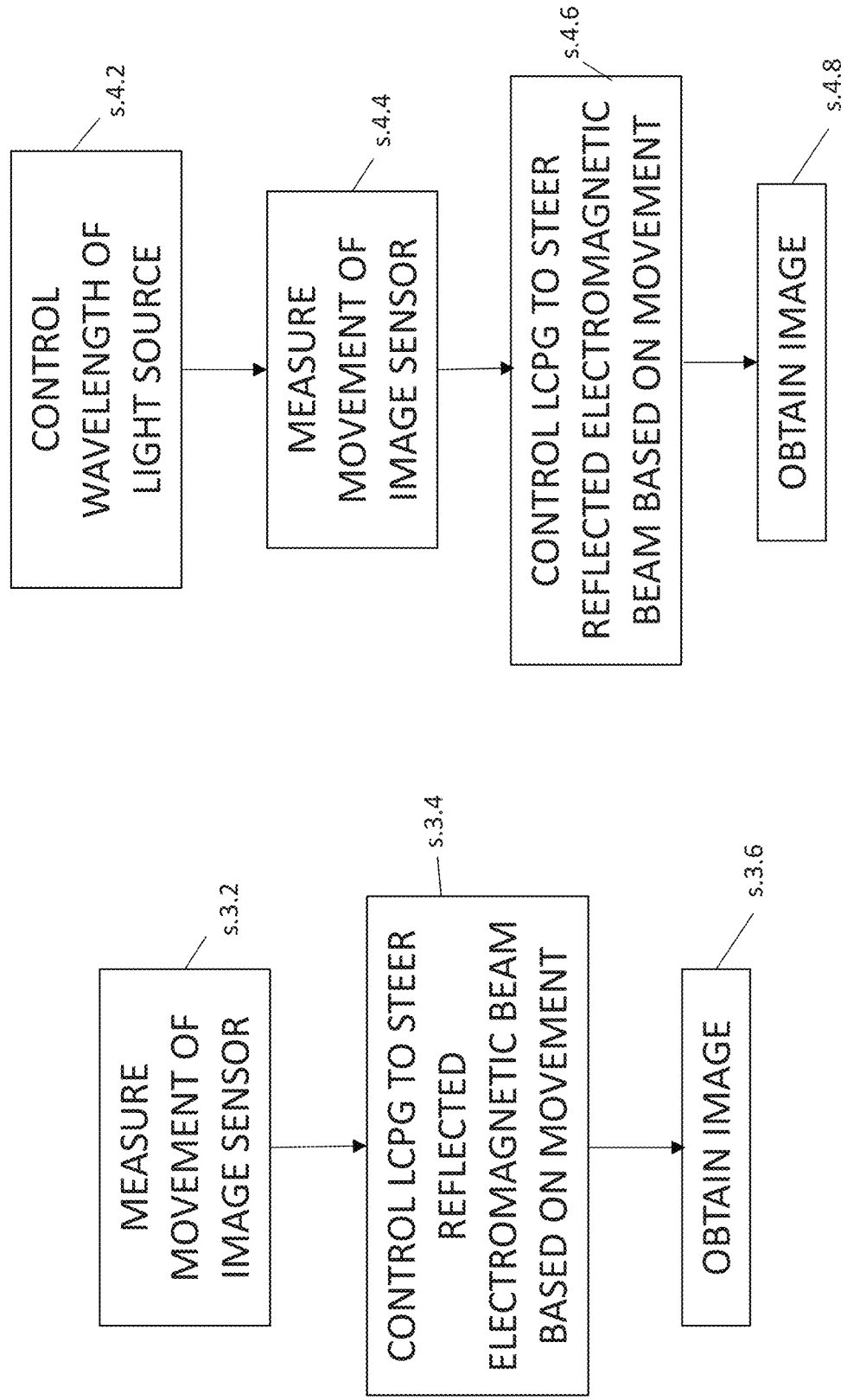

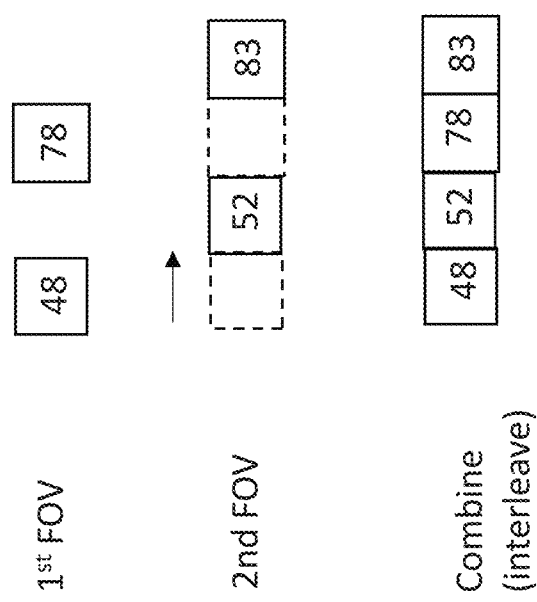

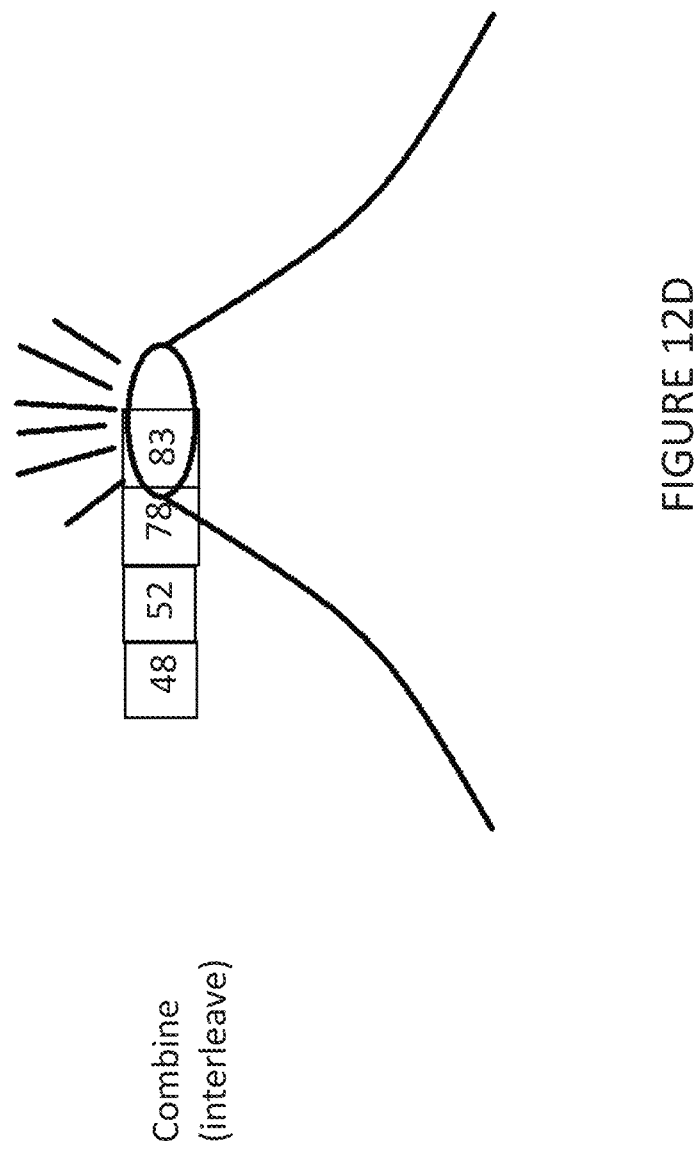

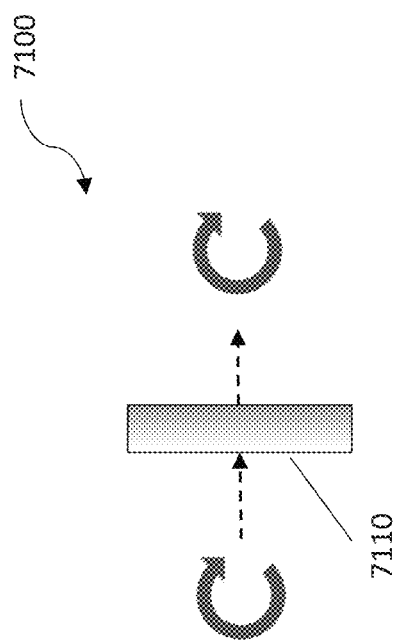
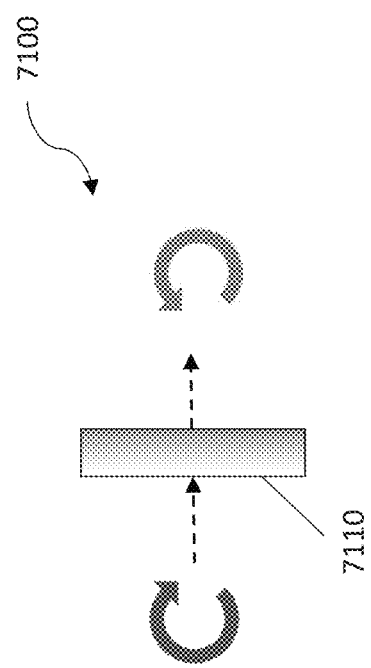
FIGURE 39A
FIGURE 39B

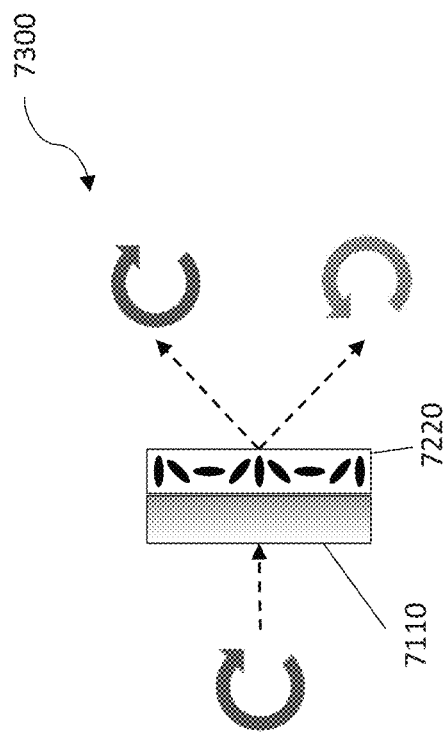
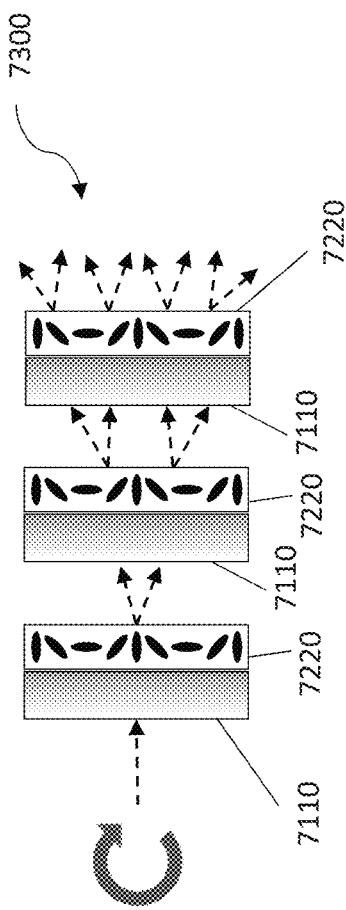
FIGURE 41A
FIGURE 41B

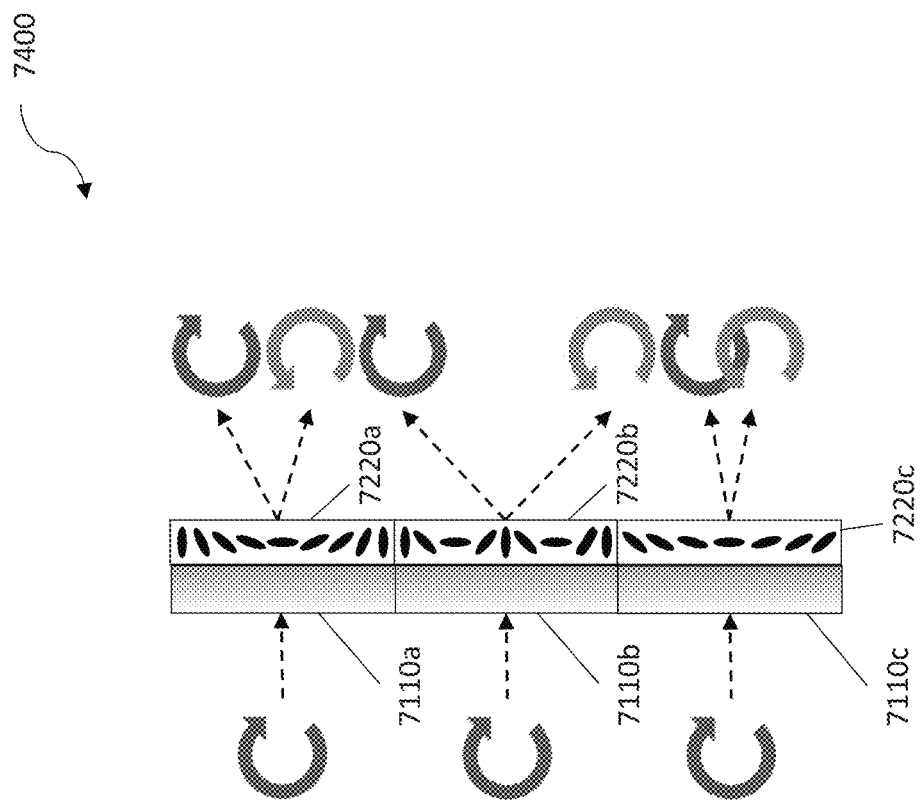

BEAM STEERING DEVICE USING LIQUID CRYSTAL POLARIZATION GRATINGS

CLAIM OF PRIORITY

This U.S. Non-Provisional Application claims the benefit of priority to U.S. Provisional Applications, 62/809,408, filed Feb. 22, 2019, 62/814,552, filed Mar. 6, 2019, 62/814,579, filed Mar. 6, 2019, 62/824,655, filed Mar. 27, 2019, 62/825,383, filed Mar. 28, 2019 and 62/924,350 filed Oct. 22, 2019, which are hereby incorporated by reference in their entirety.

FIELD OF THE DISCLOSURE

The present disclosure relates to various different methods and apparatus which use a Liquid Crystal Polarization Grating (LCPG) to steer light in a controllable fashion for various different applications, as outlined in the various aspects described herein.

BACKGROUND

Liquid Crystal Polarization Gratings (LCPGs) provide for non-mechanical beam steering of light beams. By stacking multiple such gratings together then greater steering angles can be achieved. Similarly, two-dimensional beam steering is obtained by stacking the gratings orthogonally. LCPGs are described in more detail in U.S. Pat. No. 8,982,313. Liquid Crystal Waveguides (LCWGs) are also known, and provide an alternative beam steering technology. US2017091536 describes a multiple target tracker and beam steerer that utilizes a liquid crystal waveguide (LCWG) beam steerer to designate multiple tracked targets per frame time one target at a time.

SUMMARY OF DISCLOSURE

Various aspects of the present disclosure are described below, that relate to different uses and applications of a Liquid Crystal Polarization Grating (LCPG) to steer light in a controllable fashion for various different purposes.

First Aspect of the Disclosure: Image Stabilization Using Liquid Crystal Polarization Grating A first aspect of the present disclosure provides an imaging system for imaging a target object, which makes the use of one or more liquid crystal polarization gratings (LCPGs) to counteract against any movement of the image sensor and thereby stabilize the resulting image. Within each capture cycle, the image sensor may experience small movements away from its central position, for example, due to shaking of the image apparatus. Consequently, incoming light reflected from or generated by an object can hit different parts of the image sensor such that each sensing position, pixel or the like on the sensor is receiving light corresponding to multiple parts of the object, resulting in blurred images. To counteract against the movement by the sensor, the LCPG is capable of steering adjustments to adjust the angle of the incoming light to ensure that the light received from each part of the object during each capture cycle hits the same sensing position on the sensor. In doing so, each sensing position will only receive light from the same part of the object, thereby producing a stabilized and clear image that is unaffected by the image sensor's movement.

Examples of the first aspect of the present disclosure also provide an imaging system whereby the LCPGs to steer light generated by or reflected from different points of an object or scene to the same pixel on an image sensor sequentially. This way, multiple fields of view (FOV) of the same object or scene can be read by the image sensor at different times as intermediate images. At the same time, the LCPGs are further steered to counteract against any movement of the image sensor and thereby stabilize the intermediate images. The imaging system can then multiplex the intermediate images together into a combined overall image that is stabilized and has a resolution that is greater than the resolution of any of the intermediate images. Improved resolution can be achieved especially when the one or more LCPGs cause deflection of incoming light onto the image sensor by significantly less than a pitch of the pixels of the image sensor.

Examples of the first aspect of the present disclosure provide an imaging system that further includes an illumination source for illuminating the object. The wavelength of the illumination source may also be controlled to further provide fine beam steering adjustments, in addition to the coarse beam steering applied by the LCPGs.

It will be appreciated that the term "scene" may be used interchangeably with the term "object". It will be further appreciated that the terms "light", "illumination" and "electromagnetic beam" may all be used interchangeably.

Second Aspect of the Disclosure: Image Sensor Using Liquid Crystal Polarization Grating A second aspect of the present disclosure provides an imaging device comprising an image sensor having improved resolution by using one or more liquid crystal polarization gratings (LCPGs) to steer light generated by or reflected from different points of an object or scene towards the same pixel on an image sensor sequentially. This way, multiple fields of view (FOV) of the same object or scene can be read by the image sensor at different times as intermediate images. Then, the imaging device can multiplex the intermediate images together into a combined overall image that has a resolution that is greater than the resolution of any of the intermediate images. Improved resolution can be achieved especially when the one or more LCPGs cause deflection of incoming light onto the image sensor by less than a pitch of the pixels of the image sensor. Effectively, some examples of the disclosure trade time diversity in permitting the capture of multiple different images with slightly different FOVs for an increase in spatial resolution.

Examples of the second aspect of the present disclosure provide an imaging device that further includes an illumination source for illuminating the object. Light from the illumination source can also be steered by one or more LCPGs such that a part of the object is illuminated by the illumination source. The LCPGs steers the light such that it is directed to a different part of the scene other than the non-deflected part of the scene. Improved resolution can be achieved especially when the one or more LCPGs cause deflection of outgoing light from the illumination source onto a part of the scene such that the light that is received by the image sensor shifts by a distance of less than a pitch of the pixels of the image sensor.

It will be appreciated that the term "scene" may be used interchangeably with the term "object". It will be further appreciated that the terms "light", "illumination" and "electromagnetic beam" may all be used interchangeably.

Third Aspect of the Disclosure: Image Sensor Using Liquid Crystal Polarization Grating A third aspect of the present disclosure provides an imaging device comprising an image sensor having improved resolution by using one or more liquid crystal polarization gratings (LCPGs) to steer light generated by or reflected from different fields of view (FOV). It can be determined which of these FOVs contains a region-of-interest (ROI) and then a higher resolution imaging technique can be applied to that FOV.

An image sensor has a native FOV and a native resolution. In the third aspect of the present disclosure, the native FOV is widened using one or more LCPGs for the purpose of identifying a ROI and/or improving resolution at that ROI.

In some examples of the third aspect of the present disclosure, the one or more LCPGs can also steer light from an object or scene in the FOV having the ROI to an image sensor sequentially in order to improve its resolution for the ROI. This way, multiple FOVs of the same object or scene containing the ROI can be read by the image sensor at different times as intermediate images. Then, the imaging device can multiplex the intermediate images together into a combined overall image that has a resolution that is greater than the resolution of any of the intermediate images. Improved resolution can be achieved especially when the one or more LCPGs cause deflection of incoming light onto the image sensor by less than a pitch of the pixels of the image sensor. Effectively, some examples of the third aspect of the present disclosure trade frame rate for an increase in spatial resolution in oversampling an image by permitting the capture of multiple different images with slightly different FOVs, each containing the ROI.

Alternatively or in addition to trading frame rate for an increase in spatial resolution, another approach is to use an image sensor to monitor a scene for a ROI and only imaging with higher resolution when a ROI is identified. This approach can be taken with or without scanning a scene using the one or more LCPGs across a wider FOV than the native FOV of the image sensor.

It will be appreciated that the term "scene" may be used interchangeably with the term "object". It will be further appreciated that the terms "light", "illumination" and "electromagnetic beam" may all be used interchangeably.

Fourth Aspect of the Disclosure: Adaptive Convergence Using Liquid Crystal Polarization Grating A fourth aspect of the present disclosure provides an imaging apparatus for producing depth images of an scene. The fourth aspect of the present disclosure makes use of a pair of imaging units, each imaging unit comprising a liquid crystal polarization grating (LCPG) to steer a sensing light beam towards an object within a region of interest within the scene. By appropriately controlling the steering angles of each LCPG, the imaging unit can produce depth images by combining the different fields of view (FOV).

Fifth Aspect of the Disclosure: Wearable Computer Glasses, Heads-Up Vehicle Display and an Image Projector Therefor The fifth aspect of the present disclosure provides an image projection device for use with a wearable computer eyeglasses and a heads-up vehicle display. The image projection device makes use of a liquid crystal waveguide (LCWG) and a liquid crystal polarization grating (LCPG) to display a projected image on an optical combiner, with the ability to reposition the image projected on to the optical combiner. The LCWG is capable of fine beam steering adjustments, but over a narrow field of view, whereas the LCPG is capable of wide angle beam steering adjustments (especially in multiple grating stacked configurations), but with relatively coarse control with respect to an LCWG. By combining the two components in series combination, fine deflection control can be obtained (from the LCWG) over a wide field of view (obtained from the LCPG). The wearable computer eyeglasses example uses an eye tracker to provide repositioning of the projected image as a user moves their eye. The heads-up vehicle display example allows the vertical position of the projected image on a vehicle windshield to be adjusted to accommodate the height of different drivers.

Sixth Aspect of the Disclosure: Liquid Crystal Polarization Grating Based Object Tracking A sixth aspect of the present disclosure provides a beam steering apparatus for object tracking purposes that makes use of one or more LCPGs to provide imaging of the object and the environment in which it is situated. In this respect, by using an imaging array comprising an LCPG, an object tracking device which is generally static relative to the object can be used to concurrently track motion of portions of the object relative to other portions and track motion of the object as a whole relative to the environment.

Seventh Aspect of the Disclosure: Beam Steering Device Using Liquid Crystal Polarization Gratings A seventh aspect of the present disclosure provides a beam steering device that makes use of a combination of switchable Half Wave Plates (sHWPs) and polarization gratings (PGs) to accurately steer one or more light beams passing through the beam steering device across a wide range of steering angles. In the seventh aspect of the present disclosure, both the sHWPs and the PGs make use of Liquid Crystals (LCs) to change the properties of a light beam passing through them (such as changing the polarization type, polarization angle and beam angle). By making use of the ability of LCs to be accurately and arbitrarily aligned across a surface, a beam steering device can be provided which is formed of one or more sHWPs provided in a single layer and multiple aligned PGs. This beam steering device provides improved control of the light beam passing through the beam steering device.

Such a beam steering device will be of use in many applications, particularly in LIDARs, and automotive sensors.

Eighth Aspect of the Disclosure: Beam Scanner Using Liquid Crystal Polarization Grating The eighth aspect of the present disclosure provides a hybrid beam steering apparatus for scanning or target designation purposes, that makes use of a series combination of one or more liquid crystal waveguides (LCWGs) and one or more liquid crystal polarization gratings (LCPGs) to provide accurate spot beam placement over a wide field of view (FOV). In this respect, the LCWG is capable of fine beam steering adjustments, but over a narrow field of view, whereas an LCPG is capable of wide angle beam steering adjustments (especially in multiple grating stacked configurations), but with relatively coarse control with respect to a LCWG. By combining the two components in series combination then fine beam control can be obtained (from the LCWG) over a wide field of view (obtained from the LCPG). Such a hybrid beam steering apparatus will be of use in many scanning applications, particular in LIDARs, and automotive sensors.

Further features, examples, and advantages of all aspects of the present disclosure will be apparent from the following description and from the appended examples.

BRIEF DESCRIPTION OF THE DRAWINGS

Examples of the present disclosure will now be described with reference to the accompanying drawings, wherein like reference numerals refer to like parts within the respective aspect of the disclosure, and wherein:

FIG. 3 is a flow illustrating the operation of the imaging system of the first example of the first aspect of the present disclosure;

FIG. 4 is a flow illustrating the operation of the imaging system of the second example of the first aspect of the present disclosure;

FIGS. 12A to 12D illustrate details of how an output is obtained in other examples of the first, second and third aspects of the present disclosure;

FIGS. 39A and 39B are schematic representations of a switchable half wave plate related to the seventh aspect of the present disclosure;

FIG. 41A is a schematic representations of a beam steering device comprising a switchable half wave plate and a polarization grating related to the seventh aspect of the present disclosure;

FIG. 41B is a schematic representations of a beam steering device comprising a stack of three switchable half wave plates and three polarization gratings related to the seventh aspect of the present disclosure;

FIG. 42 is a schematic representations of a beam steering device in accordance with a first example of the seventh aspect of the present disclosure;

DETAILED DESCRIPTION

Liquid Crystal Polarization Gratings are relatively recently developed optical components that are able to steer a light beam in a controllable fashion over a relatively wide steering angle. These properties lead to several different possible applications of the component, as detailed in the various different aspects of the disclosure described below.

First Aspect of the Disclosure: Image Stabilization Using Liquid Crystal Polarization Grating The image quality obtained using imaging devices such as depth sensing imagers, infrared sensors, time of flight sensors and other image capture devices can be compromised by the fact that the image sensor can experience movements away from its central position, for example, due to shaking of the apparatus. Consequently, within each capture cycle, that is, the time interval over which an image or a frame is captured, incoming light reflected from an object can hit different parts of the image sensor such that each sensing position, pixel or the like on the image sensor is receiving light corresponding to multiple parts of the object, thus resulting in blurred images.

Examples of the present disclosure provide an improved imaging system that makes use of the beam steering capabilities of one or more liquid crystal polarization gratings (LCPGs) to counteract any movement by the image sensor by steering the light reflected from or generated by the object before it is received at the image sensor. When two LCPGs are stacked in the same orientation, wide angle 1-dimensional beam steering capabilities can be achieved. When two LCPGs are stacked orthogonally, 2-dimensional beam steering capabilities can be achieved. By stacking multiple LCPGs in the same orientation and orthogonally, wide angle 2-dimensional beam steering capabilities can be achieved.

Figure 1:
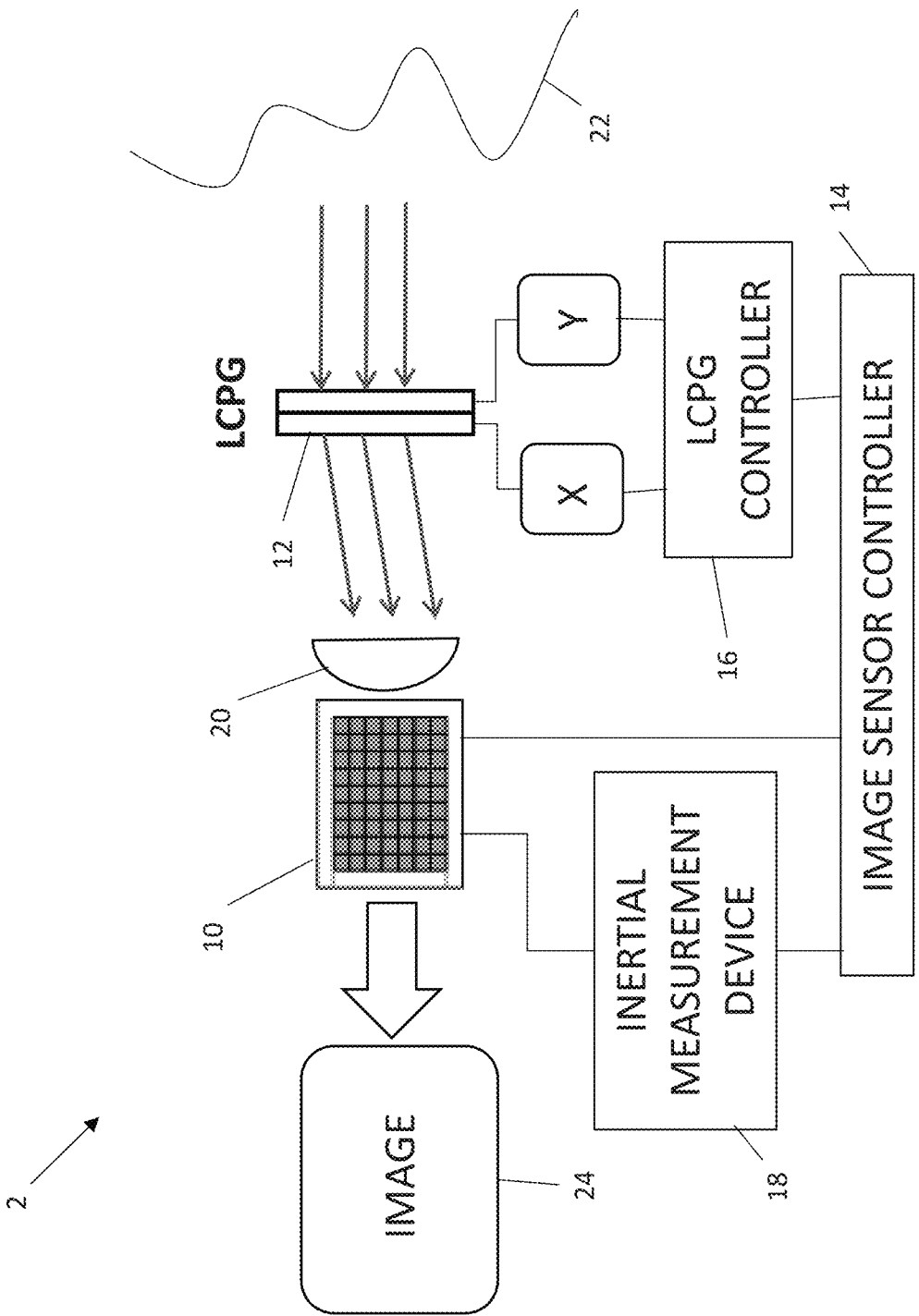
FIG. 1 is a system block diagram of an imaging system in accordance with a first example of the first aspect of the present disclosure.

FIG. 1 illustrates a first example of the present disclosure, being an imaging system 1 comprising an image sensor 10 and a LCPG arrangement 12. As noted above, the LCPG arrangement 12 may comprise one or more stacked LCPGs. The image sensor 10 is a sensor that detects and conveys image information by converting light into electrical signals. Such image sensors typically have a matrix of pixels, each pixel receiving incoming light and converting it into a value. When the values of all of the pixels are combined, they can form a representative image of the scene that is being captured. The image sensor may be an infrared sensor or time-of-flight sensor. More specifically, the image sensor may be a 2D or 3D image sensor, for example, a time-of-flight 3D depth sensor. In other examples, the image sensor may be a monochromatic 2D image sensor that provides static or dynamic 2D capture. Overall control of image sensor 10 is provided by an image sensor controller 14, which in turn controls a specific LCPG controller 16. It will however be appreciated that the image sensor 10 and the LCPG 12 may be controlled by a single controller. The image sensor controller 14 receives inputs from a device such as an inertial measurement device 18 or the like that is configured to detect and measure any movement of the image sensor 10, for example, by measuring the pitch, roll and yaw of the image sensor 10. The LCPG 12 is a multiple layer LCPG with orthogonally stacked gratings to permit two-dimensional beam steering of a beam of light passing through the LCPG 12. A lens 20 is also typically provided in front of the image sensor 10. It will also be appreciated that the imaging apparatus 1 may also include a light source (not shown) for illuminating the target objects of a scene 22, as will be discussed in more detail below.

The operation of the imaging system 1 will now be described with reference to FIG. 3. At s.3.2 the inertial measurement device 18 outputs a measurement of the motion experienced by the image sensor 10, which is received by the image sensor controller 14 and output to the LCPG controller 16. In some examples, the output from the inertial measurement device 18 may be output directly to the LCPG controller 16. At s.3.4 the LCPG controller 16 applies a beam angle displacement to the LCPG 12 to thereby control the beam angle of the light being reflected from or generated by the target objects in the scene 22 based on the movement of the image sensor 10 detected by the inertial measurement device 10. In this respect, the LCPG 12 is controlled by an X drive for controlling horizontal deflection of the light, and a Y drive for controlling vertical deflection of the light. The light passing through the LCPG 12 then passes through the lens 20 and onto the image sensor 10, which outputs a stabilized image to a visual display 24 at s.3.6. This process will be repeated for each capture cycle, that is, the time interval over which an image or a frame of a moving image is captured. As such, within each capture cycle, the LCPG controller 16 may apply a plurality of beam angle displacements to the LCPG 12 to counteract all of the movement of the image sensor 10 during that capture cycle, and thereby ensure that each respective beam of light incoming from the object is reaching the same pixel on the image sensor 10 during that capture cycle.

Figure 5A:
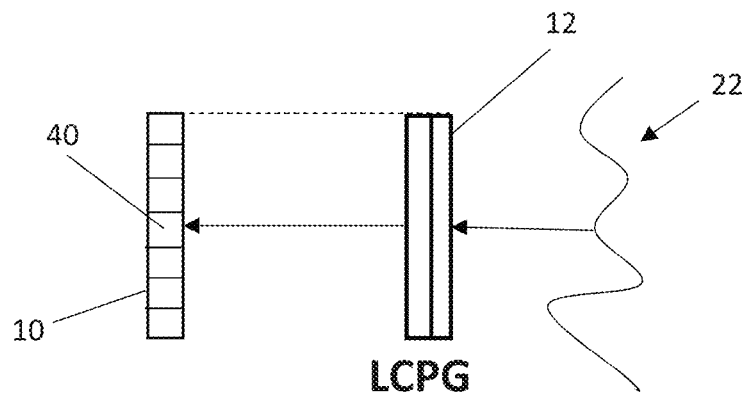
FIGS. 5A to 5C are diagrams illustrating the operation of the imaging system of the first and second example of the first aspect of the present disclosure.

As such, the motion detected by the inertial measurement device 18 is used to determine the angle at which the light incoming from the scene 22 needs to be steered to ensure that the light is received at the same pixel of image sensor 10. This method of adjusting the steering angle based on the motion of the image sensor 10 is further illustrated by FIGS. 5A to 5C. In FIG. 5A, the image sensor 10 is in its central position, and a beam of light reflected from one object in the scene 22 is passing through the LCPG 12 onto a first pixel 40 of the image sensor 10. Here, no beam angle displacement is being applied to the LCPG 12 and hence the beam is passing straight through onto the image sensor 10. During the same capture cycle, the image sensor 10 may experience some movement away from its central position. For example, in FIG. 5B, the image sensor 10 has displaced downwards in the direction of arrow A such that the image sensor 10 is now a distance B from its original position of FIG. 5A. Here, no beam angle displacement has been applied, and consequently the beam of light from that same object of the scene 22 is now hitting the image sensor 10 at a different pixel 42. In the present disclosure, the movement of the image sensor 10 will be detected and measured by the inertial measurement device 18 and output to the LC PG controller 16, either directly or via the image sensor controller 14. Based on the measured movement, the LCPG controller 16 will apply a beam angle displacement to the LCPG 12 to steer the light at an angle corresponding to the direction and magnitude of the movement of the image sensor 10, as illustrated by FIG. 5C. In this example, the LCPG controller 16 will cause the Y drive to control the vertical deflection of the light such that the light from that same object in the scene 22 is now being steered so that it is also displaced a distance B in the downwards direction and subsequently hits the first pixel 40 of the image sensor 10, that is, the pixel 40 that it was originally hitting before the image sensor 10 was displaced. As such, during each capture cycle, the light reflected from each object in the scene 22 is steered to ensure that it is reaching the same sensing portions of the image sensor 10 regardless of any movement by the image sensor 10.

Figure 5B:
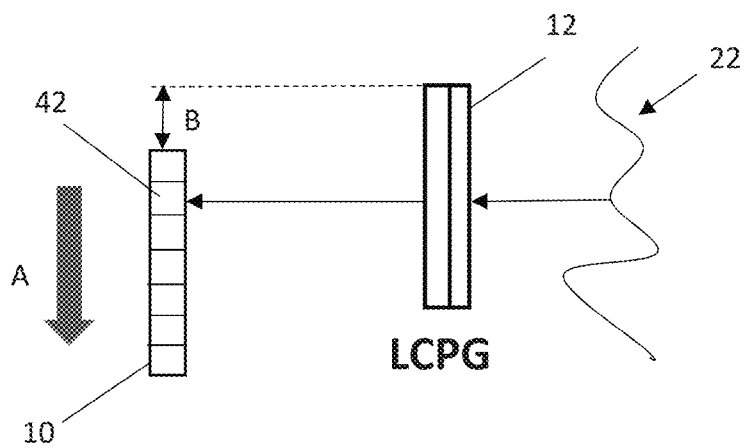
Figure 5C:
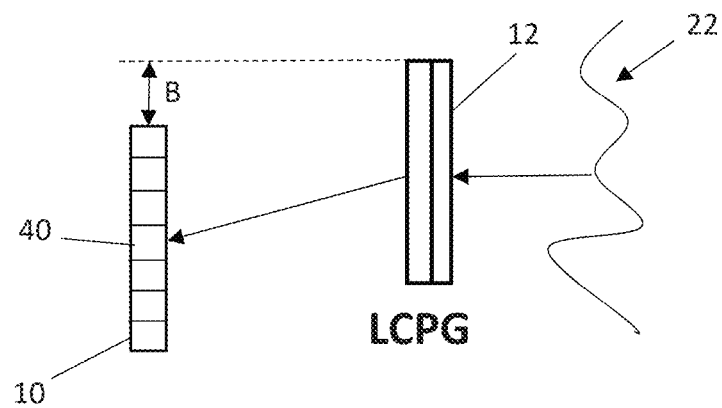

Whilst FIGS. 5A to 5C show a single beam of light and a single dimension, it will be appreciated that each pixel of the image sensor 10 will typically receive a plurality of beams corresponding to different parts of the object. The LCPG 12 will thus be controlled so as to deflect each of these beams based on the movement of the image sensor 10 to ensure that each beam is received by a single pixel during each capture cycle and in the two dimensions.

Figure 2:
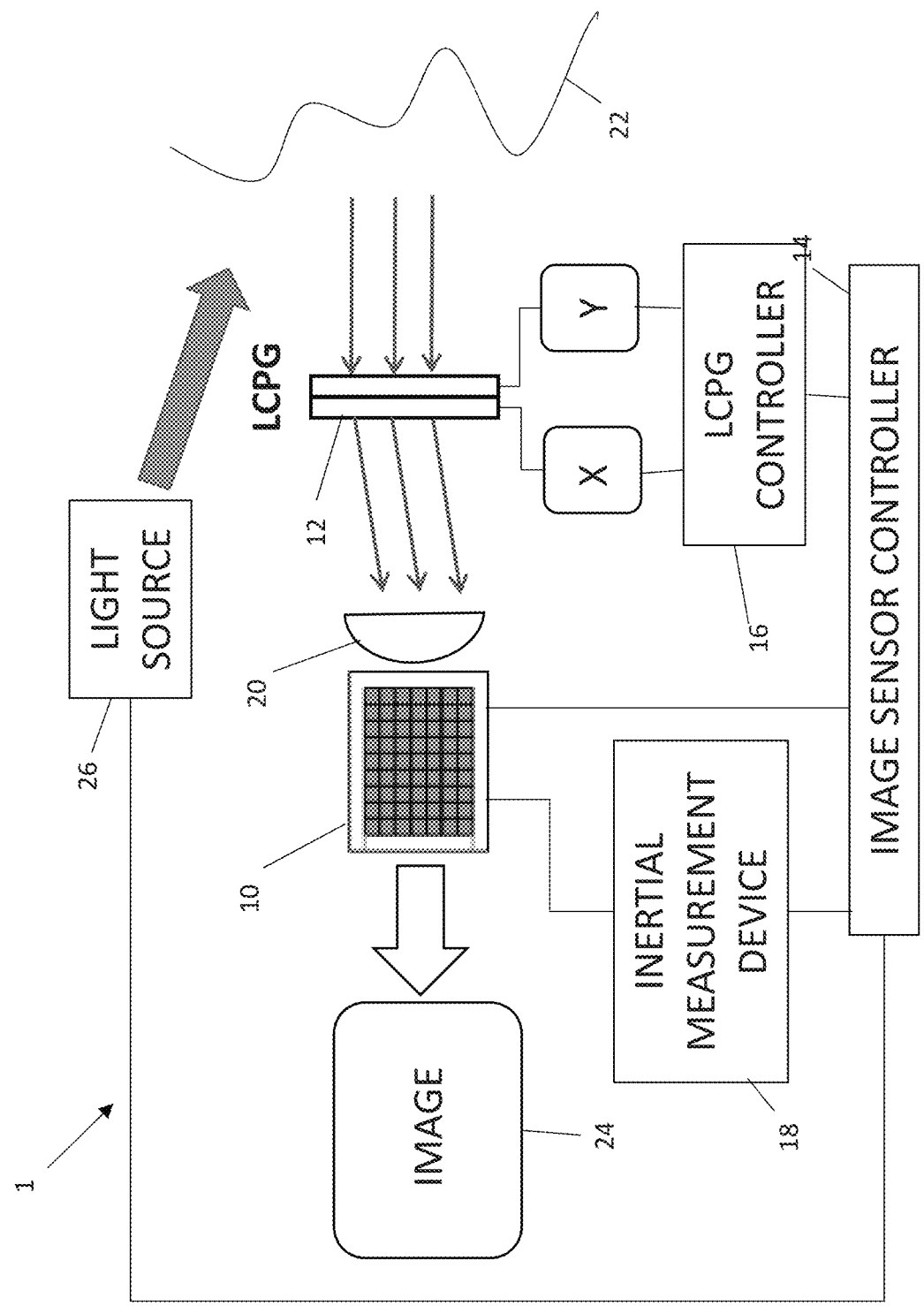
FIG. 2 is a system block diagram of an imaging system in accordance with a second example of the first aspect of the present disclosure.

FIG. 2 provides a second example of the present disclosure. In this example, the imaging system 2 comprises a light source 26 used to illuminate the scene 22, the light source 26 also being controlled by the image sensor controller 14. It will also be appreciated that the light source 26 may be controlled by some other control means connected to the imaging system 2. In such cases, the light source 26 may be a tunable wavelength source, for example, a thermal electric controller or the like.

The illumination source 26 could emit infra-red light, monochromatic visible light or ultra-violet light. The illumination source could be a laser, which emits coherent light. In some examples, the illumination source could emit a diffused and uniform cone of light (and the imaging device may further comprise a diffuser). In other examples, the illumination source could emit structured light (and the imaging device may further comprise another optical component to replace the diffuser). Various structured light schemes may be used such as spatial multiplexing (in which the light source is collimated and a diffractive optical element is used to create a special correlation pattern), range multiplexing (in which the light source is diffused and a static pattern is created having intensity that varies across a scene) or temporal multiplexing (in which the light source is collimated and a 1D MEMS and line lens projector are used to create a pattern that varies over time).

The light source 26 is usually a linearly polarized light source, however, LCPGs are configured to steer circular polarized light in dependence on the polarization state of the input light. For example, in a ternary LCPG, the light is steered into three possible directions according to the following equation:

$$\theta_{out} = \sin^{-1}\left(\frac{m\lambda}{\Lambda} + \sin\theta_{in}\right) \quad [1\text{-}1]$$

where $\lambda$ is the wavelength of the incident light, $\Lambda$ is the grating pitch, and $m=0$ and $m=\pm 1$ depending on whether the incident light is left-handed or right-handed circular polarized light.

Consequently, a quarter wave plate (not shown) is used to convert the linearly polarized light into circular polarized light before it passes through the LCPG 12, the linearly polarized input light being converted into either right-handed or left-handed circular polarized light. For example, the quarter wave plate may be incorporated into the LCPG 12 arrangement such that it sits immediately in front of one of or each of the LCPGs. As such, the polarization state incident on any particular LCPG can be controlled through the provision of a quarter wave plate, and thus the use of multiple quarter wave plates can increase the range of possible steering angles. That is to say, one or more quarter wave plates are used to control the type of polarization of the light incident on the LCPGs and the amount by which they are capable of steering the light.

FIG. 4 illustrates the operation of this second example. As in the previous example, the motion of the image sensor 10 is also detected by the inertial measurement device 18 at s.4.2 and output to the LCPG controller 16. At s.4,4 the image sensor controller 14 also controls the wavelength of the light source 26 to enhance the steering of the LCPG 12. In this respect, controlling the wavelength can be used to limit the number of LCPG layers required in the LCPG 12 to thereby incorporate fine steering. That is to say, the wavelength of the light source 26 can be controlled to enhance the resolution of the steering since the steering angle is sensitive to the wavelength of the light hitting the LCPG 12.

The LCPG controller 16 then applies a beam angle displacement to the LCPG 12 at s.4.6 to thereby control the beam angle of light being reflected from an object in the scene 22 based on the detected motion of the image sensor 10. As such, the magnitude and direction of the deflection experienced by the light as it passes through the LCPG 12 is controlled both by changing the wavelength of the light source 26 and by applying a beam angle displacement to the LCPG 12 based on the movement of the image sensor 10. Thus, by altering the wavelength of the illumination source 26, fine beam steering adjustments can be made alongside the relatively coarse control applied by the one or more LCPGs on light generated by or reflected from the scene, to thereby produce an improved final image.

The light passing through the LCPG 12 then passes through the lens 20 and onto the image sensor 10, which outputs an image to a visual display 24 at s.4.8 that has been both stabilized and enhanced.

A further example of how the LCPG 12 may be used to enhance the final output image will now be described.

As discussed above, image sensors typically comprise a plurality of pixels that can convert incoming light into charge and thereby generate an output image. The number of pixels of an image sensor can determine the resolution of the resulting image. Thus, the higher the number of pixels, the higher the resolution of the image sensor. However, there is often a trade-off between resolution and cost. Highly sensitive image sensors for long ranging sensing applications are typically expensive and are at low resolution. In particular, for sensors with 3-dimensional applications, for example, depth sensing, it is desirable to improve the resolution of these types of sensors without increasing their cost.

In addition to the image stabilization described above, LCPGs can also be used to improve the resolution of the imaging system. In the present disclosure, the one or more LCPGs are further used to steer light from different points of an object towards the same pixel on an image sensor sequentially. Importantly, intermediate images are created by using the one or more LCPGs to steer light onto the image sensor in a sequential manner, and a combined overall image is created from the intermediate images.

The intermediate images could consist of a first intermediate image that is not deflected and a second intermediate image that is deflected by the LCPG.

Alternatively, the intermediate images could consist of a first intermediate image that is deflected by the LCPG in one direction and a second intermediate image that is deflected by the LCPG in another direction. Either way, when the two intermediate images are combined together by an appropriate image combination routine, the combined overall image has an effective resolution that is double the resolution of the first or second intermediate image. Clearly, this concept of the present disclosure can extend to much more complicated configurations of intermediate images than the two examples described above.

As discussed above, an illumination source can be used to illuminate the object. Light from the illumination source can also be steered by one or more LCPGs such that a part of the object is illuminated by the illumination source. Importantly, the LCPGs steers the light such that it is directed to a different part of the scene other than the non-deflected part of the scene.

Figure 6:
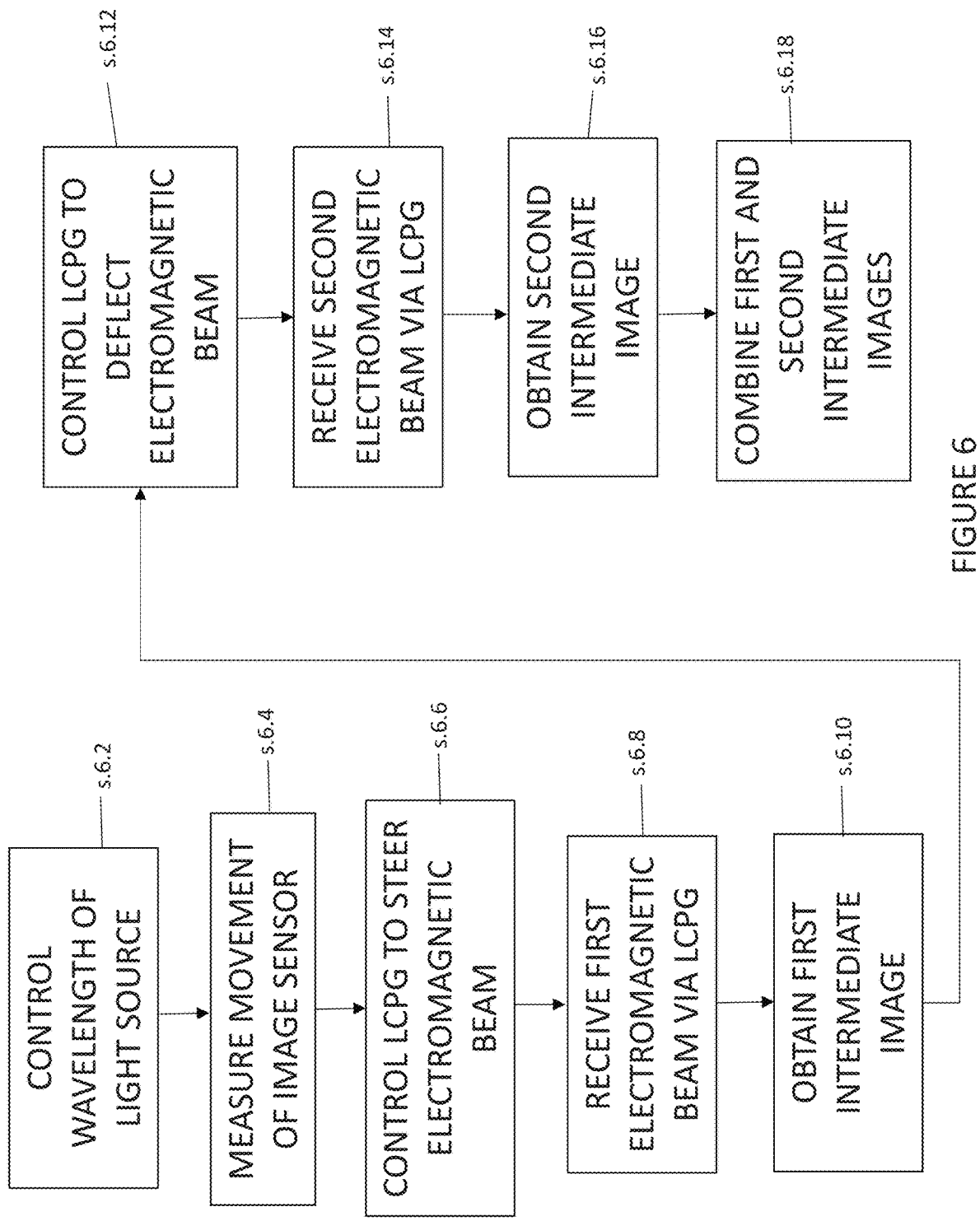
FIG. 6 is a flow diagram illustrating the operation of the imaging system in accordance with a third example of the first aspect of the present disclosure.

With reference to FIG. 2, the operation of the imaging system 2 according to a third example will be described with reference to FIG. 6.

At step s.6.2, the inertial measurement device 18 outputs a measurement of the motion, if any, experienced by the image sensor 10, as described previously. At step s.6.4, the wavelength of the illumination source 26 is controlled to output an electromagnetic beam of wavelength A. As discussed previously with reference to FIG. 4, in addition to the relatively coarse beam angle displacement applied to the LCPG 12 at s.6.6 in order to steer the electromagnetic beam onto particular parts of the scene 22 and/or to counteract movement of the image sensor 10 detected at s.6.2, the wavelength of the illumination source 26 can also be controlled in order to provide fine beam steering adjustments when the electromagnetic beam passes through the LCPG 12.

The electromagnetic beam shines on an object in the scene 22 and is reflected back towards the image sensor 10. At s.6.8, a first reflected electromagnetic beam is received at the image sensor 10 via the LCPG 12. Here, the LCPG is controlled such that the electromagnetic beam is only deflected to counteract any movement experienced by the image sensor 10. At step s.6.10, a first intermediate image is obtained at the image sensor 10 by reading the values of the pixels. At step s.6.12, the LCPG is further controlled such that the electromagnetic beam is deflected relative to the first electromagnetic beam, this deflection being modulated by the beam steering required to counteract any movement detected by the inertial measurement device 18. For example, the deflection used at s.612 may be modulated such that the beam steering required to counteract movement of the image sensor 10 is added to it, as will be described in further detail below. At step s.6.14, a second reflected electromagnetic beam is received at the image sensor 10 via the LCPG 12. At step s.6.16, a second intermediate image is obtained at the image sensor 10 by reading the values of the pixels. At step s.6.18, the first and second intermediate images are combined into an overall image for example, by interleaving using time-division multiplexing.

In terms of the mathematics behind obtaining a combined output in examples of the present disclosure, we can consider two simple cases of an image sensor having two pixels side by side.

Figure 11A:
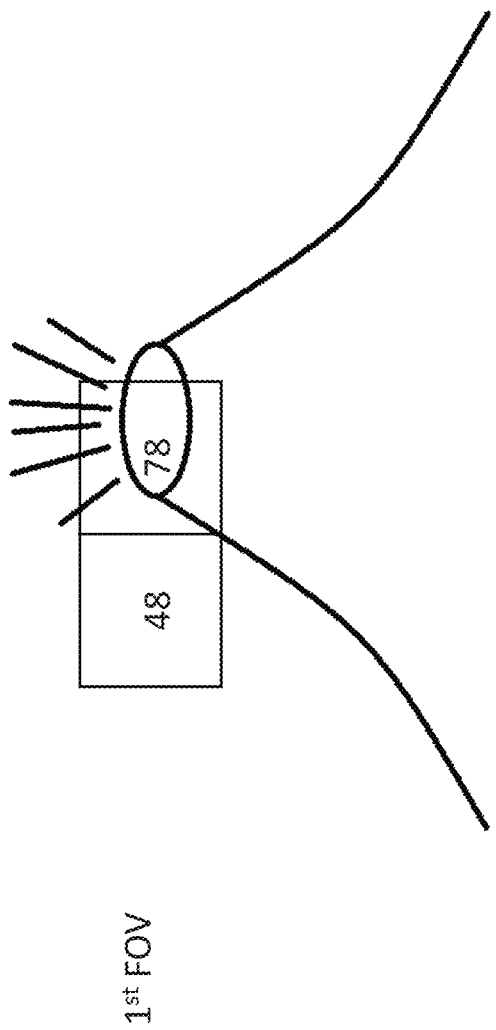
FIGS. 11A to 11D illustrate details of how an output is obtained in examples of the first, second and third aspects of the present disclosure.
Figure 11B:
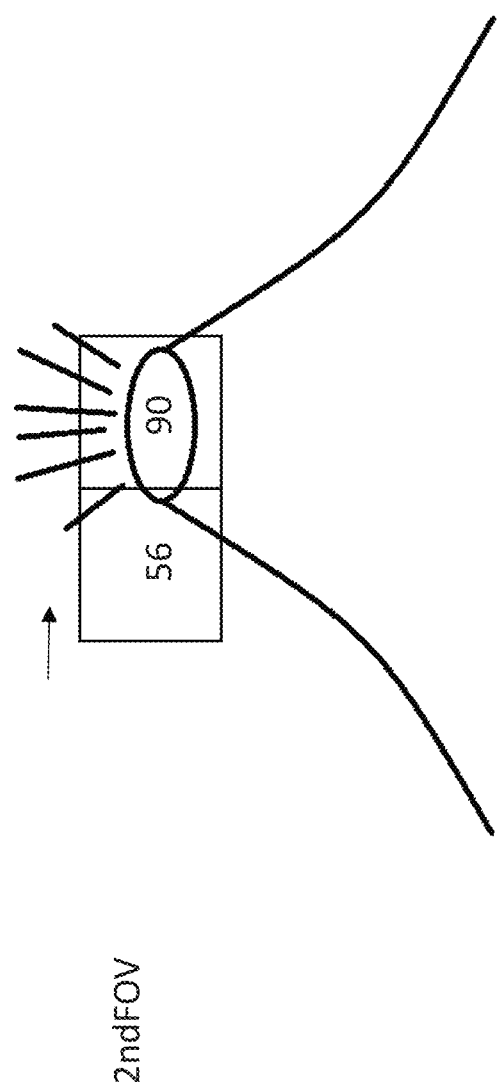
Figure 11C:
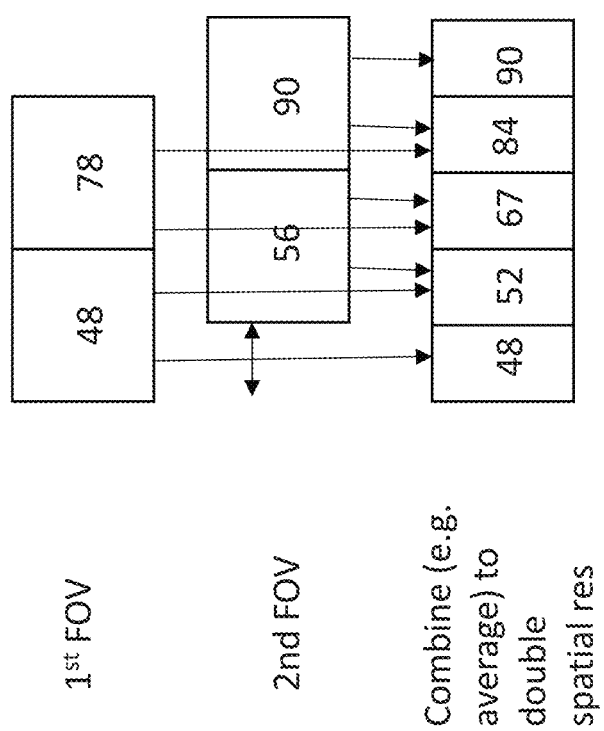
Figure 11D:
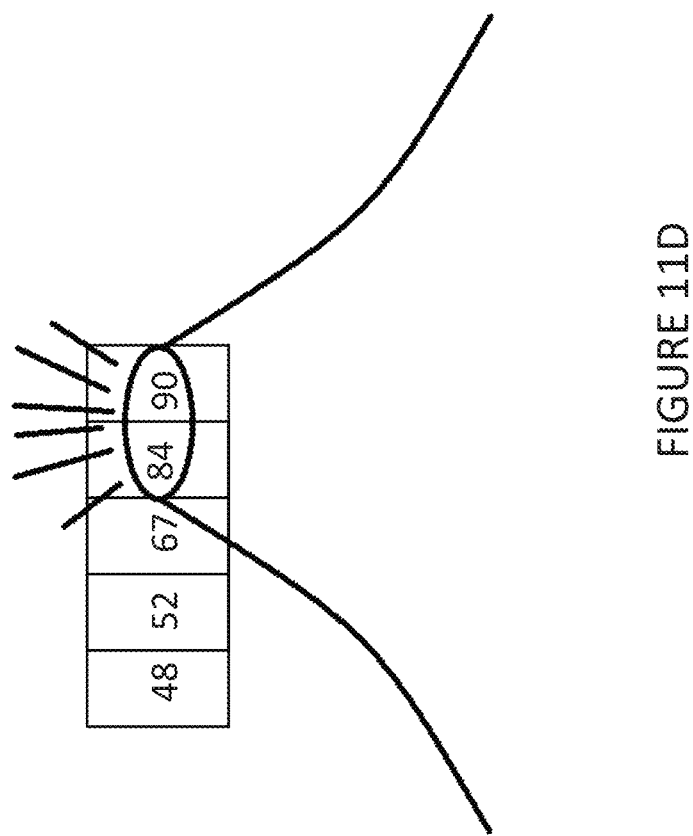

In FIG. 11A, two pixels side by side having values 48 and 78 are shown. These two pixels are read by an image sensor with no gaps in between the pixels and represent a first FOV of a scene. In FIG. 11B, the FOV is shifted slightly to the right by a sub-pixel's pitch to a second FOV and now the two pixels have values 56 and 90, respectively. In FIG. 11O, intermediates images representative of the first FOV and the second FOV are combined by applying a mathematical function to the pixel values obtained from each FOV. Provided that the scene remains identical between the first FOV and the second FOV and the image sensor response across its sensing area is uniform, in the resultant combined image created from the intermediate images, there are effectively half size pixels with their own unique values, thus improving resolution of the image sensor. The combined result is shown in FIG. 11D.

Figure 12A:
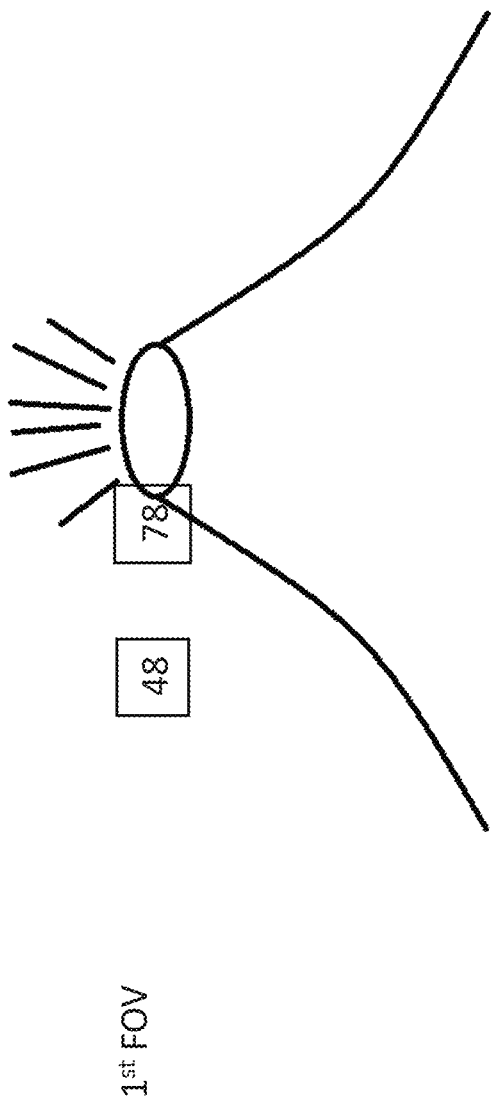
Figure 12B:
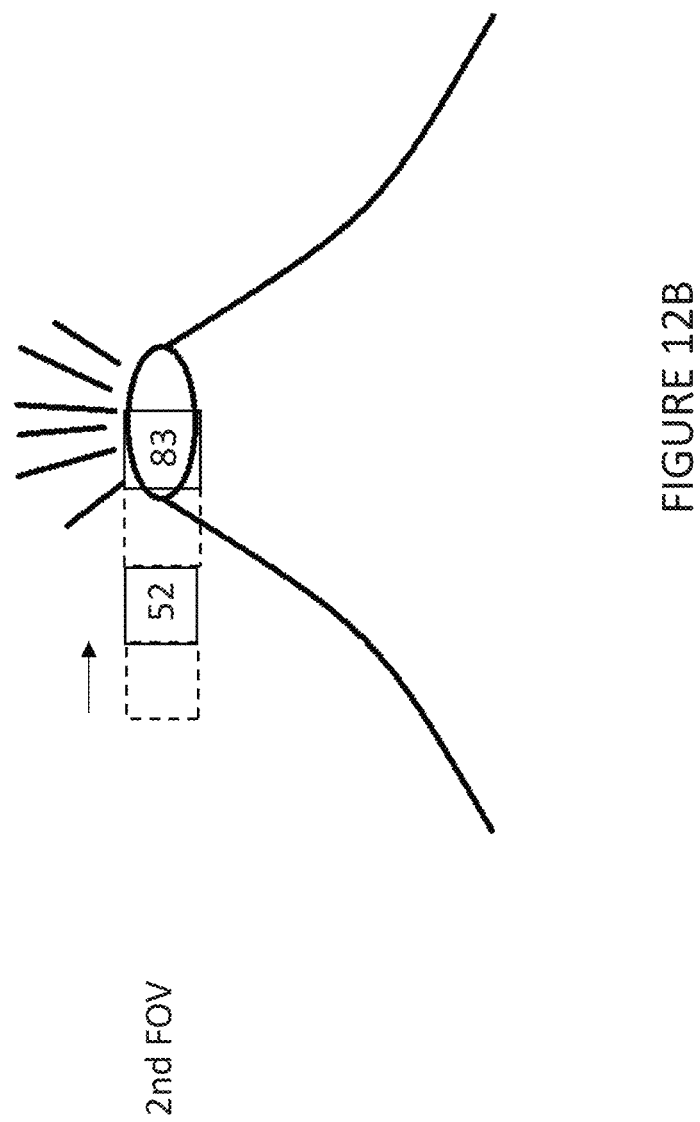

In FIG. 12A, two pixels side by side representative of a first FOV and having values 48 and 78 are shown. However, in contrast to FIG. 11A, there is a gap in between the two pixels. This could represent dead space between the pixels or missing pixels, for example, to accommodate for readout circuitry. In FIG. 12B, the FOV is shifted slightly to the right to a second FOV and now the two pixels have values 52 and 83, respectively, and it can be seen that the second FOV is shifted across by an entire pixel's pitch. In FIG. 12C, intermediate images representative of the first FOV and the second FOV are combined by interleaving. The combined result is shown in FIG. 12D.

FIGS. 7 to 10 are system block diagrams of an image sensor 10 that illustrate how 2-dimensional spatial resolution of a scene 22 can be improved using the techniques of the present disclosure in a fourth example. Specifically, frames 70, 80, 90, 100 show how the scene 22 is captured from four FOVs.

The imaging system 3 comprises the same components as the imaging system 2 of FIG. 2, however, in this example a diffuser 28 is also shown. As noted above, it will be appreciated that a diffuser may also be used in any of the examples described herein. In FIGS. 4 to 7, the light source is a laser that emits IR light. As before, the LCPG 12 is controlled by an X drive for controlling horizontal deflection of the electromagnetic beam and a Y drive for controlling vertical deflection of the electromagnetic beam. Whilst not shown, it will be appreciated that the imaging system 3 also comprises the inertial measurement device 18 shown in FIGS. 1 and 2.

Figure 7:
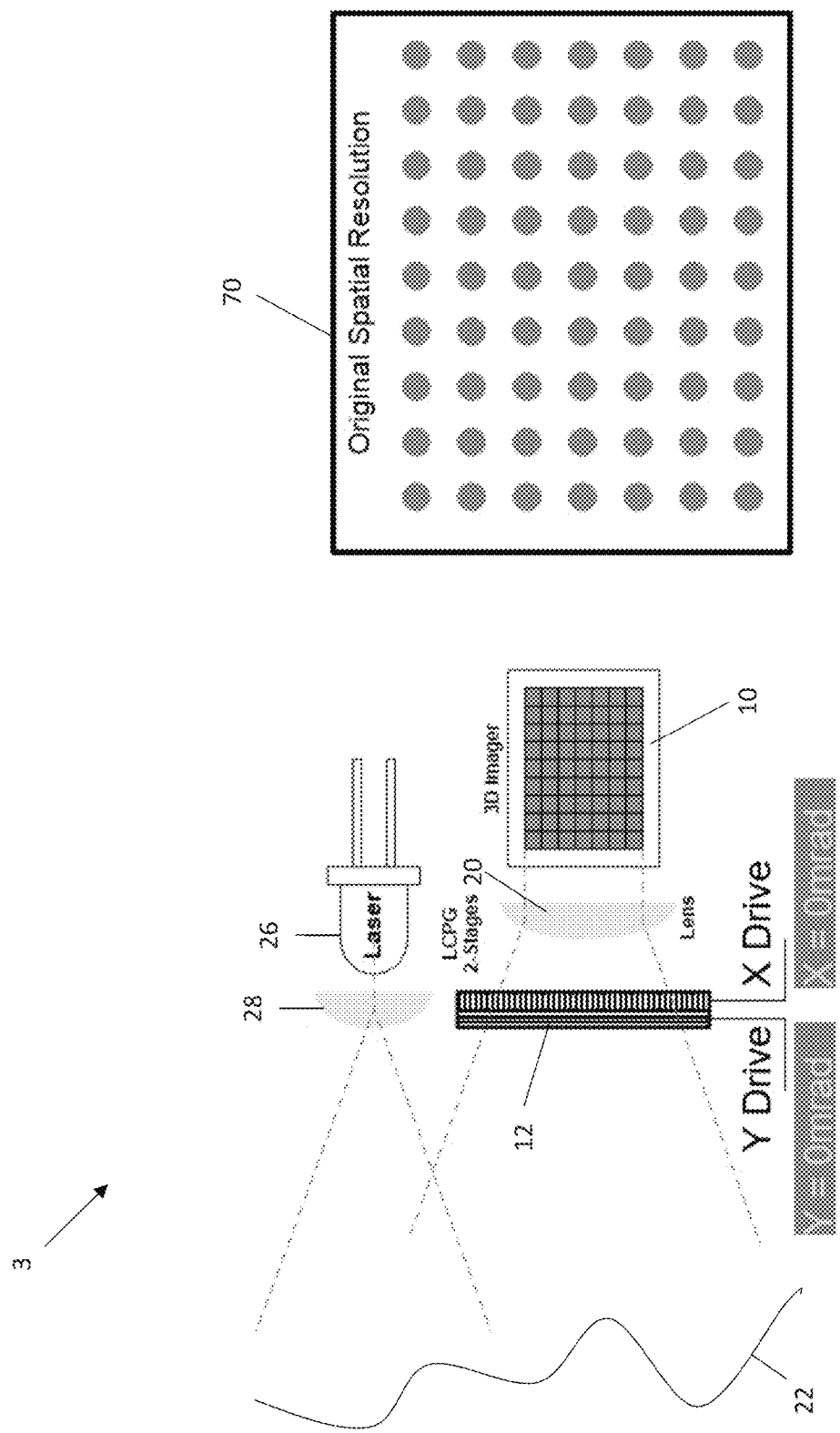
FIGS. 7 to 10 are system block diagrams and of an imaging system in accordance with a fourth example of the first aspect of the present disclosure.

In FIG. 7, the frame 70 shows an original spatial resolution of the captured scene without any deflections being applied by the LCPG. Frame 70 is representative of the spatial resolution that is obtained from a first intermediate image, wherein the electromagnetic beam may or may not have been steered by the LCPG 12 to compensate for any movement by the image sensor 10, as described above with respect to the previous examples.

As an example, the image sensor 10 may comprises 80×80 pixels and a FOV of 50°. In such cases, the angular resolution for each pixel, $\alpha_{pix(x)}$, is calculated by:

$$\alpha_{pix(x)} = FOV * \pi / (180 * N_{pix}) \quad [1\text{-}2]$$

where $N_{pix}$, is the number of pixels, and $\alpha_{pix(x)}$ is provided in radians since the resolution is the same for X and Y, $\alpha_{pix(Y)} = \alpha_{pix(X)}$.

To double the resolution in the X and Y direction, the beam must be steered by half a pixel, $\alpha_{pix}/2$, in the X and Y directions. This can be accomplished by operating the LCPG in four phases:

$1^{st}$ Frame: X Drive=0; Y Drive=0
$2^{nd}$ Frame: X Drive=$\alpha_{pix(X)}/2$; Y Drive=0
$3^{rd}$ Frame: X Drive=$\alpha_{pix(X)}/4$; Y Drive=$\alpha_{pix(X)}/2$
$4^{th}$ Frame: X Drive=$\alpha_{pix(X)}/4$; Y Drive=$\alpha_{pix(Y)}/2$ In the following example, $\alpha_{pix(X)}=11$ mrad. Using this value and the above equations, the amount of steering of the X and Y drives can be calculated and an implementation of this is shown in FIGS. 7 to 10.

Figure 8:
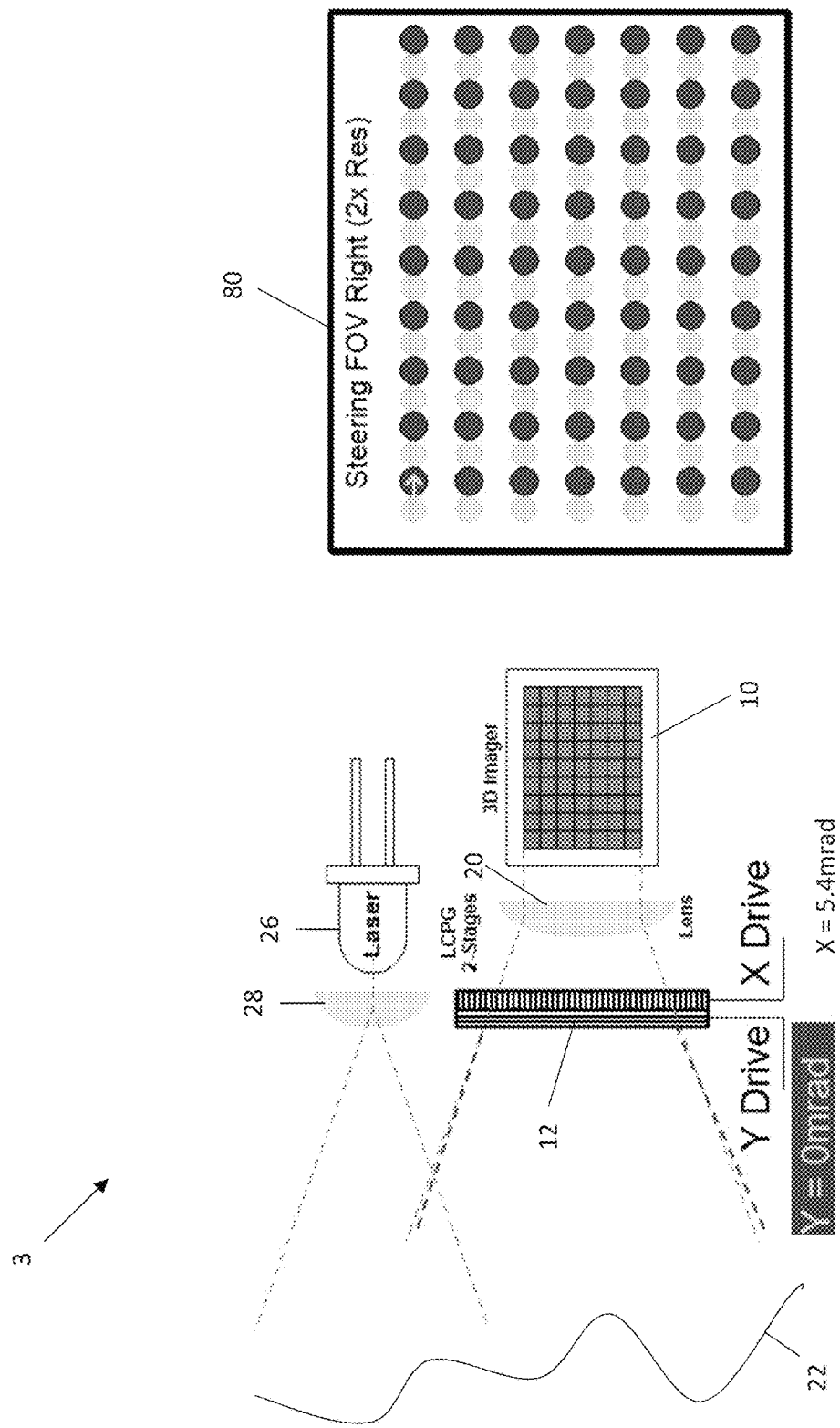

In FIG. 8, a signal causing a deflection of 5.4 mrad ($\alpha_{pix(X)}/2$) is applied to the X drive. Frame 80 represents a FOV that is shifted to the right relative to frame 70 and is used to obtain a second intermediate image. In accordance with the present disclosure, this deflection to the right is modulated by a control signal generated in response to any motion detected by the inertial measurement device 18, for example, by adding it together. For example, if the inertial measurement device has detected a movement by the image sensor 10 that is also to the right, the LCPG controller 16 may modulate the control signal so as to add the two deflections together to ensure that the field of view is shifted whilst also taking the movement of the image sensor 10 into account. As such, the electromagnetic beam is steered to the right so as to move with the image sensor 10 and at the same time shift the field of view. Conversely, if the image sensor 10 has shifted to the left, the control signal is modulated to account for this movement and ensure that the electromagnetic beam is not steered too far right along the horizontal axis of the image sensor 10. In doing so, the control signal input to the LCPG 12 ensures that the electromagnetic beam is steered to the required field of view by the correct amount relative to the position of the image sensor 10 during that capture cycle.

When the first and second intermediate images are combined, the horizontal spatial resolution is increased compared with the original spatial resolution that is obtained from a first intermediate image, whilst at the same time being stabilized against any shaking or shifting by the image sensor 10. In an ideal scenario whereby the optics of the device are ideal and the diffraction and resolution of the lens are not limited, the spatial resolution may be substantially improved, up to double the original spatial resolution.

Figure 9:
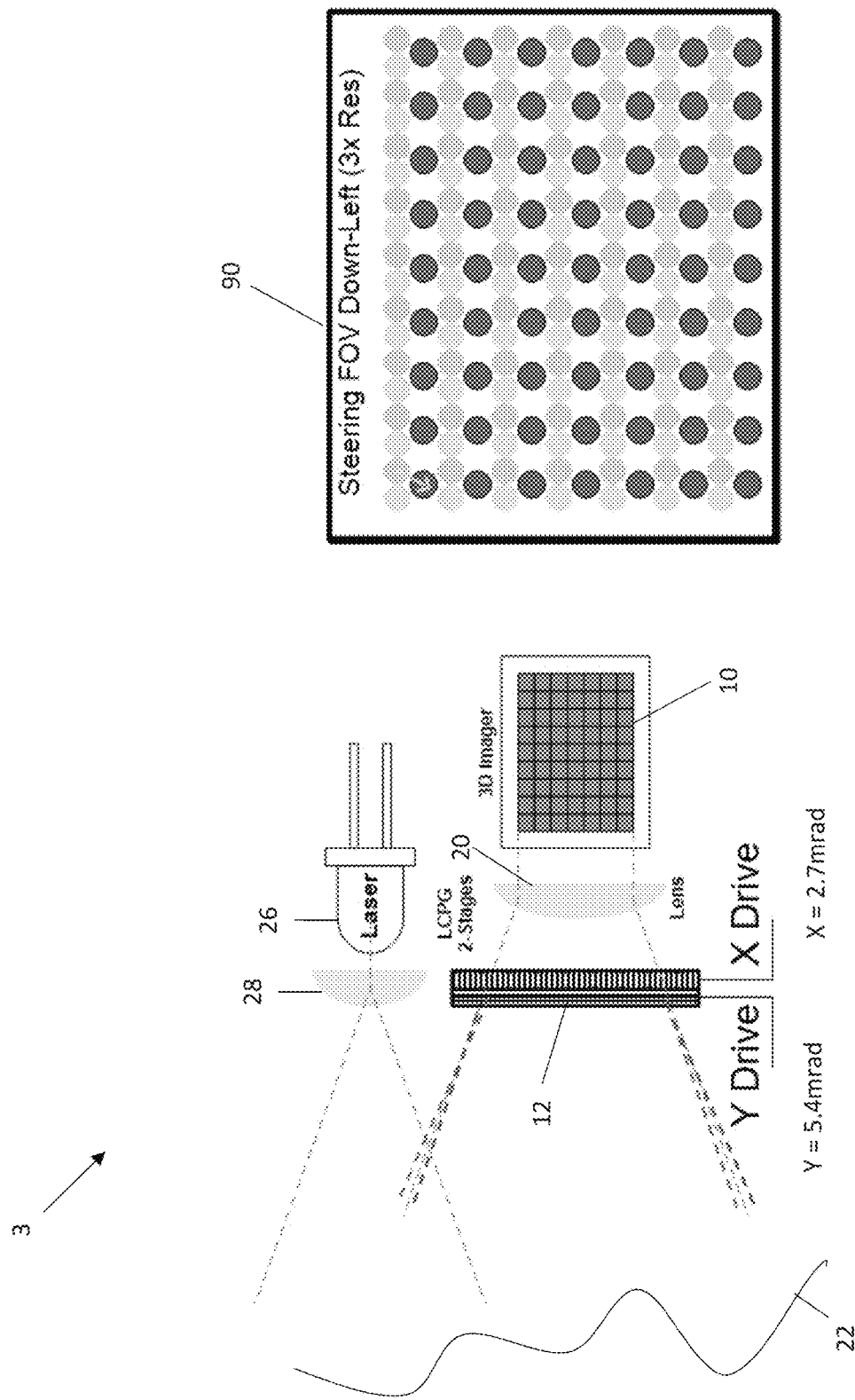

In FIG. 9, a signal causing a deflection of 2.7 mrad ($\alpha_{pix(X)}/4$) is applied to the X drive and a signal causing a signal causing a deflection of 5.4 mrad ($\alpha_{pix(X)}/2$) is applied to the Y drive. Frame 90 represents a FOV that is shifted to the down and left relative to frame 80 is used to obtain a third intermediate image. As before, the control signal applied to the X and Y drive may be again modulated to account for any movement of the image sensor 10 detected by the inertial measurement device 18 to thereby ensure that the electromagnetic beam is not steered too far or not enough in either direction.

When the first, second and third intermediate images are combined, the resulting spatial resolution is improved further compared with the spatial resolution that is obtained from combining the first and second intermediate images, whilst again being stabilized against any shaking or shifting by the image sensor 10. In an ideal scenario the spatial resolution may be substantially improved, up to triple the original resolution obtained from just one FOV.

Figure 10:
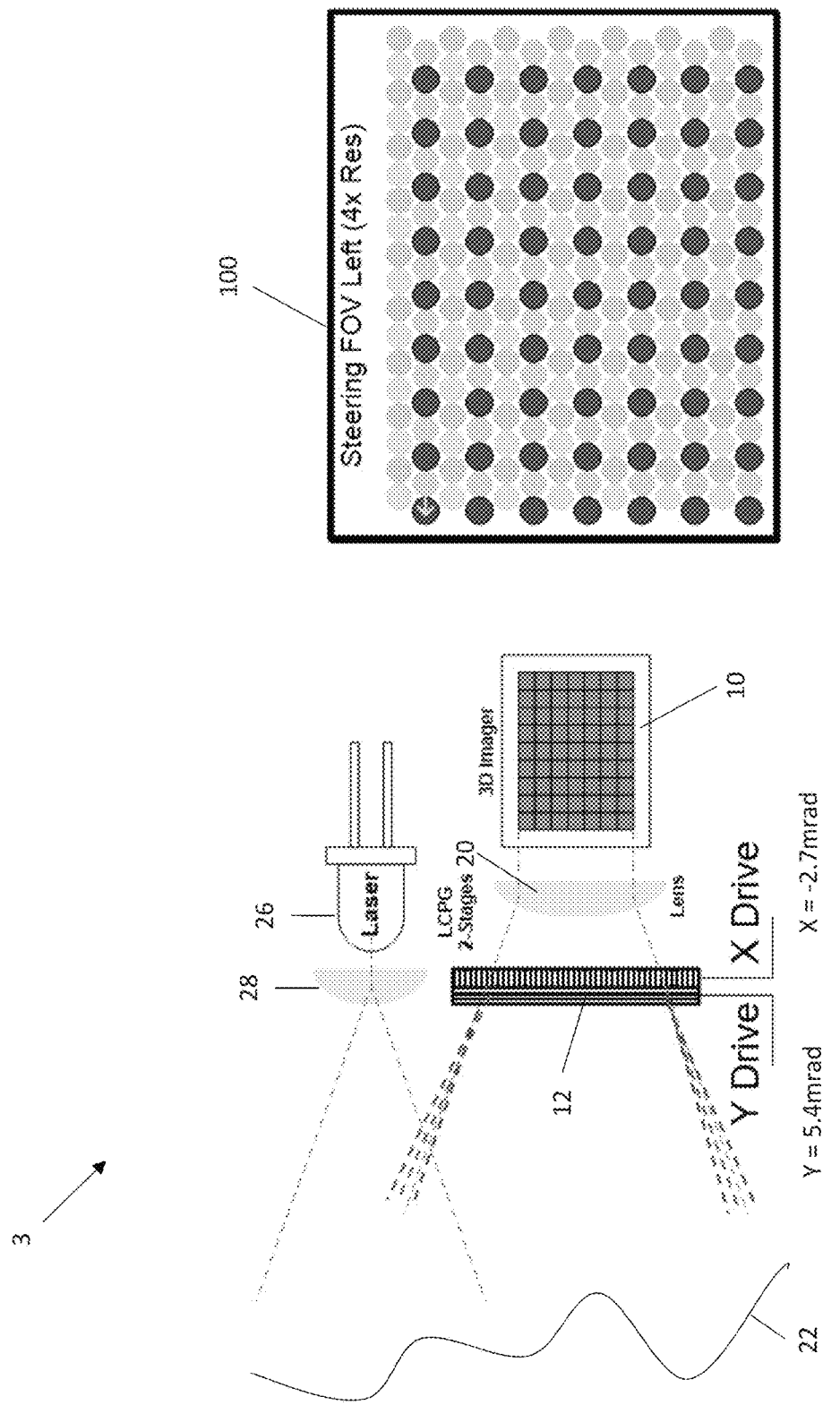

In FIG. 10, a signal causing a deflection of −2.7 mrad ($-\alpha_{pix(X)}/4$) is applied to the X drive and a signal causing a deflection of 5.4 mrad ($\alpha_{pix(X)}/2$) is applied to the Y drive. Frame 100 represents a FOV that is shifted to the left relative to frame 90 is used to obtain a fourth intermediate image. Once again, the signal applied to the X and Y drive may be modulated to account for any movement of the image sensor 10 detected by the inertial measurement device 18 to thereby ensure that the electromagnetic beam is not steered too far or not enough in either direction.

When the first, second, third, and fourth intermediate images are combined, effectively, the spatial resolution is improved further still compared with the spatial resolution that is obtained from combining the first, second and third intermediate images. Both the horizontal and vertical direction spatial resolutions have been substantially improved, and the resulting image has been stabilized. In an ideal scenario, the spatial resolution may be substantially improved, up to quadruple the original resolution obtained from just one FOV.

The deflections of the electromagnetic beam enabled by the X and Y drives in the third example of the present disclosure are of a magnitude such that they cause deflection of the electromagnetic beam onto the image sensor 10 by less than a pitch of the pixels of the image sensor. By measuring the movement by the image sensor 10 and modulating the signal applied to the X and Y drive based on this measured movement, the steering of the electromagnetic beam can be controlled so as to ensure that the correct magnitude of deflection is applied to the electromagnetic beam to shift the field of view by the amount required to obtain the intermediate images.

However, in other examples of the present disclosure, the one or more LCPGs are controlled to cause deflection of the electromagnetic beam onto the image sensor by a non-integer multiple of a pitch of the pixels of the image sensor. Similarly, in these examples, the LCPGs may be further controlled based on the movement of the image sensor 10 to ensure that the correct magnitude of deflection is applied to the electromagnetic beam.

Various further examples of the first aspect of the disclosure will be apparent from the following features defining further examples of the disclosure. Where a feature of a later example refers to one or more earlier examples, the examples may be considered in combination to provide further examples.

A first example describes a method of stabilizing an image output of an image sensor comprising a plurality of pixels, the method comprising: measuring a movement of the image sensor in at least a first direction; receiving at least one incident electromagnetic beam generated by or reflected from remote objects at one or more pixels of the image sensor via one or more liquid crystal polarization gratings (LCPGs); controlling the one or more LCPGs to apply a deflection to the at least one electromagnetic beam in dependence on the measured movement; and obtaining an image output of the image sensor by reading a signal representative of the at least one incident electromagnetic beam at each of the one or more pixels.

In a second example, the step of controlling the one or more LCPGs in the first example may cause a deflection of the at least one electromagnetic beam in a second direction corresponding to the first direction.

The measurement of a movement of the image sensor in the first example may comprise measuring a movement of the image sensor in a first set of directions during a first time interval, and wherein the step of controlling the one or more LCPGs causes a deflection to the at least one electromagnetic beam in a second set of directions corresponding to the first set of directions during the first time interval.

In a fourth example, the method of the first example may further comprise generating at least one electromagnetic beam from an illumination source for illuminating at least a part of the remote objects.

The method of the previous example may further comprise changing a wavelength of the illumination source, wherein the change in wavelength of the illumination source applies a fine controllable deflection to the electromagnetic beam when it passes through the LCPG.

A sixth example, wherein the first example further comprises: receiving a first incident electromagnetic beam generated by or reflected from the remote objects at each of the plurality of pixels, wherein the one or more LCPGs are further controllable to apply a deflection to the first incident electromagnetic beam such that the first incident electromagnetic beam is directed from a different field of view (FOV) of a scene other than a non-deflected FOV of the scene onto the image sensor; obtaining a first intermediate image by reading a signal representative of the first incident electromagnetic beam at each of the plurality of pixels for a first FOV; receiving a second incident electromagnetic beam generated by or reflected from the remote objects at each of the plurality of pixels via the one or more LCPGs that is deflected relative to the first incident electromagnetic beam; obtaining a second intermediate image by reading a signal representative of the second incident electromagnetic beam at each of the plurality of pixels for a second FOV; and multiplexing the first and the second intermediate images together to create a combined higher resolution image output of the image sensor.

The step of controlling the one or more LCPGs in the previous example may further cause deflection of the electromagnetic beam onto the image sensor by less than a pitch of the pixels of the image sensor.

The step of controlling the one or more LCPGs in the sixth example may further cause deflection of the electromagnetic beam onto the image sensor by a non-integer multiple of a pitch of the pixels of the image sensor.

In a ninth example, a system is configured to stabilize an image output of an imaging sensor comprising a plurality of pixels, the imaging sensor being configured to receive at least one electromagnetic beam generated by or reflected from remote objects and generate an image output representative thereof, the apparatus comprising: an inertial measurement device configured to measure a movement of the image sensor in at least a first direction; one or more liquid crystal polarization gratings (LCPGs), wherein the one or more LCPGs are controllable to apply a deflection to the at least one electromagnetic beam so as to direct the at least one electromagnetic beam onto one or more pixels of the imaging sensor; and a controller configured to control the one or more LCPGS so as to apply a deflection to the at least one electromagnetic beam in dependence on the movement measured by the inertial measurement device.

In the previous example, the controller may be configured to control the one or more LCPGs to apply a deflection to the at least one electromagnetic beam in a second direction corresponding to the first direction.

An eleventh example, further to the system of the ninth example, wherein the inertial measurement device may be configured to measure a movement of the image sensor in a first set of directions during a first time interval, and wherein the controller may be configured to control the one or more LCPGs to apply a deflection to the at least one electromagnetic beam in a second set of directions corresponding to the first set of directions during the first time interval.

The system of the ninth example may further comprise an illumination source configured to generate at least one electromagnetic beam for illuminating at least a part of the remote object.

In a thirteenth example, the illumination source of the twelfth example may be a tunable wavelength source.

In a fourteenth example, the one or more LCPGs of the ninth example may comprise a plurality of LCPGs arranged in a stack.

The plurality of LCPGs of the previous example may further comprise at least one LCPG arranged orthogonally to another LCPG to permit for two-dimensional deflection of the electromagnetic beam.

In a sixteenth example, the controller of the ninth example may be further configured to control the one or more LCPGs so as to direct electromagnetic beams from at least a first field of view (FOV) and a second FOV onto each of the plurality of pixels to create a first and a second intermediate image respectively, so as to create a combined higher resolution image output of the image sensor.

The controller of the previous example may be further configured to control the one or more LCPGs to cause deflection of the electromagnetic beam onto the image sensor by less than a pitch of the pixels of the image sensor.

The controller of the sixteenth example may be further configured to control the one or more LCPGs to cause deflection of the electromagnetic beam onto the image sensor by a non-integer multiple of a width of the pixels of the image sensor.

In a nineteenth example, a system is configured to improve an image output of an imaging sensor comprising a plurality of pixels, the imaging sensor being configured to receive electromagnetic beams generated by or reflected from remote objects and generate an image output representative thereof, the apparatus comprising: an inertial measurement device configured to measure a movement of the image sensor in at least a first direction; one or more liquid crystal polarization gratings (LCPGs), wherein the one or more LCPGs are controllable to apply a deflection to the electromagnetic beams so as to direct the electromagnetic beams onto the plurality of pixels; and a controller configured to control the one or more LCPGS to direct the electromagnetic beams from at least a first field of view (FOV) and a second FOV of the remote objects onto each of the plurality of pixels to create a first and a second intermediate image respectively, so as to create a combined higher resolution image output of the image sensor, the controller being further configured to control the one or more LCPGS so as to modulate the deflection applied to the electromagnetic beams from at least one of the first FOV and second FOV in dependence on the movement measured by the inertial measurement device.

The controller of the previous example may be further configured to control the one or more LCPGs to apply a deflection in a second direction corresponding to the first direction to the deflection applied to the electromagnetic beams from at least one of the first FOV and second FOV.

Second Aspect of the Disclosure: Image Sensor Using Liquid Crystal Polarization Grating An image sensor is a sensor that detects and conveys image information by converting light into electrical signals. An image sensor typically has a matrix of pixels, each pixel receiving incoming light and converting it into a numerical value.

When the values of all of the pixels are combined, they can form a representative image of the scene that is being captured.

The number of pixels of an image sensor can determine the resolution of the resulting image. Thus, the higher the number of pixels, the higher the resolution of the image sensor. However, there is often a trade-off between resolution and cost. Highly sensitive image sensors for long ranging sensing applications are typically expensive and are at low resolution, mostly because the active pixel size is increased to capture more light. In particular, for sensors with 3-dimensional applications, for example, depth sensing, it is desirable to improve the resolution of these types of sensors without increasing their cost.

One optical component is the liquid crystal polarization grating (LCPG), which provides beam steering capabilities. When one LCPG is used, 1-dimensional beam steering capabilities can be achieved. When two LCPGs are stacked in the same orientation, wide angle 1-dimensional beam steering capabilities can be achieved. When two LCPGs are stacked orthogonally, 2-dimensional beam steering capabilities can be achieved. By stacking multiple LCPGs in the same orientation and orthogonally, wide angle 2-dimensional beam steering capabilities can be achieved.

As described herein, LCPGs can be used in imaging devices to improve their resolution. In the present disclosure, an imaging device has an image sensor and one or more LCPGs that are used to steer light from different points of an object to the same pixel on an image sensor sequentially. Importantly, intermediate images are created by using the one or more LCPGs to steer light onto the image sensor in a sequential manner, and a combined overall image is created from the intermediate images.

The intermediate images could consist of a first intermediate image that is not deflected and a second intermediate image that is deflected by the LCPG. Alternatively, the intermediate images could consist of a first intermediate image that is deflected by the LCPG in one direction and a second intermediate image that is deflected by the LCPG in another direction. Either way, when the two intermediate images are combined together by an appropriate image combination routine, the combined overall image has an effective resolution that is double the resolution of the first or second intermediate image. Clearly, this concept of the present disclosure can extend to much more complicated configurations of intermediate images than the two examples described above.

An illumination source can be used to illuminate the object. The illumination source could emit infra-red light, visible light or ultra-violet light. The illumination source could be a laser, which emits coherent light, or the illumination source could be a non-coherent light source. In some examples, the illumination source could emit a diffused and uniform cone of light (and the imaging device may further comprise a diffuser). In other examples, the illumination source could emit structured light (and the imaging device may further comprise another optical component to replace the diffuser). Various structured light schemes may be used such as spatial multiplexing (in which the light source is collimated and a diffractive optical element is used to create a special correlation pattern), range multiplexing (in which the light source is diffused and a static pattern is created having intensity that varies across a scene) or temporal multiplexing (in which the light source is collimated and a 1D MEMS and line lens projector are used to create a pattern that varies over time).

Light from the illumination source can also be steered by one or more LCPGs such that a part of the object is illuminated by the illumination source. Importantly, the LCPGs steers the light such that it is directed to a different part of the scene other than the non-deflected part of the scene.

The wavelength of the illumination source can be tuned to apply fine control to the beam steering for example with or without the one or more LCPGs applying deflections to the illumination source. Thus, by altering the wavelength of the illumination source, fine beam steering adjustments can be made alongside the relatively coarse control applied by the one or more LCPGs on light generated by or reflected from the scene.

Figure 13:
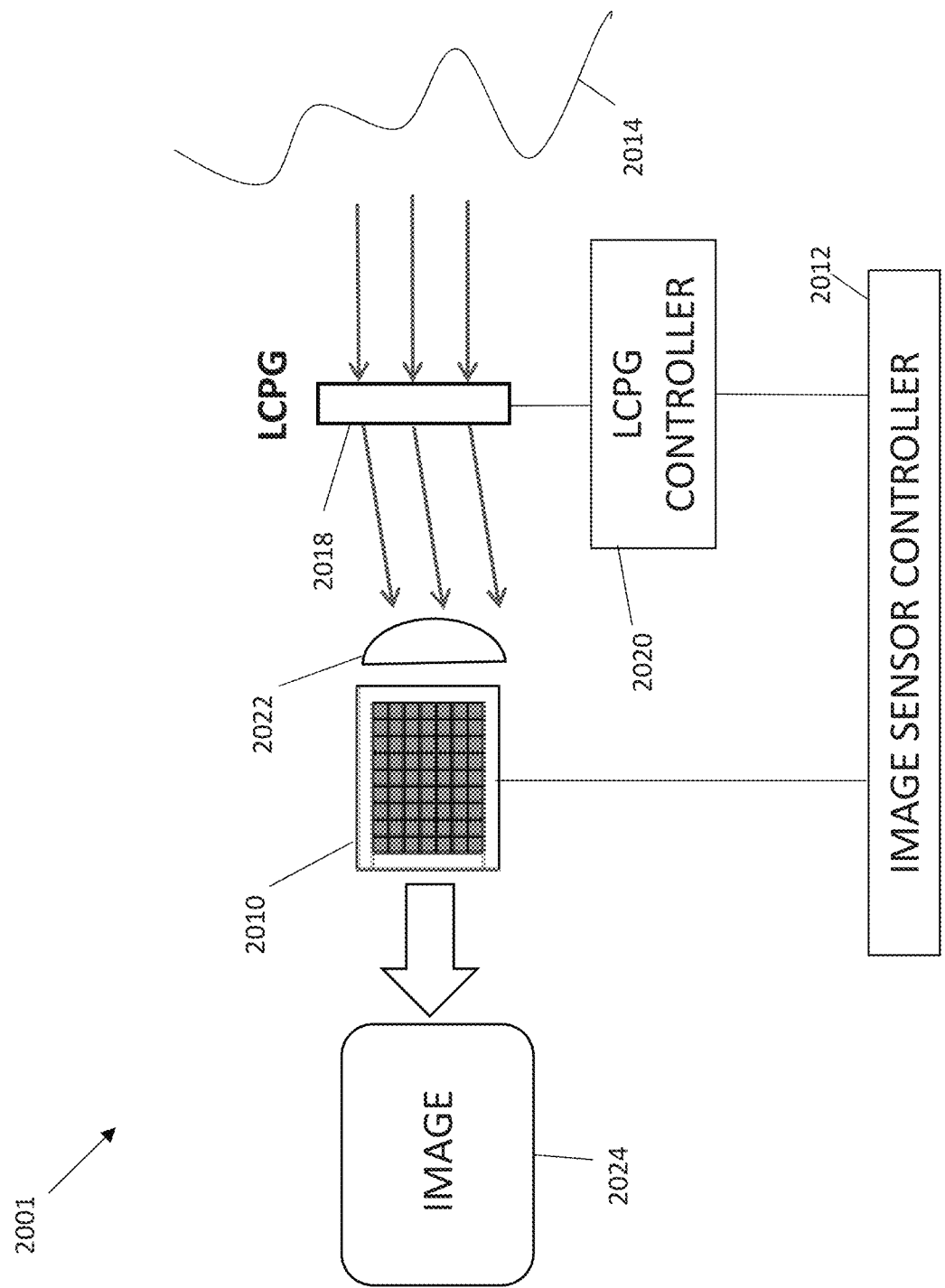
FIG. 13 is a system block diagram of an image sensor in accordance with a first example of the second and third aspects of the present disclosure.

FIG. 13 illustrates a first example of the present disclosure, being an imaging device 2001 comprising an image sensor 2010 and a LCPG 2018. The image sensor may be an infrared sensor or time-of-flight sensor. More specifically, the image sensor may be a 2D or 3D image sensor, for example, a time-of-flight 3D depth sensor. In other examples, the image sensor may be a monochromatic 2D image sensor that provides static or dynamic 2D capture. Overall control of image sensor 2001 is provided by an image sensor controller 2012, which in turn controls a specific LCPG controller 2020. It will however be appreciated that the image sensor 2010 and the LCPG 2012 may be controlled by a single controller. The LCPG 2018 is a single layer LCPG with same orientation stacked gratings to permit 1-dimensional beam steering of a beam of light passing through the LCPG 2018. However, it will be appreciated that multiple layer LCPGs with at least one LCPG stacked orthogonally to another LCPG can be used to provide 2-dimensional beam steering. A lens 2022 is also provided in front of the image sensor 2010 to focus light onto the image sensor 2010.

Figure 14:
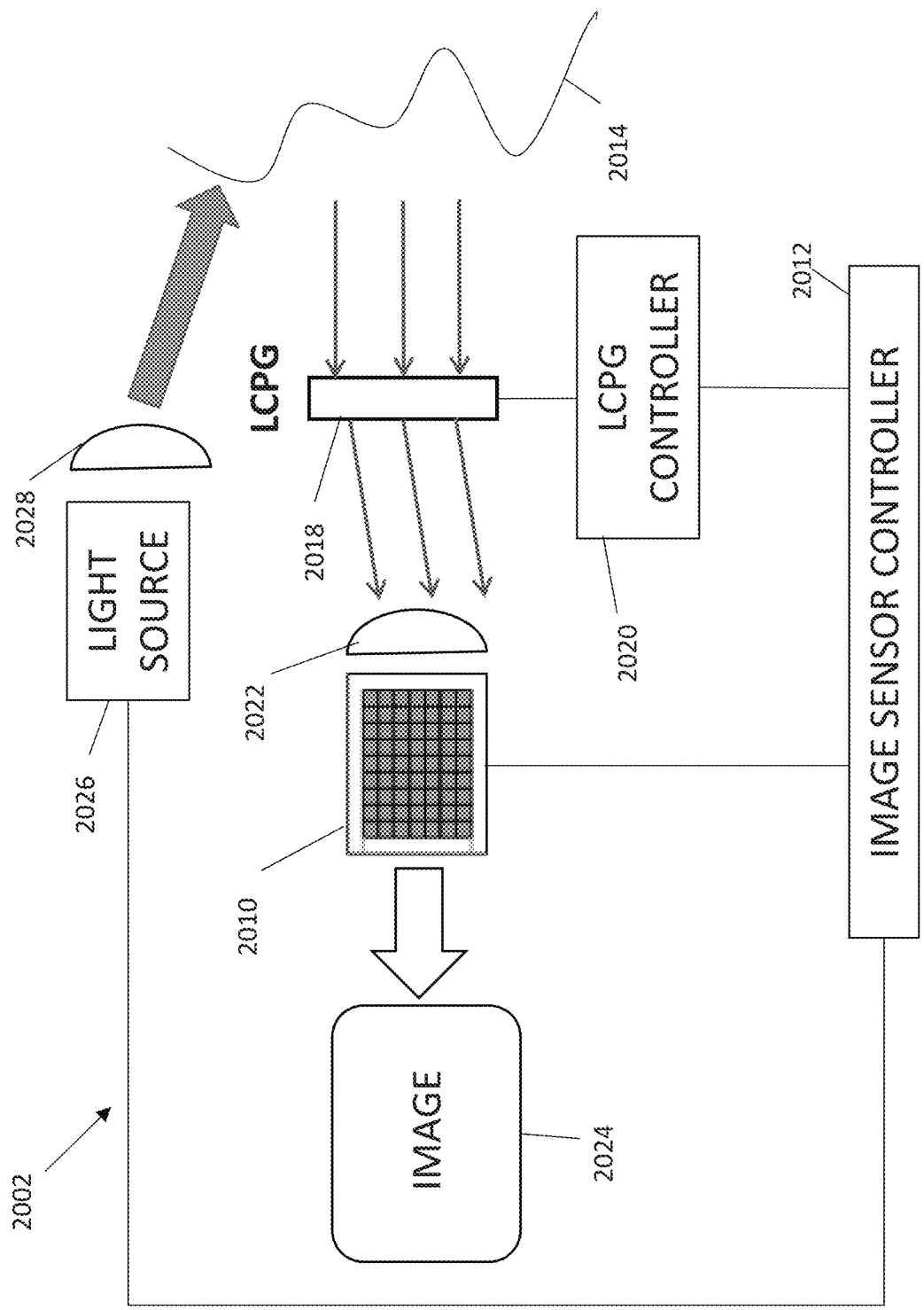
FIG. 14 is a system block diagram of an image sensor in accordance with a second example of the second and third aspects of the present disclosure.

FIG. 14 provides a second example of the present disclosure. In this example, a light source 2026 used to illuminate the object 2014 via diffuser 2028 is also shown, the light source 2026 being controlled by the image sensor controller 2012 to project a beam of light onto the object, which is reflected back to the image sensor 2010. The light source 2026 may be a tunable wavelength light source.

The light source 2026 is usually a linearly polarized light source. However, LCPGs are configured to steer circular polarized light in dependence on the polarization state of the input light. For example, in a ternary LCPG, the light is steered into three possible directions according to the following equation:

$$\theta_{out} = \sin^{-1}\left(\frac{m\lambda}{\Lambda} + \sin\theta_{in}\right) \quad [2\text{-}1]$$

where $\lambda$ is the wavelength of the incident light, $\Lambda$ is the grating pitch, and m=0 and m=±1 depending on whether the incident light is left-handed or right-handed circular polarized light.

Consequently, a quarter wave plate (not shown) is used to convert the linearly polarized light into circular polarized light before it passes through the LCPG 2018, the linearly polarized input light being converted into either right-handed or left-handed circular polarized light. For example, the quarter wave plate may be incorporated into the LCPG 2018 arrangement such that it sits immediately in front of one of or each of the LCPGs. As such, the polarization state incident on any particular LCPG can be controlled through the provision of a quarter wave plate, and thus the use of multiple quarter wave plates can increase the range of possible steering angles. That is to say, one or more quarter wave plates are used to control the type of polarization of the light incident on the LCPGs and the amount by which they are capable of steering the light.

Figure 15:
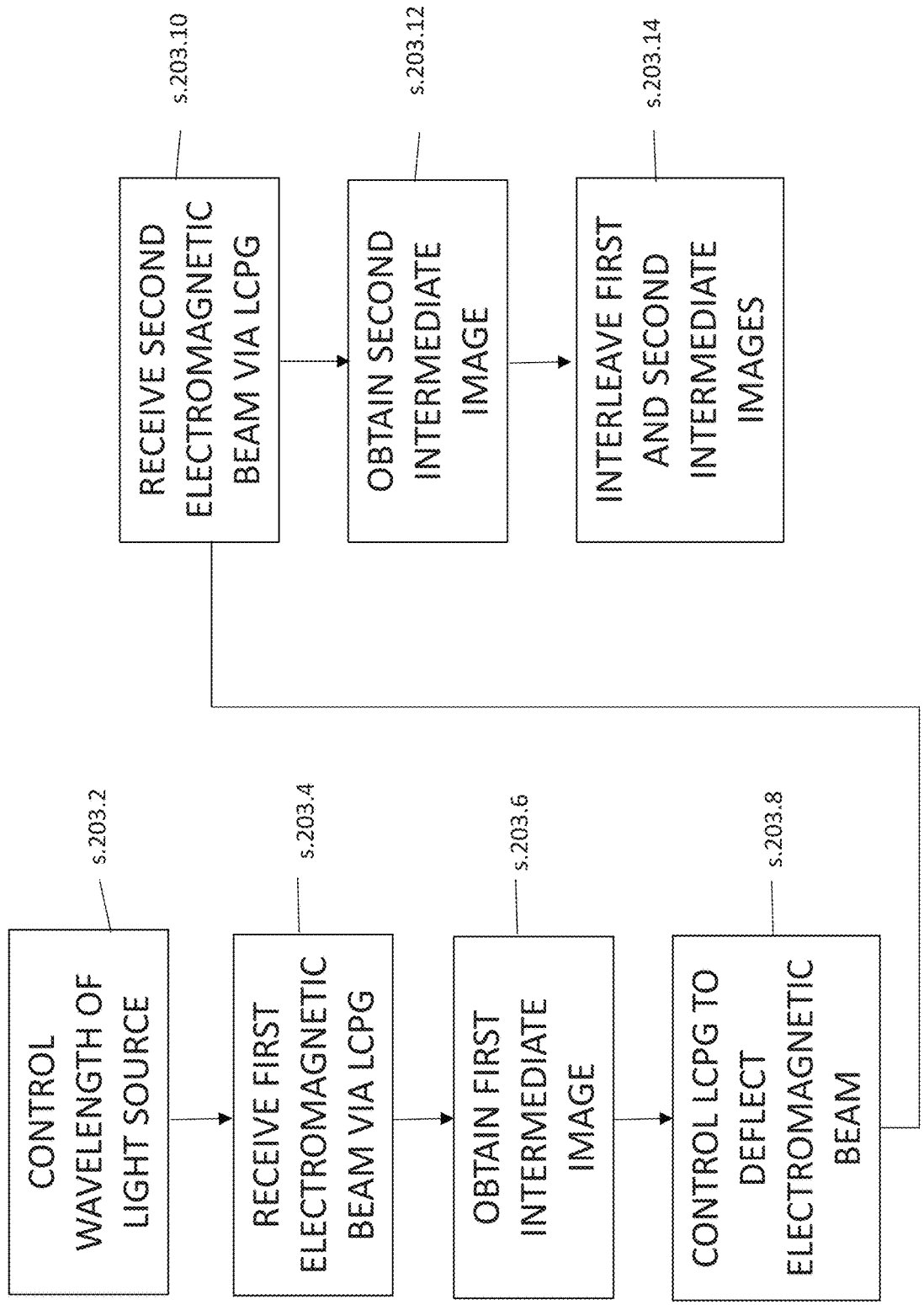
FIG. 15 is a flow diagram illustrating the operating of the image sensor in accordance with the second example of the second and third aspects of the present disclosure.

The operation of the imaging device 2 will now be described with reference to FIG. 15. At step s.203.2, the wavelength of the illumination source is controlled to output an electromagnetic beam of wavelength A. The electromagnetic beam shines on an object in a scene and is reflected back to an image sensor. At step s.203.4, a first reflected electromagnetic beam is received at the image sensor via a LCPG. The LCPG is controlled such that the electromagnetic beam is not deflected. At step s.203.6, a first intermediate image is obtained at the image sensor by reading the values of the pixels. At step s.203.8, the LCPG is controlled such that the electromagnetic beam is deflected relative to the non-deflected beam. This deflection is relatively coarse compared with the fine-tuning provided by the control of wavelength of the illumination source. At step s.203.10, a second reflected electromagnetic beam is received at the image sensor via the LCPG. At step s.203.12, a second intermediate image is obtained at the image sensor by reading the values of the pixels. At step s.203.14, the first and second intermediate images are combined into an overall image by interleaving using time-division multiplexing.

In terms of the mathematics behind obtaining a combined output in examples of the present disclosure, we can consider two simple cases of an image sensor having two pixels side by side.

In FIG. 11A, two pixels side by side having values 48 and 78 are shown. These two pixels are read by an image sensor with no gaps in between the pixels and represent a first FOV of a scene. In FIG. 11B, the FOV is shifted slightly to the right by a sub-pixel's pitch to a second FOV and now the two pixels have values 56 and 90, respectively. In FIG. 110, intermediates images representative of the first FOV and the second FOV are combined by applying a mathematical function to the pixel values obtained from each FOV. Provided that the scene remains identical between the first FOV and the second FOV and the image sensor response across its sensing area is uniform, in the resultant combined image created from the intermediate images, there are effectively half size pixels with their own unique values, thus improving resolution of the image sensor. The combined result is shown in FIG. 11D.

In FIG. 12A, two pixels side by side representative of a first FOV and having values 48 and 78 are shown. However, in contrast to FIG. 11A, there is a gap in between the two pixels. This could represent dead space between the pixels or missing pixels, for example, to accommodate for readout circuitry. In FIG. 12B, the FOV is shifted slightly to the right to a second FOV and now the two pixels have values 52 and 83, respectively, and it can be seen that the second FOV is shifted across by an entire pixel's pitch. In FIG. 12C, intermediate images representative of the first FOV and the second FOV are combined by interleaving. The combined result is shown in FIG. 12D.

FIGS. 16 to 19 are system block diagrams and of an image sensor that illustrate how 2-dimensional spatial resolution of a scene 2014 can be improved using the techniques of the present disclosure in a third example of the present disclosure. Specifically, frames 2030, 2040, 2050, 2060 show how the scene 2014 is captured from four FOVs.

In the third example of the present disclosure, assuming an imager with 80×80 pixels (Npix) and 50 degree FOV (AFOV), then the angular resolution for each pixel is:

$\alpha_{pix(x)}$=FOV*π/(180*Npix) in radians, since resolution is same for X and Y $\alpha_{pix(Y)}$=$\alpha_{pix(X)}$.

To double the resolution in the X and Y direction, the beam must be steered $\alpha_{pix(X)}/2$ in X and Y. This is accomplished by operating the LCPG in four phases:

1$^{st}$ Frame: X Drive=0; Y Drive=0
2$^{nd}$ Frame: X Drive=$\alpha_{pix(X)}/2$; Y Drive=0
3$^{rd}$ Frame: X Drive=$\alpha_{pix(X)}/4$; Y Drive=$\alpha_{pix(Y)}/2$
4$^{th}$ Frame: X Drive=$-\alpha_{pix(X)}/4$; Y Drive=$\alpha_{pix(Y)}/2$ In this specific example $\alpha_{pix(X)}$=11 mrad.

The imaging device 2003 comprises the same components as the imaging device 2002 of FIG. 14 except the LCPG is a multi-layer LCPG with at least one LCPG stacked orthogonally to another LCPG so as to provide 2-dimensional beam steering. LCPG 2018 is controlled by an X drive for controlling horizontal deflection of the electromagnetic beam and a Y drive for controlling vertical deflection of the electromagnetic beam. In FIG. 11A to 12D and FIGS. 16 to 17, the light source is a laser that emits IR light.

Figure 16:
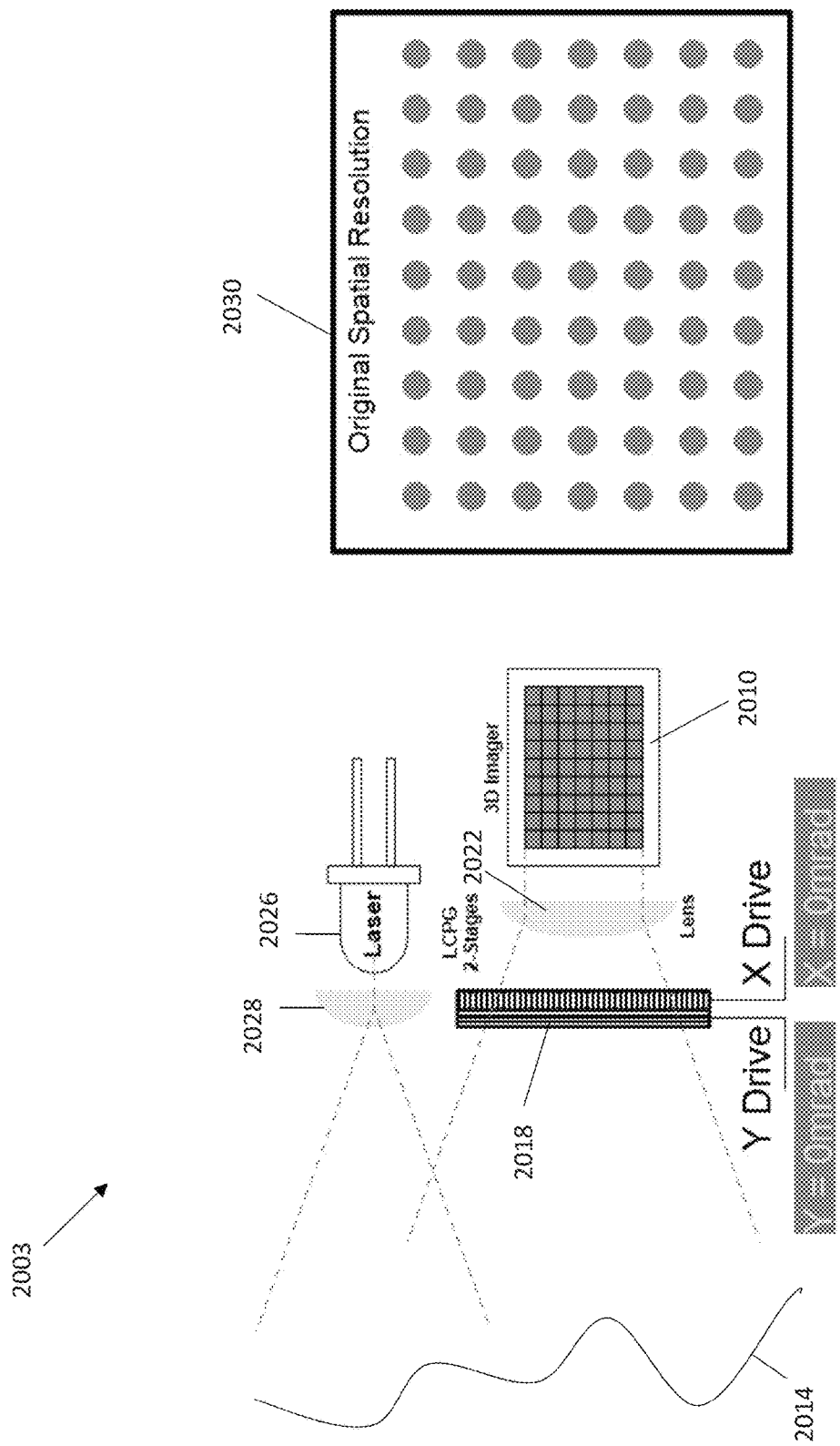
FIGS. 16 to 19 are system block diagrams and of an image sensor in accordance with a fourth example of the second and third aspects of the present disclosure.

In FIG. 16, the frame 2030 shows an original spatial resolution of the captured scene without any deflections being applied by the LCPG. Frame 2030 is representative of the spatial resolution that is obtained from a first intermediate image.

Figure 17:
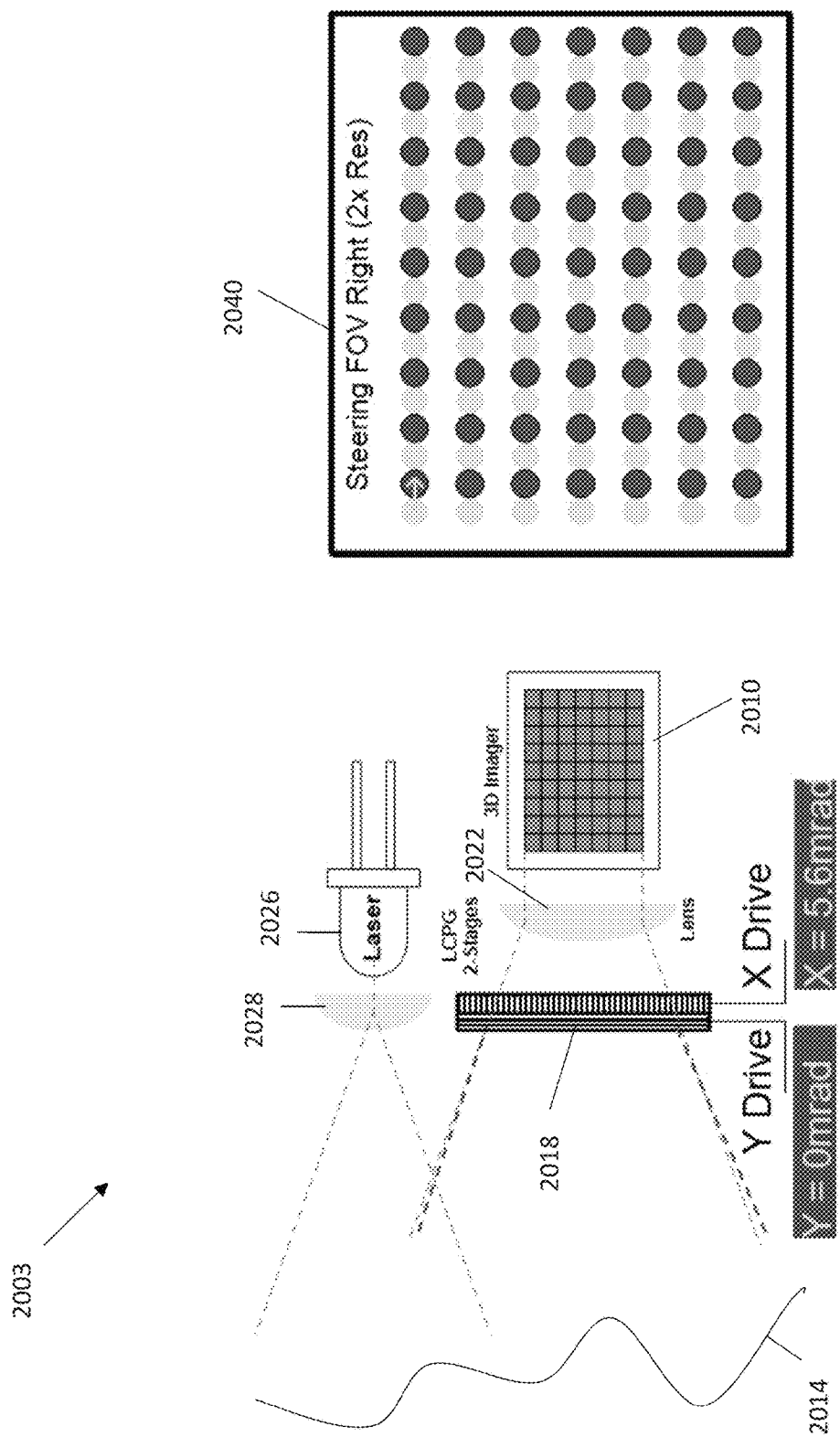

In FIG. 17, a signal causing a deflection of 5.4 mrad is applied to the X drive. Frame 2040 represents a FOV that is shifted to the right relative to frame 2030 and is used to obtain a second intermediate image. When the first and second intermediate images are combined, the horizontal spatial resolution is increased compared with the original spatial resolution that is obtained from a first intermediate image. In an ideal scenario whereby the optics of the device are ideal and the diffraction and resolution of the lens are not limited, the spatial resolution may be effectively substantially doubled.

Figure 18:
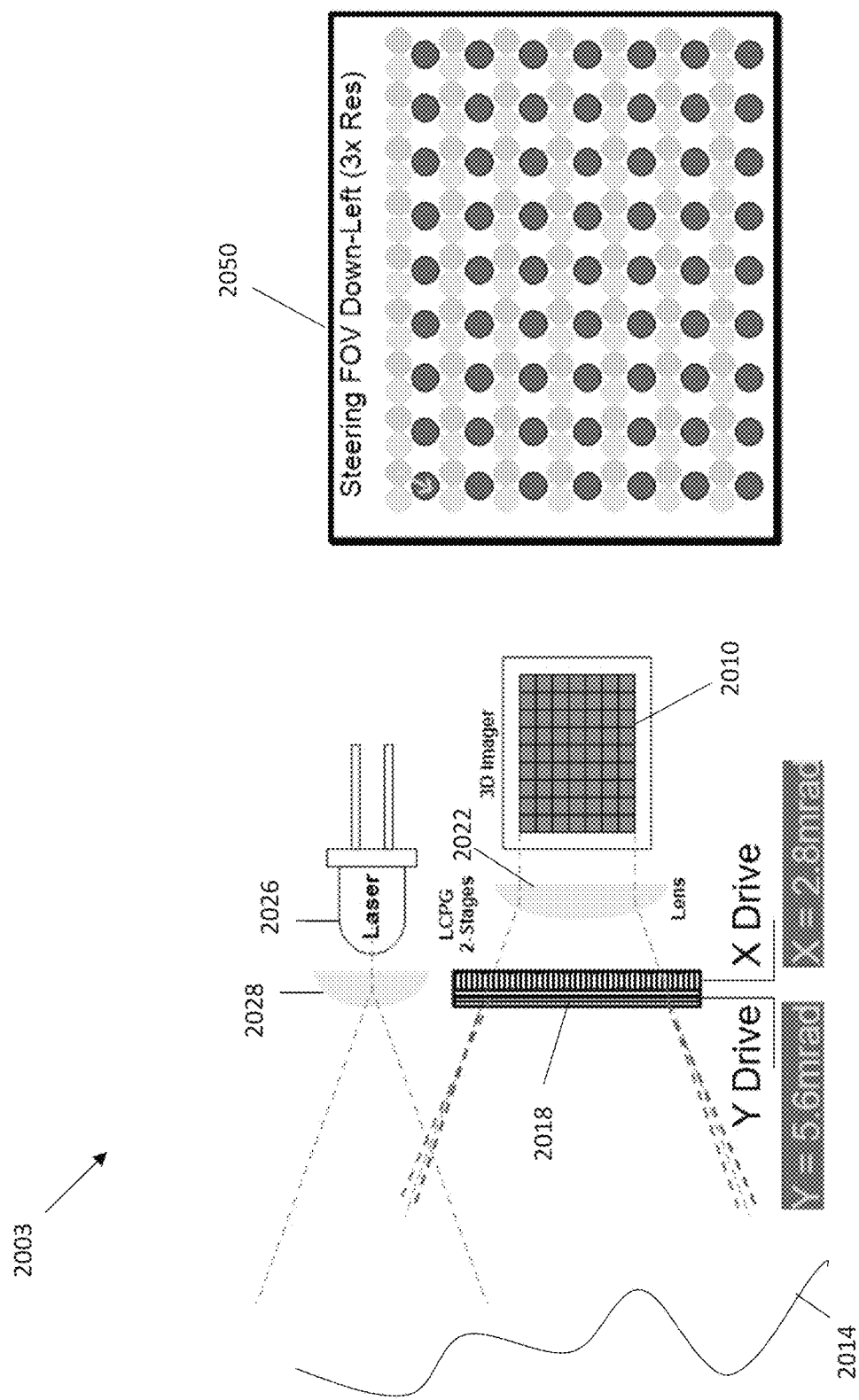

In FIG. 18, a signal causing a deflection of 2.7 mrad is applied to the X drive and a signal causing a signal causing a deflection of 5.4 mrad is applied to the Y drive. Frame 2050 represents a FOV that is shifted to the down and left relative to frame 2040 is used to obtain a third intermediate image. When the first, second and third intermediate images are combined, the resulting spatial resolution is improved further compared with the spatial resolution that is obtained from combining the first and second intermediate images. In an ideal scenario the spatial resolution may be effectively substantially tripled relative to the original resolution obtained from just one FOV.

Figure 19:
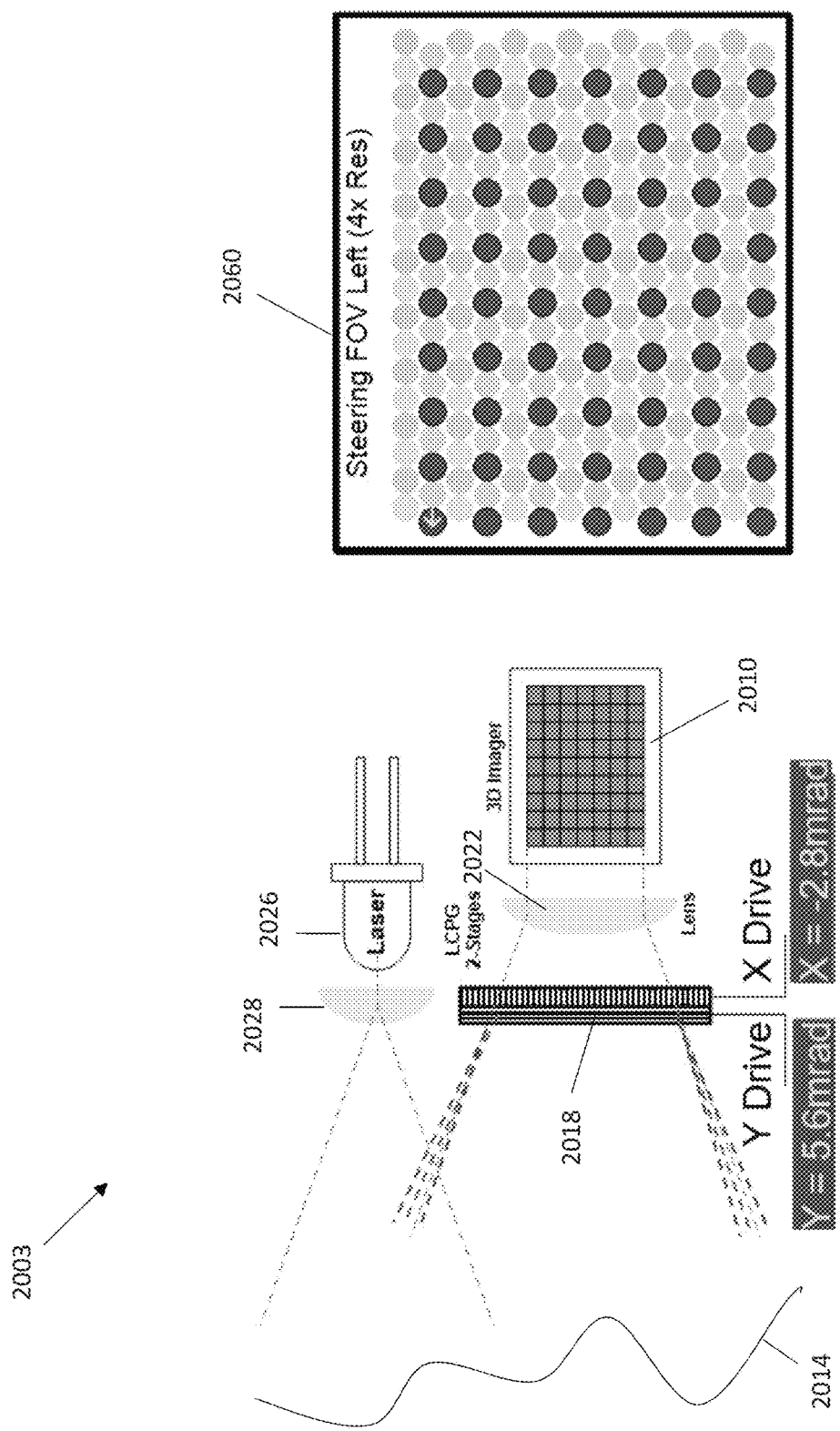

In FIG. 19, a signal causing a deflection of −2.7 mrad is applied to the X drive and a signal causing a deflection of 5.4 mrad is applied to the Y drive. Frame 2060 represents a FOV that is shifted to the left relative to frame 2050 is used to obtain a fourth intermediate image. When the first, second, third and fourth intermediate images are combined, effectively, the spatial resolution is improved yet further compared with the original spatial resolution that is obtained from combining the first, second and third intermediate images. Both the horizontal and vertical direction spatial resolutions have been substantially improved and, in an ideal scenario, the spatial resolution may be effectively substantially quadrupled relative to the original resolution obtained from just one FOV.

The deflections of the electromagnetic beam enabled by the X and Y drives in the third example of the present disclosure are of a magnitude such that they cause deflection of the electromagnetic beam onto the image sensor 2010 by less than a pitch of the pixels of the image sensor. However, in other examples of the present disclosure, the one or more LCPGs are controlled to cause deflection of the electromagnetic beam onto the image sensor by a non-integer multiple of a pitch of the pixels of the image sensor.

Thus far we have described an example which makes use of one or more LCPGs to deflect an incoming electromagnetic beam such that the electromagnetic beam is directed from a different FOV other than the non-deflected FOV onto the image sensor. However, an outgoing electromagnetic beam can also be deflected before it reaches the object or scene by the one or more LCPGs.

Figure 20:
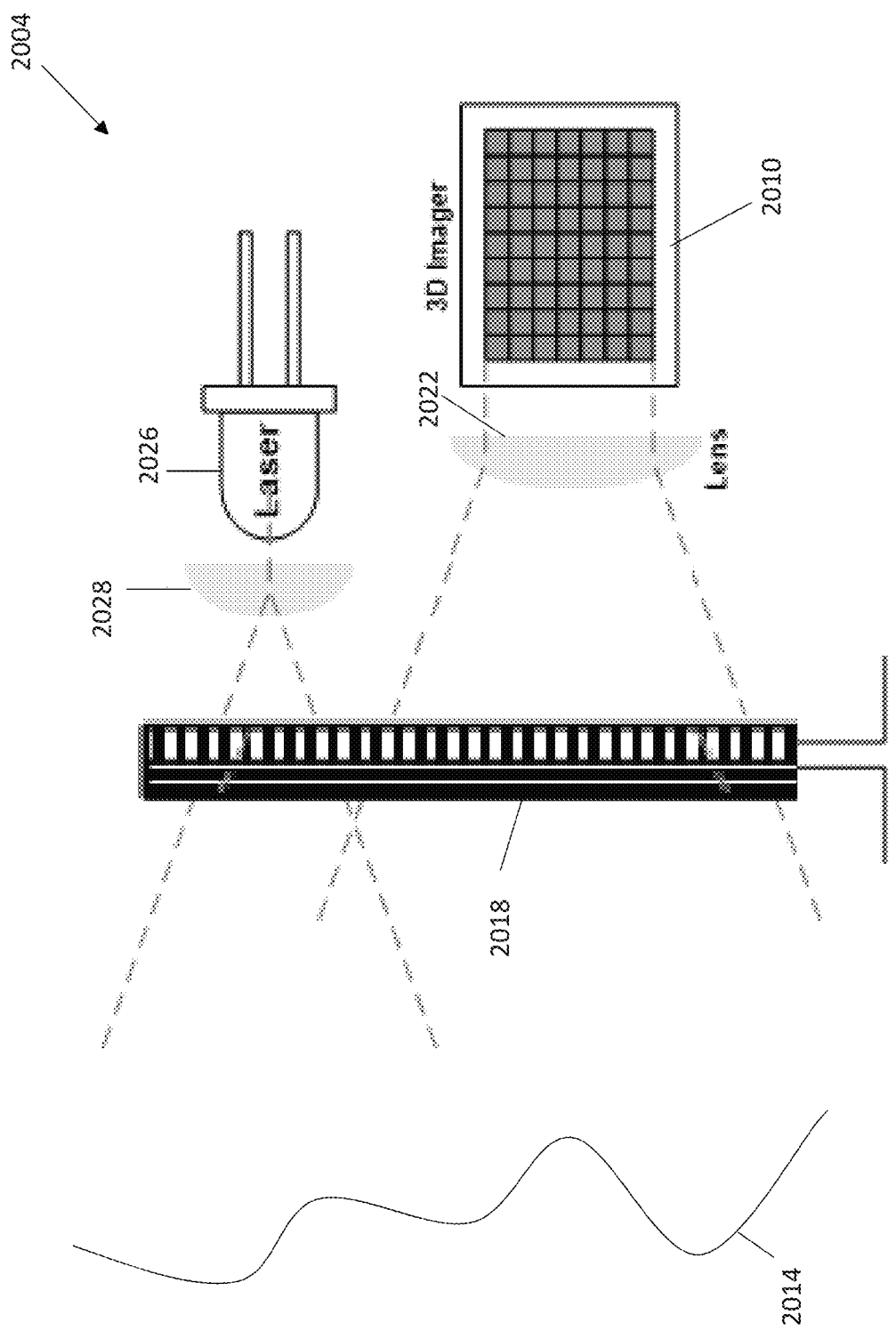
FIG. 20 is a system block diagram of an image sensor in accordance with a fifth example of the second and third aspects of the present disclosure.

In FIG. 20, in the imaging device 2004 of the fourth example of the present disclosure, both the outgoing light from the light source 2026 and the incoming light onto the image sensor passes through the same LCPG 2018. The LCPG 2018 is arranged to apply a deflection to the electromagnetic beam such that the electromagnetic beam can be directed to a different part of the scene other than the non-deflected part of the scene. Since the incoming reflected electromagnetic beam is deflected by the same amount as the outgoing electromagnetic beam in the opposite direction, the received electromagnetic beam on the image sensor is directed to the same pixel as if the LCPG 2018 were not present and the scene was actually directly in front of the image sensor. As such, each time a deflection of the electromagnetic beam is caused by the LCPG 2018, an additional intermediate image is formed and thus used to create an overall combined image after time-division multiplexing the individual intermediate images.

In the fourth example of the present disclosure, the one or more LCPGs are controlled to cause deflection of the electromagnetic beam from the illumination source onto a part of the scene such that the electromagnetic beam that is received by the image sensor shifts by a non-integer multiple of a pitch of the pixels of the image sensor. Coarse beam steering of the FOV may be achieved by using the one or more LCPGs to deflect the electromagnetic beam and shifting by finer amounts may be achieved by tuning the wavelength of the light source, for example, as will be described in more detail below with reference to FIGS. 22A and 22B.

However, in other examples of the present disclosure, the one or more LCPGs are controlled to cause deflection of the electromagnetic beam from the illumination source onto a part of the scene such that the electromagnetic beam that is received by the image sensor shifts by a distance of less than a pitch of the pixels of the image sensor. Shifting the illumination source by sub-pixel amounts is particularly advantageous if a structured light source is used.

Figure 21:
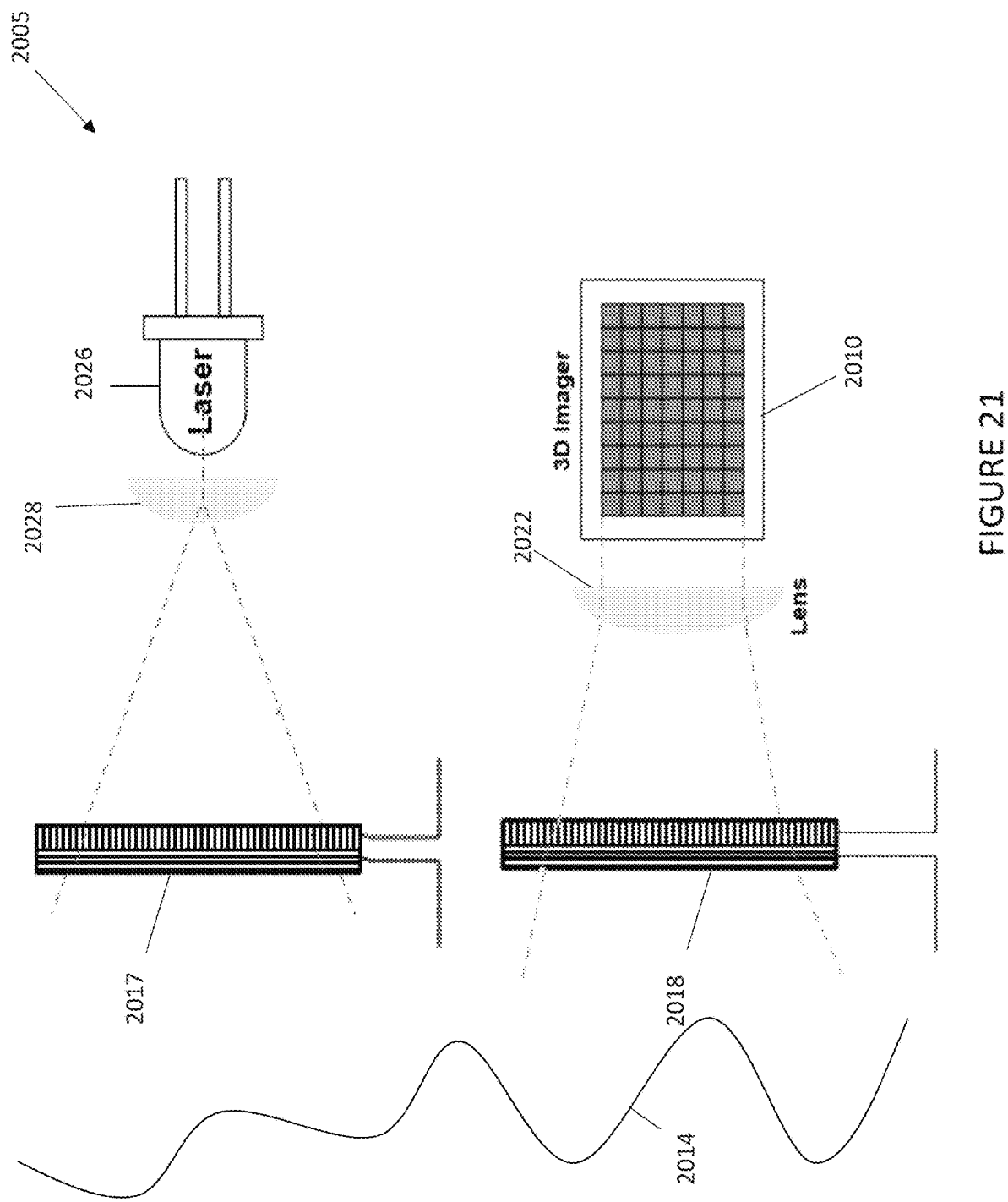
FIG. 21 is a system block diagram of an image sensor in accordance with a sixth example of the second and third aspects of the present disclosure.

In FIG. 21, the outgoing light from the light source 2026 is steered through a first LCPG 2017 and the incoming light onto the image sensor passes through a second LCPG 2018 in a fifth example of the present disclosure. An advantage of this arrangement of the fourth example shown in FIG. 21 is that different degrees of deflection can be applied by the first and second LCPGs, respectively. This way, the resolution of the imaging device 2005 is improved in a two-fold manner, firstly by sub-pixel illumination of a part of the scene, for example, emitted from a structured light source, and secondly, by sub-pixel deflection of the electromagnetic beam onto the image sensor.

Figures 22A, 22B:
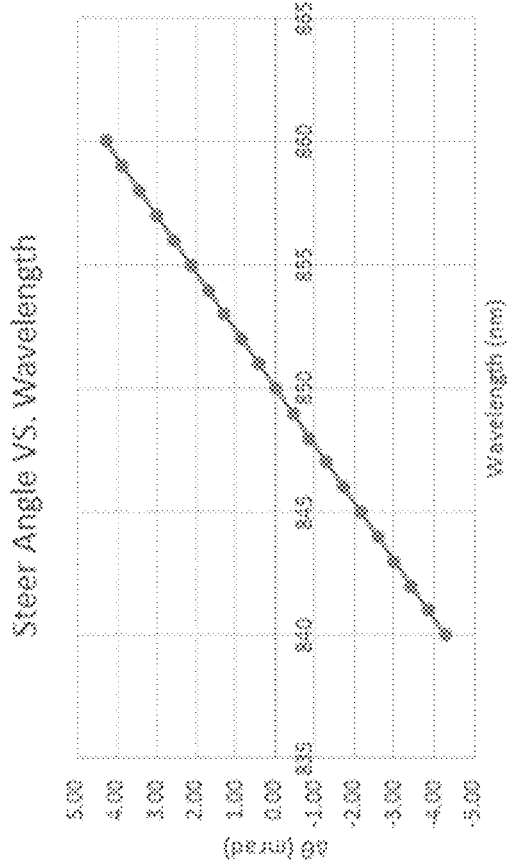
FIGS. 22A and 22B are a table and a graph, respectively, which illustrate further details of examples of the second and third aspects of the present disclosure.

FIGS. 22A and 22B show how changing the wavelength of the illumination source can apply a fine controllable deflection to the electromagnetic beam when it passes through a LCPG relative to a coarse controllable deflection to the electromagnetic beam applied by the one or more LCPGs.

The relationship between steering angle and wavelength is $\theta = \sin^{-1}(\lambda/\Lambda)$. Thus, the steering angle can be calculated for different wavelengths of light, as shown in the table of FIG. 22A and the graph of FIG. 22B. Here, example steering angles are shown for an 850 nm illumination source with +/-10 nm wavelength variation.

Together with coarse deflections such as those of the third example, fine deflections can be applied to the electromagnetic beam by adjusting the wavelength of the illumination source by controlling temperature and/or current, for example. With such solution, an electromagnetic beam can be steered at large and small intervals depending upon what is required for a particular application. An advantage of using wavelength tuneability in addition to steering using one or more LCPGs is that fewer LCPGs in the stack may be used to achieve the desired degree of control over steering of the electromagnetic beam. Better optical efficiency may be achieved since some light is lost as it passes through each LCPG and so a LCPG stack with fewer LCPGs in the stack permits more light to reach the object or scene being illuminated.

With respect to the electromagnetic wavelengths of operation of the beam scanner and receiver arrangements described above, anticipated wavelengths of operation extend from the infra-red (IR) band to the ultra-violet (UV) band, through the visible light spectrum. Depending on the application, the choice of wavelength brings numerous advantages: To prevent visible distractions, wavelengths such as IR or UV that are not visible to humans could be used; The use of certain IR wavelengths, which are not found in sunlight, would make the system appropriate for use in outdoor applications; The use of specific wavelengths of visible or UV light, that are reflected or absorbed by an object, would improve object detection.

Various further examples of the second aspect of the disclosure will be apparent from the following features, defining further examples of the disclosure. Where a feature of a later example refers to one or more earlier examples, the examples may be considered in combination to provide further examples.

A first example describes a method of increasing the resolution of an image sensor comprising a plurality of pixels, the method comprising: receiving a first incident electromagnetic beam generated by or reflected from remote objects at each of the plurality of pixels via one or more liquid crystal polarization gratings (LCPGs), wherein the one or more LCPGs are controllable to apply a deflection to the electromagnetic beam such that the electromagnetic beam is directed from a different field of view (FOV) of a scene other than the non-deflected FOV of the scene onto the image sensor; obtaining a first intermediate image by reading a signal representative of the first incident electromagnetic beam at each of the plurality of pixels for a first FOV; receiving a second incident electromagnetic beam generated by or reflected from the remote objects at each of the plurality of pixels via the one or more LCPGs that is deflected relative to the first incident electromagnetic beam; obtaining a second intermediate image by reading a signal representative of the second incident electromagnetic beam at each of the plurality of pixels for a second FOV; and multiplexing the first and the second intermediate images together to create a combined higher resolution image output of the image sensor.

The step of controlling the one or more LCPGs of the previous example may further cause deflection of the electromagnetic beam onto the image sensor by less than a pitch of the pixels of the image sensor.

The step of controlling the one or more LCPGs of the first example may further cause deflection of the electromagnetic beam onto the image sensor by a non-integer multiple of a pitch of the pixels of the image sensor.

In a fourth example, the method of the first example further comprises generating an electromagnetic beam from an illumination source for illuminating a part of the scene.

In a fifth example, the method of the previous example may further comprise arranging the one or more LCPGs to apply a deflection to the electromagnetic beam such that the electromagnetic beam is directed to a different part of the scene other than the non-deflected part of the scene.

The step of controlling the one or more LCPGs in the previous example may further cause deflection of the electromagnetic beam from the illumination source onto a part of the scene such that the electromagnetic beam that is received by the image sensor shifts by a distance of less than a pitch of the pixels of the image sensor.

The step of controlling the one or more LCPGs in the fifth example may further cause deflection of the electromagnetic beam from the illumination source onto a part of the scene such that the electromagnetic beam that is received by the image sensor shifts by a non-integer multiple of a pitch of the pixels of the image sensor.

The fourth example may further comprise changing a wavelength of the illumination source, wherein the change in wavelength of the illumination source applies a fine controllable deflection to the electromagnetic beam when it passes through the one or more LCPGs, and the one or more LCPGs applies a coarse controllable deflection to the electromagnetic beam.

The step of multiplexing the first and the second intermediate images together in the first example may comprise time-division multiplexing.

In a tenth example an imaging device comprises: one or more liquid crystal polarization gratings (LCPGs), wherein the one or more LCPGs are controllable to apply a deflection to the electromagnetic beam such that the electromagnetic beam is directed from a different field of view (FOV) other than the non-deflected FOV onto the image sensor; and an image sensor comprising a plurality of pixels, responsive to electromagnetic beams directed by the one or more LCPGs so as to be incident thereon to generate a signal representative of the incident electromagnetic beams, an imaging controller for controlling the one or more LCPGs so as to direct electromagnetic beams from a first and a second FOV onto each of the plurality of pixels to create a first and a second intermediate image, respectively, so as to create a combined higher resolution image output of the image sensor.

The one or more LCPGs of the previous example may be further controlled to cause deflection of the electromagnetic beam onto the image sensor by less than a pitch of the pixels of the image sensor.

The one or more LCPGs of the tenth example may be further controlled to cause deflection of the electromagnetic beam onto the image sensor by a non-integer multiple of a pitch of the pixels of the image sensor.

In a thirteenth example, the imaging device of the tenth example may further comprise an illumination source for emitting an electromagnetic beam.

In a fourteenth example, the one or more LCPGs of the thirteenth example may be further arranged at the illumination source such that electromagnetic beam is capable of being directed to different parts of the scene.

The one or more LCPGs of the previous example may be further controlled to cause deflection of the electromagnetic beam onto a part of the scene such that the electromagnetic beam that is received by the image sensor shifts by a distance of less than a pitch of the pixels of the image sensor.

The one or more LCPGs of the fourteenth example may be further controlled to cause deflection of the electromagnetic beam onto a part of the scene such that the electromagnetic beam that is received by the image sensor shifts by a distance of a non-integer multiple of a pitch of the pixels of the image sensor.

In a seventeenth example, the illumination source of the thirteenth example is configured to emit structured light.

In an eighteenth example, the one or more LCPGs of the tenth example may further comprise a plurality of LCPGs arranged in a stack.

The plurality of LCPGs in the eighteenth example may further comprise at least one LCPG arranged orthogonally to another LCPG to permit for two-dimensional deflection of the electromagnetic beam.

In a twentieth example, the plurality of LCPGs in the eighteenth example may further comprise at least two LCPGS arranged in the same orientation to permit for greater angular deflection of the beam than available from a single grating.

Third Aspect of the Disclosure: Image Sensor Using Liquid Crystal Polarization Grating An image sensor is a sensor that detects and conveys image information by converting light into electrical signals. An image sensor typically has a matrix of pixels, each pixel receiving incoming light and converting it into a value. When the values of all of the pixels are combined, they can form a representative image of the scene that is being captured.

The number of pixels of an image sensor can determine the resolution of the resulting image. Thus, the higher the number of pixels, the higher the resolution of the image sensor. However, there is often a trade-off between resolution and cost. Highly sensitive image sensors for long ranging sensing applications are typically expensive and are at low resolution. In particular, for sensors with 3-dimensional applications, for example, depth sensing, it is desirable to improve the resolution of these types of sensors without increasing their cost.

Therefore, in the present disclosure, techniques are described for identifying a region-of-interest (ROI) in an image and then only providing improved resolution for a field of view (FOV) having that ROI. In certain cases, the ROI could be identified by identifying a change in image over time. In these cases, the ROI may represent a moving target and therefore changes by size or location over time.

The higher resolution image may be generated for only part of a scene having the ROI, with the remaining parts of the scene imaged using a lower resolution or the native resolution. The generation of the higher resolution image for the wider FOV containing the ROI may be caused to happen automatically by an image controller. Thus, it is possible to automatically continuously swap from high-frame-rate/low-spatial-resolution to low-frame-rate/high-spatial-resolution depending on the specific use case or the scene being imaged. Alternatively, this step could be performed manually.

Then, by combining the higher resolution image and the lower resolution images to create an image of the entire scene, the time required to generate the image of the entire scene may be minimized whilst still imaging the ROI to a high resolution.

One optical component is the liquid crystal polarization grating (LCPG), which provides beam steering capabilities. When one LCPG is used, 1-dimensional beam steering capabilities can be achieved. When two LCPGs are stacked in the same orientation, wide angle 1-dimensional beam steering capabilities can be achieved. When two LCPGs are stacked orthogonally, 2-dimensional beam steering capabilities can be achieved. By stacking multiple LCPGs in the same orientation and orthogonally, wide angle 2-dimensional beam steering capabilities can be achieved.

As described herein, LCPGs can be used in imaging devices to improve their resolution. The LCPGs are used in two ways. Firstly, one or more LCPGs are used to image different parts of an object or scene, i.e. light is steered from a plurality of FOVs onto the image sensor. The images obtained therefrom are analyzed in order to identify which FOV contains a ROI (if any). Secondly, once a ROI has been identified (with or without scanning a scene using the one or more LCPGs across a wider FOV than the native FOV of the image sensor), the one or more LCPGs may be used again to obtain a higher resolution image for the FOV having the ROI. It will be appreciated that, in the approach including scanning a scene using the one or more LCPGs across a wider FOV than the native FOV of the image sensor, alternative methods can be used to obtain the higher resolution image, for example, a higher resolution imager may be used for the FOV having the ROI than the other FOVs.

To expand upon the second way that the one or more LCPGs may be used in the present disclosure, an imaging device has an image sensor and one or more LCPGs that are used to steer light from different points of an object or scene in the FOV having the ROI to an image sensor sequentially. Importantly, intermediate images are created by using the one or more LCPGs to steer light onto the image sensor in a sequential manner, and a combined overall image is created from the intermediate images.

The intermediate images could consist of a first intermediate image that is not deflected and a second intermediate image that is deflected by the LCPG. Alternatively, the intermediate images could consist of a first intermediate image that is deflected by the LCPG in one direction and a second intermediate image that is deflected by the LCPG in another direction. Either way, when the two intermediate images are combined together by an appropriate image combination routine, the combined overall image has an effective resolution that is double the resolution of the first or second intermediate image. Clearly, this concept of the present disclosure can extend to much more complicated configurations of intermediate images than the two examples described above.

An illumination source can be used to illuminate the object. The illumination source could emit monochromatic infra-red light, visible light or ultra-violet light. The illumination source could be laser, which emits coherent light. In some examples, the illumination source could emit a diffused and uniform cone of light (and the imaging device may further comprise a diffuser). In other examples, the illumination source could emit structured light (and the imaging device may further comprise another optical component to replace the diffuser). Various structured light schemes may be used such as spatial multiplexing (in which the light source is collimated and a diffractive optical element is used to create a special correlation pattern), range multiplexing (in which the light source is diffused and a static pattern is created having intensity that varies across a scene) or temporal multiplexing (in which the light source is collimated and a 1D MEMS and line lens projector are used to create a pattern that varies over time).

Light from the illumination source can also be steered by one or more LCPGs such that a part of the object is illuminated by the illumination source. Importantly, the LCPGs steers the light such that it is directed to a different part of the scene other than the non-deflected part of the scene.

The wavelength of the illumination source can be tuned to apply fine control to the beam steering for examples with or without the one or more LCPGs applying deflections to the illumination source. Thus, by altering the wavelength of the illumination source, fine beam steering adjustments can be made alongside the relatively coarse control applied by the one or more LCPGs on light generated by or reflected from the scene.

Figure 23B:
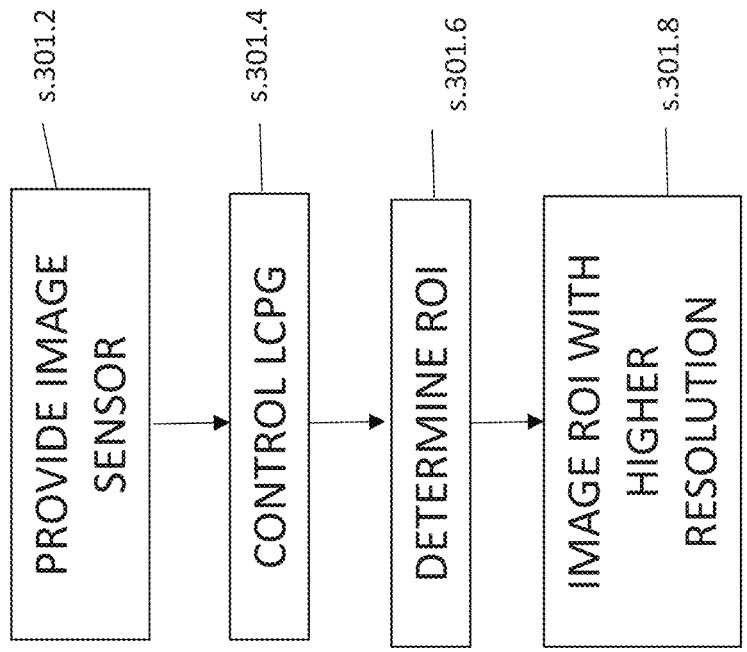
FIG. 23A is a block diagram illustrating the principles of examples of the third aspect of the present disclosure and FIG. 23B is a flow diagram illustrating a method in accordance with examples of the third aspect of the present disclosure.
Figure 23A:
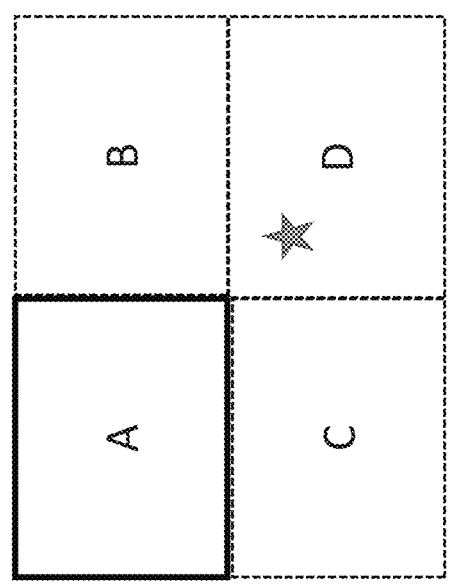

FIG. 23A shows how examples of the present disclosure can work in practice. Region A represents the native FOV of an image sensor. One or more LCPGs can be used to shift the FOV that is received by the image sensor to regions B, C and D. This operation may be controlled by an image controller. Once a ROI (in this example, a star) is identified, the FOV that the ROI is in can be imaged at higher resolution than the other FOVs. Again the operation may be controlled automatically by an image controller.

In other words, a wide FOV is scanned by the image sensor using one or more LCPGs and a region where there is interesting activity is found. Then, the resolution with which that region, the region containing the ROI, is imaged is higher than the native resolution of the image sensor. The higher resolution may be achieved without using a LCPG. Or, the higher resolution may be achieved using one or more LCPGs to shift the incoming light from a scene onto the image sensor and/or outgoing light from an illumination source onto the scene.

In an alternative example, the image sensor only receives information from region A i.e., its native FOV. The scene is monitored for a ROI, and when a ROI is identified, the scene is imaged with a higher resolution than the native resolution of the image sensor using one or more LCPGs.

In other words, a scene is monitored until something relevant happens, then resolution of the image sensor is increased by using one or more LCPGs to shift the incoming light from the scene onto the image sensor and/or by changing the wavelength of an illumination source. Further details about changing the wavelength of an illumination source will be described with reference to FIGS. 22A and 22B.

Now turning to FIG. 23B, a method in accordance with examples of the present disclosure is shown. At step s.301.2, an image sensor is provided. The image sensor has a native FOV and native resolution, and it comprises a plurality of pixels and imaging optics to allow an image to be obtained by the image sensor, the imaging optics including one or more controllable LCPGs. At step s.301.4, the one or more LCPGs are controlled to steer light onto to the image sensor from across a wider FOV than the native FOV to obtain images from across the wider FOV. At step s.301.6, a ROI is determined within the wider FOV and corresponding to a subset of the wider FOV. At step s.301.8, the ROI is imaged with a higher resolution than the native resolution of the image sensor.

FIGS. 13 to 22B and FIGS. 11A to 12D focus on examples in which one or more LCPGs are used to steer incoming light onto an image sensor in order to obtain images with higher resolution than the native resolution of the image sensor. Although it may not be explicitly stated, each of FIGS. 13 to 22B and FIGS. 11A to 12D relates to techniques for obtaining a higher resolution image for the FOV containing the ROI, which is a subset of a wider FOV.

FIG. 13 illustrates a first example of the present disclosure, being an imaging device 2001 comprising an image sensor 2010 and a LCPG 2018. The image sensor may be an infrared sensor or time-of-flight sensor. More specifically, the image sensor may be a 2D or 3D image sensor, for example, a time-of-flight 3D depth sensor. In other examples, the image sensor may be a monochromatic 2D image sensor that provides static or dynamic 2D capture. Overall control of image sensor 2001 is provided by an image sensor controller 2012, which in turn controls a specific LCPG controller 2020. It will however be appreciated that the image sensor 2010 and the LCPG 2012 may be controlled by a single controller. The LCPG 2018 is a single layer LCPG with same orientation stacked gratings to permit 1-dimensional beam steering of a beam of light passing through the LCPG 2018. However, it will be appreciated that multiple layer LCPGs with at least one LCPG stacked orthogonally to another LCPG can be used to provide 2-dimensional beam steering. A lens 2022 is also provided in front of the image sensor 2010 to focus light onto the image sensor 2010.

FIG. 14 provides a second example of the present disclosure. In this example, a light source 2026 used to illuminate the object 2014 via diffuser 2028 is also shown, the light source 2026 being controlled by the image sensor controller 2012 to project a beam of light onto the object, which is reflected back to the image sensor 2010. The light source 2026 may be a tunable wavelength light source.

The light source 2026 is usually a linearly polarized light source. However, LCPGs are configured to steer circular polarized light in dependence on the polarization state of the input light. For example, in a ternary LCPG, the light is steered into three possible directions according to the following equation:

$$\theta_{out} = \sin^{-1}\left(\frac{m\lambda}{\Lambda} + \sin\theta_{in}\right) \quad [3\text{-}1]$$

where $\lambda$ is the wavelength of the incident light, $\Lambda$ is the grating pitch, and m=0 and m=±1 depending on whether the incident light is left-handed or right-handed circular polarized light.

Consequently, a quarter wave plate (not shown) is used to convert the linearly polarized light into circular polarized light before it passes through the LCPG 2018, the linearly polarized input light being converted into either right-handed or left-handed circular polarized light. For example, the quarter wave plate may be incorporated into the LCPG 2018 arrangement such that it sits immediately in front of one of or each of the LCPGs. As such, the polarization state incident on any particular LCPG can be controlled through the provision of a quarter wave plate, and thus the use of multiple quarter wave plates can increase the range of possible steering angles. That is to say, one or more quarter wave plates are used to control the type of polarization of the light incident on the LCPGs and the amount by which they are capable of steering the light.

The operation of the imaging device 2002 will now be described with reference to FIG. 15. At step s.203.2, the wavelength of the illumination source is controlled to output an electromagnetic beam of wavelength $\lambda$. The electromagnetic beam shines on an object in a scene and is reflected back to an image sensor. At step s.203.4, a first reflected electromagnetic beam is received at the image sensor via a LCPG. The LCPG is controlled such that the electromagnetic beam is not deflected. At step s.203.6, a first intermediate image is obtained at the image sensor by reading the values of the pixels. At step s.203.8, the LCPG is controlled such that the electromagnetic beam is deflected relative to the non-deflected beam. This deflection is relatively coarse compared with the fine-tuning provided by the control of wavelength of the illumination source. At step s.203.10, a second reflected electromagnetic beam is received at the image sensor via the LCPG. At step s.203.12, a second intermediate image is obtained at the image sensor by reading the values of the pixels. At step s.203.14, the first and second intermediate images are combined into an overall image by interleaving using time-division multiplexing.

In terms of the mathematics behind obtaining a combined output in examples of the present disclosure, we can consider two simple cases of an image sensor having two pixels side by side.

In FIG. 11A, two pixels side by side having values 48 and 78 are shown. These two pixels are read by an image sensor with no gaps in between the pixels and represent a first FOV of a scene. In FIG. 11B, the FOV is shifted slightly to the right by a sub-pixel's pitch to a second FOV and now the two pixels have values 56 and 90, respectively. In FIG. 11O, intermediates images representative of the first FOV and the second FOV are combined by applying a mathematical function to the pixel values obtained from each FOV. Provided that the scene remains identical between the first FOV and the second FOV and the image sensor response across its sensing area is uniform, in the resultant combined image created from the intermediate images, there are effectively half size pixels with their own unique values, thus improving resolution of the image sensor. The combined result is shown in FIG. 11D.

In FIG. 12A, two pixels side by side representative of a first FOV and having values 48 and 78 are shown. However, in contrast to FIG. 11A, there is a gap in between the two pixels. This could represent dead space between the pixels or missing pixels, for example, to accommodate for readout circuitry. In FIG. 12B, the FOV is shifted slightly to the right to a second FOV and now the two pixels have values 52 and 83, respectively, and it can be seen that the second FOV is shifted across by an entire pixel's pitch. In FIG. 12O, intermediate images representative of the first FOV and the second FOV are combined by interleaving. The combined result is shown in FIG. 12D.

FIGS. 16 to 19 are system block diagrams and of an image sensor that illustrate how 2-dimensional spatial resolution of a scene 2014 can be improved using the techniques of the present disclosure in a third example of the present disclosure. Specifically, frames 2030, 2040, 2050, 2060 show how the scene 2014 is captured from four FOVs.

In the third example of the present disclosure, assuming an imager with 80×80 pixels (Npix) and 50 degree FOV, then the angular resolution for each pixel is:

$\alpha_{pix(x)}$=FOV*$\pi$/(180*Npix) in radians, since resolution is same for X and Y $\alpha_{pix(Y)}$=$\alpha_{pix(X)}$.

To double the resolution in the X and Y direction, the beam must be steered $\alpha_{pix(X)}/2$ in X and Y. This is accomplished by operating the LCPG in four phases:

1$^{st}$ Frame: X Drive=0; Y Drive=0
2$^{nd}$ Frame: X Drive=$\alpha_{pix(X)}/2$; Y Drive=0
3$^{rd}$ Frame: X Drive=$\alpha_{pix(X)}/4$; Y Drive=$\alpha_{pix(Y)}/2$
4$^{th}$ Frame: X Drive=$-\alpha_{pix(X)}/4$; Y Drive=$\alpha_{pix(Y)}/2$ In this specific example $\alpha_{pix(X)}$=11 mrad. Using this value and the above equations, the amount of steering of the X and Y drives can be calculated and an implementation of this is shown in FIGS. 16 to 19.

The imaging device 2003 comprises the same components as the imaging device 2002 of FIG. 13 except the LCPG is a multi-layer LCPG with at least one LCPG stacked orthogonally to another LCPG so as to provide 2-dimensional beam steering. LCPG 2018 is controlled by an X drive for controlling horizontal deflection of the electromagnetic beam and a Y drive for controlling vertical deflection of the electromagnetic beam. In FIGS. 16 to 19, the light source is a laser that emits IR light.

In FIG. 16, the frame 2030 shows an original spatial resolution of the captured scene without any deflections being applied by the LCPG. Frame 2030 is representative of the spatial resolution that is obtained from a first intermediate image.

In FIG. 17, a signal causing a deflection of 5.4 mrad [$\alpha_{pix(X)}/2$] is applied to the X drive. Frame 2040 represents a FOV that is shifted to the right relative to frame 2030 and is used to obtain a second intermediate image. When the first and second intermediate images are combined, the horizontal spatial resolution is increased compared with the original spatial resolution that is obtained from a first intermediate image. In an ideal scenario whereby the optics of the device are ideal and the diffraction and resolution of the lens are not limited, the spatial resolution may be substantially improved, up to double the original spatial resolution.

In FIG. 18, a signal causing a deflection of 2.7 mrad [$\alpha_{pix(X)}/4$] is applied to the X drive and a signal causing a signal causing a deflection of 5.4 mrad [$\alpha_{pix(Y)}/2$] is applied to the Y drive. Frame 2050 represents a FOV that is shifted to the down and left relative to frame 2040 is used to obtain a third intermediate image. When the first, second and third intermediate images are combined, the resulting spatial resolution is improved further compared with the spatial resolution that is obtained from combining the first and second intermediate images. In an ideal scenario the spatial resolution may be substantially improved, up to triple the original spatial resolution obtained from just one FOV.

In FIG. 19, a signal causing a deflection of −2.7 mrad [$-\alpha_{pix(X)}/4$] s applied to the X drive and a signal causing a deflection of 5.4 mrad [$\alpha_{pix(Y)}/2$] is applied to the Y drive. Frame 2060 represents a FOV that is shifted to the left relative to frame 2050 is used to obtain a fourth intermediate image. When the first, second, third and fourth intermediate images are combined, effectively, the spatial resolution is improved yet further compared with the original spatial resolution that is obtained from combining the first, second and third intermediate images. Both the horizontal and vertical direction spatial resolutions have been substantially improved and, in an ideal scenario, the spatial resolution may be up to quadruple the original resolution obtained from just one FOV.

The deflections of the electromagnetic beam enabled by the X and Y drives in the third example of the present disclosure are of a magnitude such that they cause deflection of the electromagnetic beam onto the image sensor 2010 by less than a pitch of the pixels of the image sensor. However, in other examples of the present disclosure, the one or more LCPGs are controlled to cause deflection of the electromagnetic beam onto the image sensor by a non-integer multiple of a pitch of the pixels of the image sensor.

Thus far we have described an example which makes use of one or more LCPGs to deflect an incoming electromagnetic beam such that the electromagnetic beam is directed from a different FOV other than the non-deflected FOV onto the image sensor. However, an outgoing electromagnetic beam can also be deflected before it reaches the object or scene by the one or more LCPGs.

In FIG. 20, in the imaging device 2004 of the fourth example of the present disclosure, both the outgoing light from the light source 2026 and the incoming light onto the image sensor passes through the same LCPG 2018. The LCPG 2018 is arranged to apply a deflection to the electromagnetic beam such that the electromagnetic beam can be directed to a different part of the scene other than the non-deflected part of the scene. Since the incoming reflected electromagnetic beam is deflected by the same amount as the outgoing electromagnetic beam in the opposite direction, the received electromagnetic beam on the image sensor is directed to the same pixel as if the LCPG 2018 were not present and the scene was actually directly in front of the image sensor. As such, each time a deflection of the electromagnetic beam is caused by the LCPG 2018, an additional intermediate image is formed and thus used to create an overall combined image after time-division multiplexing the individual intermediate images.

In the fourth example of the present disclosure, the one or more LCPGs are controlled to cause deflection of the electromagnetic beam from the illumination source onto a part of the scene such that the electromagnetic beam that is received by the image sensor shifts by a non-integer multiple of a pitch of the pixels of the image sensor. Coarse beam steering of the FOV may be achieved by using the one or more LCPGs to deflect the electromagnetic beam and shifting by finer amounts may be achieved by tuning the wavelength of the light source, for example, as will be described in more detail below with reference to FIGS. 22A and 22B.

However, in other examples of the present disclosure, the one or more LCPGs are controlled to cause deflection of the electromagnetic beam from the illumination source onto a part of the scene such that the electromagnetic beam that is received by the image sensor shifts by a distance of less than a pitch of the pixels of the image sensor. Shifting the illumination source by sub-pixel amounts is particularly advantageous if a structured light source is used.

In FIG. 21, the outgoing light from the light source 2026 is steered through a first LCPG 2017 and the incoming light onto the image sensor passes through a second LCPG 2018 in a fifth example of the present disclosure. An advantage of this arrangement of the fourth example shown in FIG. 21 is that different degrees of deflection can be applied by the first and second LCPGs, respectively. This way, the resolution of the imaging device 2005 is improved in a two-fold manner, firstly by sub-pixel illumination of a part of the scene, for example, emitted from a structured light source, and secondly, by sub-pixel deflection of the electromagnetic beam onto the image sensor.

FIGS. 22A and 22B show how changing the wavelength of the illumination source can apply a fine controllable deflection to the electromagnetic beam when it passes through a LCPG relative to a coarse controllable deflection to the electromagnetic beam applied by the one or more LCPGs.

The relationship between steering angle and wavelength is $\theta = \sin^{-1}(\lambda/\Lambda)$. Thus, the steering angle can be calculated for different wavelengths of light, as shown in the table of FIG. 22A and the graph of FIG. 22B. Here, example steering angles are shown for an 850 nm illumination source with +/−10 nm wavelength variation and 20° coarse steering angle.

Together with coarse deflections such as those of the third example, fine deflections can be applied to the electromagnetic beam by adjusting the wavelength of the illumination source by controlling temperature and/or current, for example. With such solution, an electromagnetic beam can be steered at large and small intervals depending upon what is required for a particular application. An advantage of using wavelength tuneability in addition to steering using one or more LCPGs is that fewer LCPGs in the stack may be used to achieve the desired degree of control over steering of the electromagnetic beam. Better optical efficiency may be achieved since some light is lost as it passes through each LCPG and so a LCPG stack with fewer LCPGs in the stack permits more light to reach the object or scene being illuminated.

Figure 24:
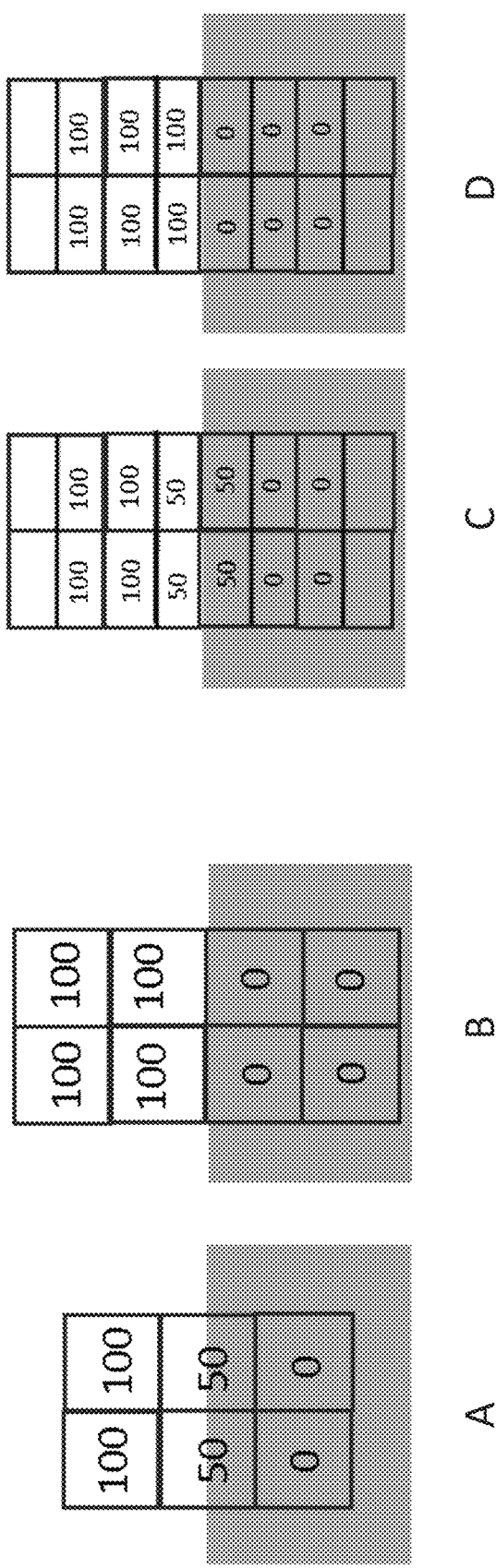
FIG. 24 illustrates details of how an output is obtained in yet further examples of the third aspect of the present disclosure.

In FIG. 24, details of how an output is obtained in yet further examples of the present disclosure are described.

In this example, let us assume for the sake of explanation only that resolution in the vertical direction only is to be increased ie the LCPG steers only in the Y direction to obtain a super-resolution image. As shown in FIG. 24(a), the original resolution image contains a black (0 intensity) region and a white (100 intensity) region. If it is noticed that all neighbor pixels above are bright while the neighbor pixels below are dark, we can then assume that the upper subpixel should be bright and the subpixel below should be dark, and the original FOV can be shifted accordingly using the LCPG to steer the FOV so that the black to white boundary falls on a pixel boundary (as shown in FIG. 24(b) at the original resolution). However, that then gives only a standard resolution image. In order to then obtain an increased resolution image (in the vertical direction only in this example) then instead of averaging the values of the pixels (as shown in FIG. 24(c) and as described in more detail with reference to FIGS. 11A to 11D) in which a grey area is then obtained in the middle (see the pixels with value 50), instead as shown In FIG. 24(d) in this example we obtain higher resolution by selecting a neighboring pixel value for the additional pixels. That is, instead of performing an averaging operation as described previously to obtain the value of a new pixel at the higher resolution, instead the value of a neighboring pixel either above or below the new pixel is selected for the new pixel value. By being consistent as to whether the pixel value above or below is selected (for example, always select the pixel value from the original pixel positioned vertically above the new improved resolution pixel), then the sharp boundary between the black region and the white region can be maintained, and no inadvertent blurring of the boundary by introducing a grey line (as in FIG. 24(c)) is then obtained. This is the development of a probabilistic model based on the values in the area surrounding the pixel.

With respect to the electromagnetic wavelengths of operation of the beam scanner and receiver arrangements described above, anticipated wavelengths of operation extend from the infra-red (IR) band to the ultra-violet (UV) band, through the visible light spectrum. Depending on the application, non-visible wavelengths such as IR or UV can bring some advantages in that because they are not visible to humans they will not create visible distractions.

Various further examples of the third aspect of the disclosure will be apparent from the following features, defining further examples of the disclosure. Where a feature of a later example refers to one or more earlier examples, the examples may be considered in combination to provide further examples.

A first example describes a method of surveillance across a field of view (FOV) wider than a native FOV of an image sensor, the image sensor comprising a plurality of pixels, the method comprising: providing an image sensor having a native FOV and native resolution, and imaging optics to allow an image to be obtained by the image sensor, the imaging optics including one or more controllable liquid crystal polarization gratings (LCPGs); controlling the one or more LCPGs to steer light onto to the image sensor from across a wider FOV than the native FOV to obtain images from across the wider FOV; determining a region-of-interest (ROI) within the wider FOV and corresponding to a subset of the wider FOV; and imaging the ROI with a higher resolution than the native resolution of the image sensor.

The previous example may further comprise imaging the ROI with a higher resolution than the native resolution of the image sensor, further comprising imaging using the one or more LCPGs.

In a third example, expanding upon the method of the previous example to image the ROI with a higher resolution than the native resolution of the image sensor comprises: receiving a first incident electromagnetic beam generated by or reflected from remote objects at each of the plurality of pixels via one or more LCPGs; for a first FOV having the ROI that is a subset of the wider FOV, obtaining a first intermediate image by reading a signal representative of the first incident electromagnetic beam at each of the plurality of pixels; receiving a second incident electromagnetic beam generated by or reflected from the remote objects at each of the plurality of pixels via the one or more LCPGs that is deflected relative to the first incident electromagnetic beam; for a second FOV having the ROI that is a subset of the wider FOV, obtaining a second intermediate image by reading a signal representative of the second incident electromagnetic beam at each of the plurality of pixels; and multiplexing the first and the second intermediate images together to create a combined higher resolution image output of the image sensor.

Further, the previous example may comprise controlling the amount of steering provided by the one or more LCPGs for obtaining images across a wider FOV than the native FOV, to be greater than the amount of steering provided by the LCPGs for imaging the ROI with a higher resolution than the native resolution of the image sensor.

Controlling the one or more LCPGs of the previous example may further cause deflection of the electromagnetic beam onto the image sensor by less than a pitch of the pixels of the image sensor.

Controlling the one or more LCPGs of the fourth example may further cause deflection of the electromagnetic beam onto the image sensor by a non-integer multiple of a pitch of the pixels of the image sensor.

In a seventh example, the method of the third example may further comprise generating an electromagnetic beam from an illumination source for illuminating a part of the scene.

The method of the previous example may further comprise arranging the one or more LCPGs to apply a deflection to the electromagnetic beam such that the electromagnetic beam is directed to a different part of the scene other than the non-deflected part of the scene in order to capture the native FOV and the wider FOV.

The method of the seventh example may further comprise changing a wavelength of the illumination source, wherein the change in wavelength of the illumination source applies a fine controllable deflection to the electromagnetic beam when it passes through the one or more LCPGs. The one or more LCPGs applies a coarse controllable deflection to the electromagnetic beam in order to create the higher resolution image.

The step of multiplexing the first and the second intermediate images together in the third example may comprise time-division multiplexing.

An eleventh example describes a method of surveillance across a field of view (FOV) of an image sensor, the image sensor comprising a plurality of pixels, the method comprising: providing an image sensor having a native resolution and comprising imaging optics to allow an image to be obtained by the image sensor, the imaging optics including one or more controllable liquid crystal polarization gratings (LCPGs); monitoring a scene for a region-of-interest (ROI); and when a ROI is identified, controlling the one or more LCPGs to steer light onto to the image sensor and imaging the FOV with a higher resolution than the native resolution of the image sensor.

Imaging the FOV with a higher resolution in the previous example may further comprise: receiving a first incident electromagnetic beam generated by or reflected from remote objects at each of the plurality of pixels via the one or more LCPGs, wherein the one or more LCPGs are controllable to apply a deflection to the electromagnetic beam such that the electromagnetic beam is directed from a different FOV of a scene other than the non-deflected FOV of the scene onto the image sensor; obtaining a first intermediate image by reading a signal representative of the first incident electromagnetic beam at each of the plurality of pixels for a first FOV; receiving a second incident electromagnetic beam generated by or reflected from the remote objects at each of the plurality of pixels via the one or more LCPGs that is deflected relative to the first incident electromagnetic beam; obtaining a second intermediate image by reading a signal representative of the second incident electromagnetic beam at each of the plurality of pixels for a second FOV; and multiplexing the first and the second intermediate images together to create a combined higher resolution image output of the image sensor.

In a thirteenth example, an imaging device comprises an image sensor comprising a plurality of pixels and having a native field of view (FOV) and a native resolution, the imaging device comprising: an image controller; imaging optics including one or more controllable liquid crystal polarization gratings (LCPGs), wherein the one or more LCPGs are controllable by the image controller to steer light onto the image sensor from across a wider FOV than the native FOV to obtain images from across the wider FOV; and a determination unit for determining a region-of-interest (ROI) within the wider FOV and corresponding to a subset of the wider FOV such that the ROI can be imaged with a higher resolution than the native resolution of the image sensor.

The image controller of the previous example may control the one or more LCPGs to image the ROI with a higher resolution than the native resolution of the image sensor.

The image sensor of the imaging device of the previous example may be responsive to electromagnetic beams directed by the one or more LCPGs so as to be incident thereon to generate a signal representative of the incident electromagnetic beams. It creates a first and a second intermediate image by reading signals representative of a first and second incident electromagnetic beam, respectively, from a first and second FOV each having the ROI and each being a subset of the wider FOV. The second incident electromagnetic beam may be deflected relative to a first incident electromagnetic beam, respectively, so as to create a combined higher resolution image output of the image sensor.

In a sixteenth example, the image controller of the imaging device of the thirteenth example may further control the amount of steering provided by the one or more LCPGs for obtaining images across a wider FOV than the native FOV. The amount of steering in this example is to be greater than the amount of steering provided by the LCPGs for imaging the ROI with a higher resolution than the native resolution of the image sensor.

The one or more LCPGs of the imaging device of the previous example may be further controlled to cause deflection of the electromagnetic beam onto the image sensor by less than a pitch of the pixels of the image sensor.

The one or more LCPGs of the imaging device of the sixteenth example may be further controlled to cause deflection of the electromagnetic beam onto the image sensor by a non-integer multiple of a pitch of the pixels of the image sensor.

The imaging device of the thirteenth example further may further comprise an illumination source for emitting an electromagnetic beam.

In a twentieth example, the one or more LCPGs of the imaging device according to example 0 may be arranged at the illumination source such that electromagnetic beam is capable of being directed to different parts of the scene.

The one or more LCPGs of the previous example may be further controlled to cause deflection of the electromagnetic beam onto a part of the scene such that the electromagnetic beam that is received by the image sensor shifts by a distance of less than a pitch of the pixels of the image sensor in order to capture the first or second FOV.

The one or more LCPGs of the twentieth example may be further controlled to cause deflection of the electromagnetic beam onto a part of the scene such that the electromagnetic beam that is received by the image sensor shifts by a distance of a non-integer multiple of a pitch of the pixels of the image sensor in order to create the higher resolution image.

Fourth Aspect of the Disclosure: Adaptive Convergence Using Liquid Crystal Polarization Grating Depth imagers are used to produce a depth image or depth map of a local environment. Depth imagers can be used, for example, in mixed or augmented reality head mounted displays (HMDs) in order to produce a depth image of a user's local environment. Using the depth image or map, the HMD may process and display virtual objects in a way that conforms to the users real environment. At present, depth imagers record depth from a single static point, which has certain limitations. For example, in some situations, a user of an HMD may be focusing on a particular region of interest in his environment that is narrower than or a subset of the native or full field of view (FOV) of the depth imager. The region of interest may contain, for example, an object of interest. However, a static depth imager will still produce a depth image of the environment at its native or full FOV. This is inefficient use of the depth imagers spatial image resolution.

Figure 28:
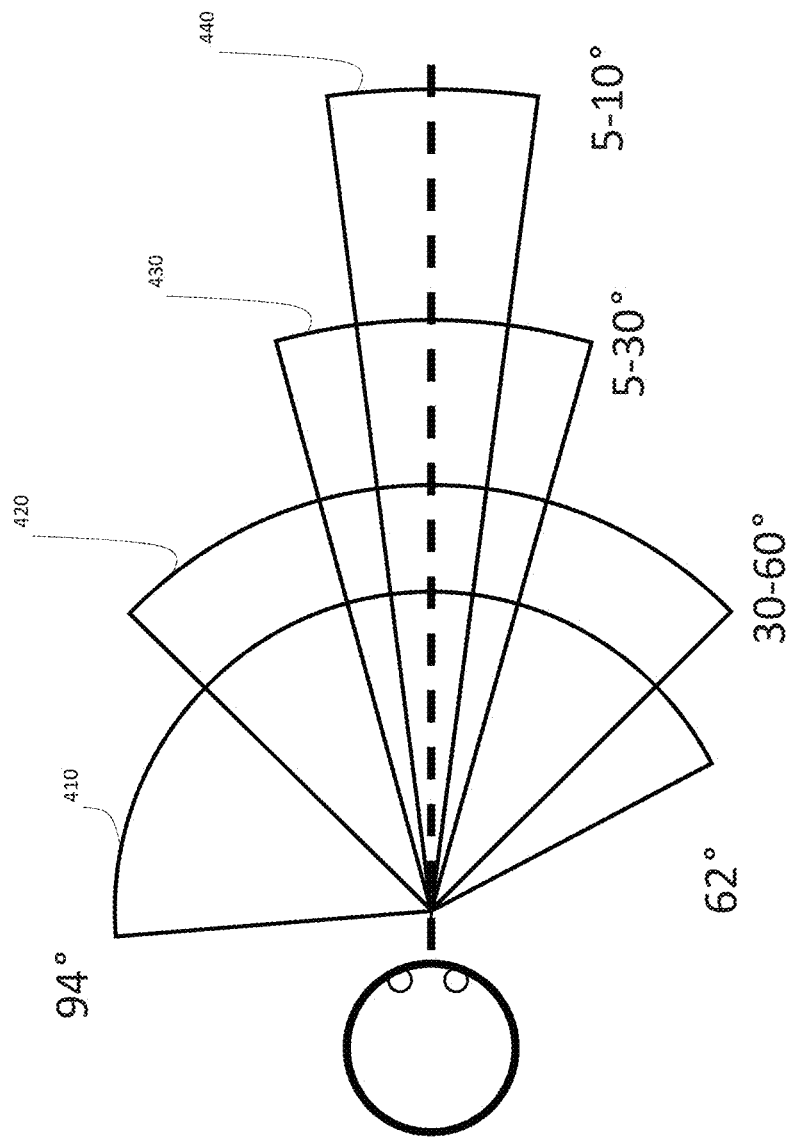
FIG. 28 shows a diagram illustrating a use of the imaging apparatus in accordance with a third example of the fourth aspect of the present disclosure.

The human brain combines two slightly different perspective views from the left eye and the right eye to create an overall FOV and a sense of depth. As shown in FIG. 28, the central portion 440 of the human's FOV is the most sensitive part of the human's vision, where details such as text can be seen sharply. Moving further away from the central portion, vision becomes limited to other less-detailed visual aspects, such as shape 430, color 420 and motion 410. Effectively, the "resolution" of the human's vision decreases away from the central portion of the FOV. A human can move its eyes in co-operation to focus the more sensitive central portion 440 of its FOV on regions or objects of interest in the local environment. Humans can therefore selectively view those regions or objects of interest at a relatively higher resolution. This is known as foveal vision.

Examples of the present disclosure provide an improved imaging apparatus. The imaging apparatus of the present disclosure provides a dynamic depth imager that more efficiently utilizes its spatial image resolution depending on a region of interest in the local environment. In particular, the imaging apparatus of the present disclosure uses LCPGs to simulate the focusing capabilities of the human visual system, to provide a higher spatial image resolution about a region of interest in the user's environment.

A liquid crystal polarization grating (LCPG) is a recently developed optical component that provides beam steering capabilities. By stacking multiple LCPGs one on top of one another, alternating orthogonally, then wide angle beam steering capabilities can be obtained. LCPGs are described in more detail in U.S. Pat. No. 8,982,313.

The imaging apparatus of the present disclosure comprises at least two imaging units, each imaging unit having at least one LCPG. The LCPGs steer sensing light beams from the imaging units to a region of interest in the local environment. The imaging units receive reflected light beams from the environment. The imaging apparatus produces a full resolution depth image that has a FOV smaller than the native FOV of the imaging apparatus and that contains the region of interest. Hence, the imaging apparatus provides a higher spatial image resolution about the region of interest in the narrower FOV. The imaging units therefore operate co-operatively, similarly to a pair of human eyes, to focus the imaging apparatus's image resolution on a region of interest in the environment.

For example, the imaging apparatus may determine that there is a region of interest in the local environment that comprises an object of interest. It may be desirable to produce the depth image at a narrower FOV about the object of interest. The imaging apparatus of the present disclosure may steer its sensing light beams in the direction of the object. This allows the imaging apparatus to prioritize its spatial image resolution on the narrower FOV about the object. Therefore, the object can be imaged in finer detail. The imaging apparatus may also steer the sensing light beams to provide any other FOV in the local environment. Therefore, the imaging apparatus of the present disclosure provides control over the FOV of the depth image by controlling steering angles of the LCPGs, and therefore the steering of the sensing light beams.

Figure 25A:
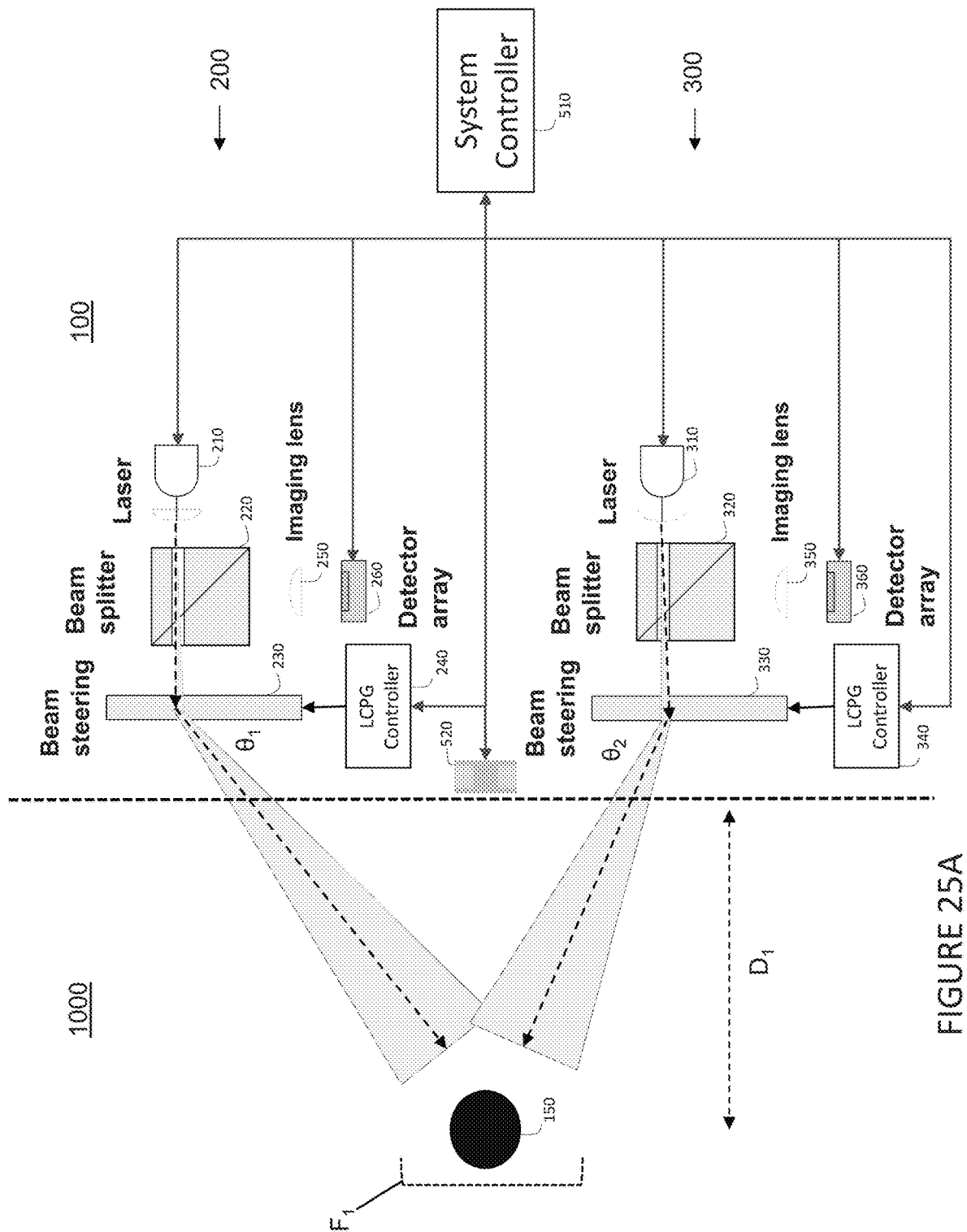
FIGS. 25A and 25B show a system diagram of an imaging apparatus in accordance with a first example of the fourth aspect of the present disclosure.
Figure 25B:
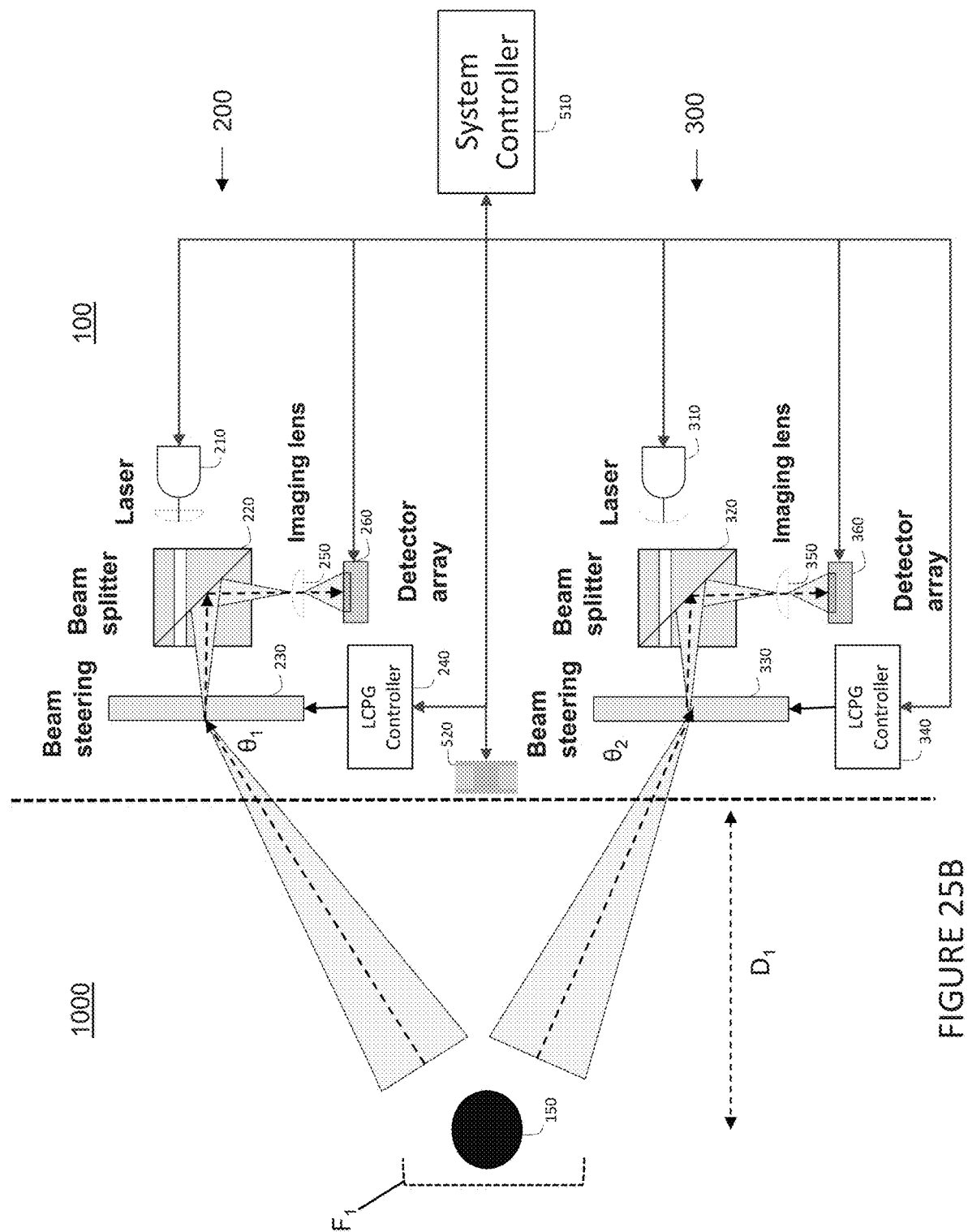

FIGS. 25A and 25B show an imaging apparatus 100 according to an example of the present disclosure. The imaging apparatus 100 comprises a first imaging unit 200, a second imaging unit 300, and a system controller 510 coupled to components of the imaging units 100 and 200. The imaging apparatus 100 may optionally comprise an eye tracking unit 520.

The imaging unit 200 comprises a light source 210, a beam splitter 220, an LCPG 230, an LCPG controller 240, an imaging lens 250 and a detector array 260. The light source 210 is arranged to direct a beam of light, such as an electromagnetic sensing beam, through the LCPG 230 via the beam splitter 220. The sensing beam may be any of an infra-red, visible light or ultra-violet sensing beam. The sensing beam may also be any suitable beam of structured light. The beam splitter 220 is arranged to permit the sensing beam to reach the LCPG 230. The LCPG 230 is arranged to steer or direct the sensing beam at a steering angle. For example, as shown in FIG. 25A, the LCPG 230 may steer the sensing beam at the steering angle $\theta_1$ with respect to the horizontal in FIG. 25A. The LCPG controller 240 controls the steering angle, i.e. the level of steering, applied by the LCPG 230 to the sensing beam. The LCPG 230 is also arranged to steer reflected light received from the environment 1000, such as sensing beams reflected from the object 150 as shown in FIG. 25B. In particular, the LCPG 230 may steer reflected sensing beams to the beam splitter 220. The beam splitter 220 is arranged to direct the sensing beams to the imaging lens 250. The imaging lens 250 is arranged to direct the reflected sensing beams onto the detector array 260. The detector array 260 is arranged to provide an output signal to a measurement unit (not shown), so that the measurement unit can measure a depth image based on the reflected sensing beams detected by the detector array 260. In some examples, the measurement unit is comprised in the system controller 510. The beam splitter 220, imaging lens 250 and detector array 260 may be arranged such that only reflected sensing beams at a certain incidence on the beam splitter will reach the detector array 260.

The imaging unit 300 comprises a light source 310, a beam splitter 320, an LCPG 330, an LCPG controller 340, an imaging lens 350 and a detector array 360, which correspond to the like components of the imaging unit 200 described above. As such, the measurement unit and/or system controller 510 may also receive output signals from the detector array 360, and use the combination of output signals from both detector arrays to measure a depth image based on the reflected sensing beams detected by the detector arrays. As will be described in more detail below, the FOV of the depth image is determined based on the steering angles of the LCPGs. In other words, the FOV of the depth image is controllable by controlling the steering angles of the LCPGs. The LCPGs may apply a large angular displacement, for example up to as much as 40° or 50° away from the sensing beam's original trajectory, with greater displacement being obtainable from an LCPG having a larger number of individual LCPGs stacked together.

As shown in FIGS. 25A and 25B, the system controller 510 is coupled to components of the imaging units 100 and 200, including the LCPG controllers 240 340, the detector arrays 260 360 and the light sources 210 310. The system controller 510 is arranged in data communication with the above components of the imaging units, and is configured to communicate with and control the components so that the imaging apparatus 100 may perform the methods of the present disclosure. Where the imaging apparatus 100 includes an eye tracking unit 520, the system controller 510 may also be coupled in data communication with the eye tracking unit 520, and configured to control the eye tracking unit 520 to perform the methods of the present disclosure.

Figure 27:
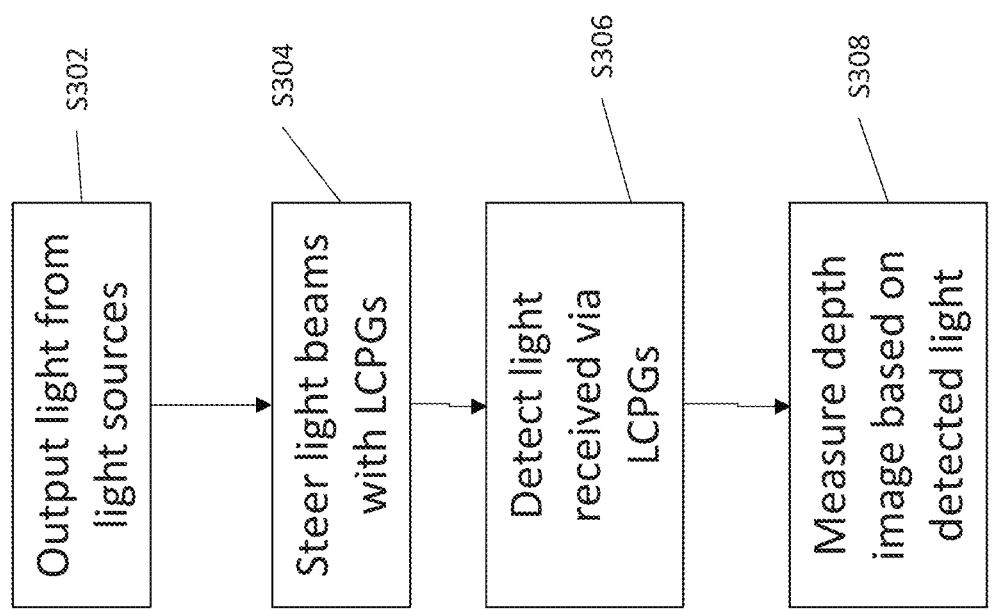
FIG. 27 shows a flow diagram of method in accordance with an example of the fourth aspect of the present disclosure.

FIG. 27 shows the operation of the imaging apparatus 100 in FIGS. 25A and 25B in an environment 1000 comprising an object 150. The object 150 is at a distance $D_1$ from the imaging apparatus 100, and is centred at a central point between the imaging units 200 300 of the imaging apparatus 100.

At step S302, the light sources 210 and 310 output respective beams of light, such as electromagnetic sensing beams. The sensing beams are transmitted through the respective LCPGs 230 and 330 via the respective beam splitters 220 and 320.

At step S304, the sensing beams are steered by the LCPGs 230 and 330. Each LCPG steers the respective beams by a respective steering angle $\theta_1$, $\theta_2$. The steering angles of the LCPGs 230 and 330 are controlled by the respective LCPG controllers 240 and 340. For example, the LCPG controllers 240 and 340 may apply separate control signals, such as voltage or current signals, to the LCPGs in order to achieve desired steering angles. The ways in which the LCPGs may be controlled to set the steering angles are described in more detail in U.S. Pat. No. 8,982,313. Furthermore, as described in more detail below, control over the steering angles of the LCPGs provides control over the FOV of the depth image produced by the imaging apparatus 100.

In some examples, the steering angle may be further controlled by controlling the wavelengths of the beams of light emitted by the light sources 210 310. In particular, the steering angle of an LCPG is finely sensitive to the wavelength of the incoming light. Therefore, voltages or currents may be applied to the LCPGs to provide a coarse steering angle as described above. The wavelength of the beams of light may then be adjusted to finely adjust the steering angle. The wavelengths of the beams of light emitted by the light sources 210 310 may be adjusted using a wavelength controller (not shown) coupled to the light sources. The wavelength controller may be in communication with the LCPG controllers 240, 340 in order to control the overall steering angle of each LCPG. In some examples, the wavelength controller may be comprised in the system controller 510.

It should be appreciated that although the present disclosure describes the LCPG controllers 240 and 340 as being separate components, the LCPG controllers 240 and 340 may be combined as a single controller for controlling both LCPGs 230 and 330. In some examples, the LCPG controllers 240 and 340 may be comprised in the system controller 510. Furthermore, in some examples, the LCPG controllers 240 and 340 and the wavelength controller may be combined as a single controller.

In the example of FIGS. 25A and 25B, the steering angles of the LCPGs 230 and 330 are controlled to steer the sensing beams to a common region of interest in the environment 100. In particular, as shown the example of FIG. 25A, the LCPGs 230 and 330 are controlled to steer the sensing beams at the steering angles $\theta_1$, $\theta_2$, so that the sensing beams are emitted towards the object 150.

In some examples, when the imaging apparatus 100 is included in an HMD, the location of the object 150 may be determined using eye tracking techniques. For example, the imaging apparatus 150 may be configured to receive eye tracking data from an eye tracking unit, such as the eye tracking unit 520 shown in FIGS. 25A and 25B. The eye tracking data may be indicative of a location or region of the environment 1000 that a user is looking at or interacting with, such as a region comprising the object 150. The LCPG controllers 240 340 may receive the eye tracking data and set the steering angles of the LCPGs 230, 330 such that the sensing beam from the light sources 210 and 310 are steered towards the object 150 accordingly. In examples where the imaging apparatus includes an eye tracking unit 520, the eye tracking unit 520 may be controlled by the system controller 510 to provide the above functionality. In other examples, the region of interest, such as the location of the object 150, may be determined using any other technique, and the steering angles of the LCPGs 230 and 330 controlled accordingly.

The imaging apparatus 100 outputs the steered sensing beams. The steered sensing beams outputted by imaging apparatus 100 may reach the object 150 and reflect off of the object 150 and produce reflected sensing beams. The sensing beams may also reach and be reflected off of the local area of the environment surrounding the object 150. The size of the local area from which the sensing beams reflect may be determined by dispersion and beam width characteristics of the sensing beam.

At step S306, the imaging apparatus 100 detects light received at the detector arrays 260 360, such as the reflected sensing beams. In general, the imaging apparatus 100 may receive light from various locations in the environment 1000. However, as shown in FIG. 25B, not all of the light received from the environment may reach the detector arrays 260, 360. Rather, the beam splitters 220 320, imaging lenses 250 350, and detector arrays 260 360 are arranged such that only light at a certain incidence on the beam splitters will reach the detector arrays. Furthermore, at step S306, the LCPGs 230 330 are still enforcing the steering angles $\theta_1$ and $\theta_2$. Light received by the LCPGs 230 330 from the environment at the steering angles $\theta_1$ and $\theta_2$ may therefore be steered in reverse. The beam splitters 220 and 320 are arranged with the LCPGs 230 330 such that the light received by the LCPGs 230 330 at the respective steering angles $\theta_1$ and $\theta_2$ will be steered onto the respective beam splitters 220 320, such that that light is received and detected by the respective detector arrays 260 360.

In particular, as shown in FIG. 25B, the detector arrays may receive sensing beams reflected from the object 150 and received via the LCPGs at the angles $\theta_1$ and $\theta_2$. The received sensing beams may also include sensing beams reflected from the local area surrounding the object 150 and received via the LCPGs at the angles $\theta_1$ and $\theta_2$. The LCPGs 230 and 330 steer the reflected sensing beams by the steering angles $\theta_1$, $\theta_2$ towards the beam splitters 220 and 320. The beam splitter then directs the reflected sensing beams to the detector arrays 260 and 360 via the lenses 250 and 350. The detector arrays 260 and 360 detect the reflected sensing beams.

At step S308, a depth image is measured based on the detected beams. In particular, the detector arrays 260 and 360 output signals to the measurement unit which produces a depth image based on the output signals from the detector arrays 260 and 360. By virtue of the beam steering, the depth image is produced at a FOV $F_1$ about the object 150 of interest. The FOV $F_1$ comprises the object 150, and may also comprise the local area surrounding the object 150. The FOV $F_1$ may be narrower than the native or maximum FOV of the imaging apparatus. Nevertheless, the depth image produced by the imaging apparatus 100 focuses its spatial image resolution on the FOV $F_1$ about the object 150. In some examples, the measurement unit may be configured to produce depth time-of-flight images.

The FOV of the depth image produced by the imaging apparatus 100 may therefore be controlled by controlling the steering angles of the LCPGs. In the example of FIGS. 25A and 25B, the FOV $F_1$ around the object 150 is provided by steering the sensing beams towards the object 150, and then receiving reflected sensing beams from the object 150 at the detector arrays via the LCPGs.

The above method may be repeated to produce a sequence of depth images of a FOV about the object 150, or any other FOV of a region of interest in the environment 1000.

Furthermore, the above method may be used to produce depth images at a FOV about the object 150 at different locations in the environment 1000.

Figure 26A:
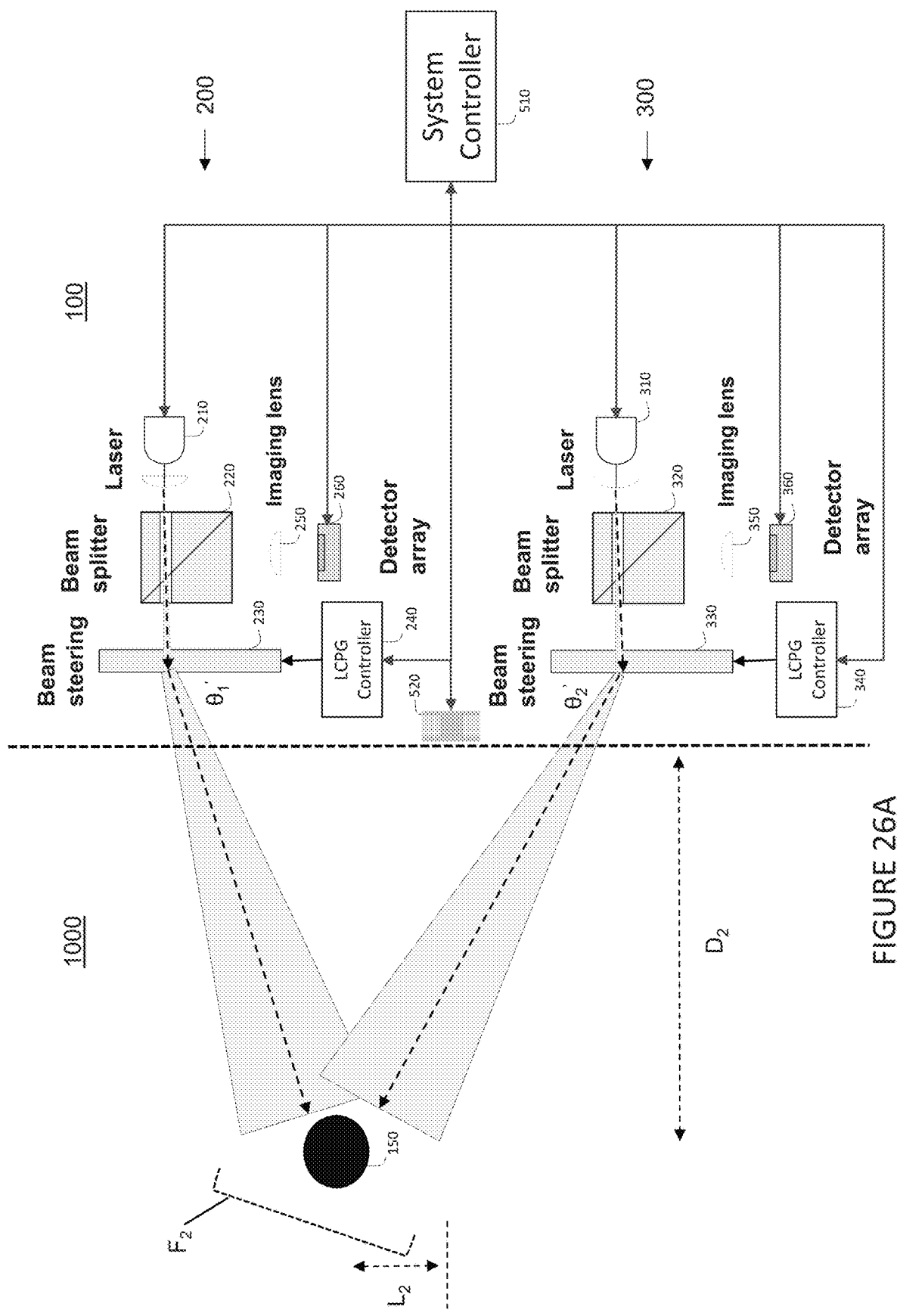
FIGS. 26A and 26B show a system diagram of an imaging apparatus in accordance with a second example of the fourth aspect of the present disclosure.
Figure 26B:
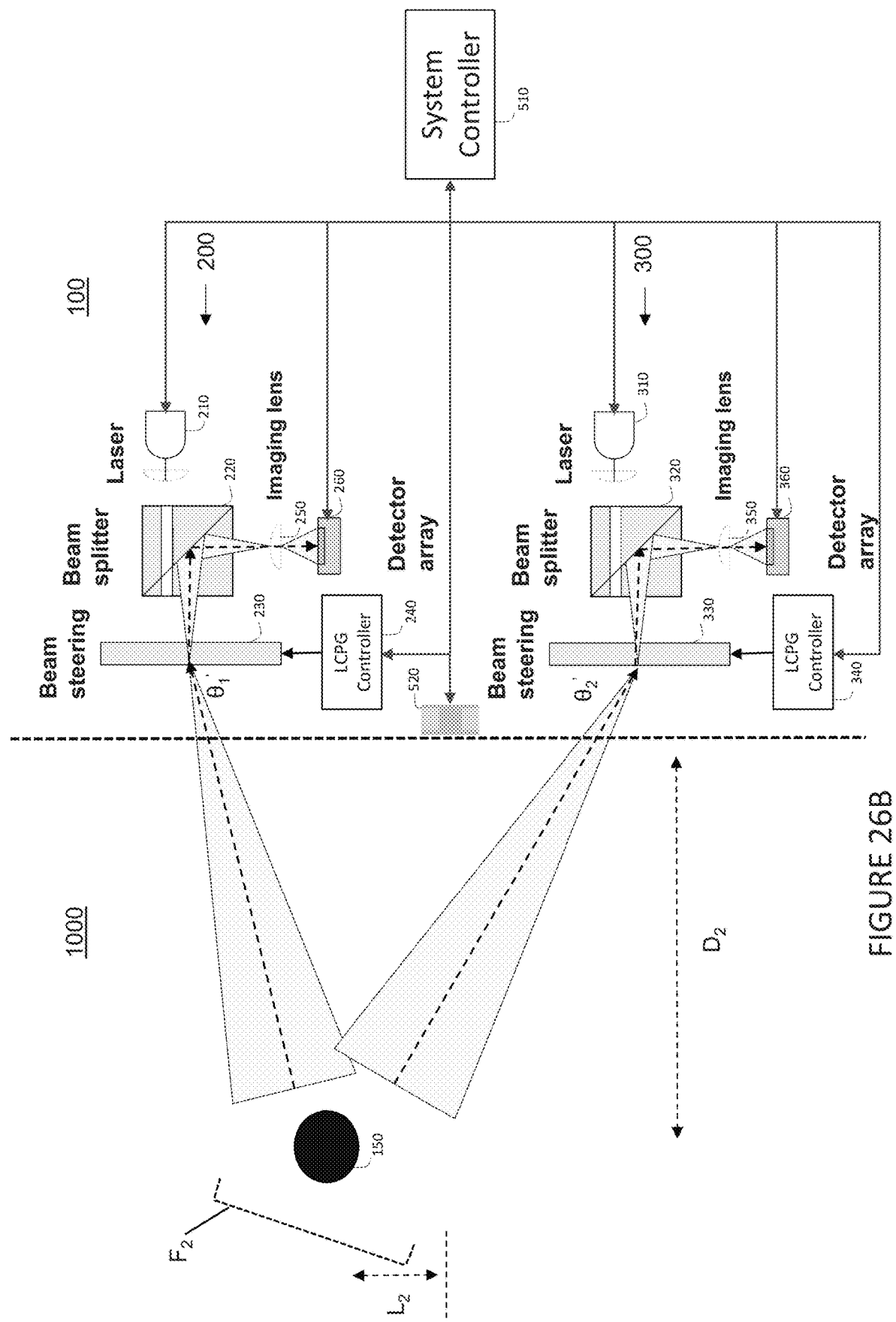

FIGS. 26A and 26B show an example where the object 150 is at a distance $D_2$ (e.g. greater than $D_1$) from the imaging apparatus 100, and a distance $L_2$ from the center point between the imaging units 200 300 of the imaging apparatus 100.

The above described methods apply *mutatis mutandis*. For example, at step S304, the LCPG controllers 240 and 340 may adjust the steering angles of the LCPGs 230 and 330, such that the sensing beams from the light sources 210 and 310 are steered towards the object 150 at its new location in the environment 1000. As such, as shown in FIGS. 26A and 26B, the LCPGs may be controlled to provide new steering angles $\theta_1'$, $\theta_2'$. Furthermore, the adjusted steering angles $\theta_1'$, $\theta_2'$ allows the reflected sensing beams from the object 150 at the new location to be steered into the beam splitters 220 and 320 and into the detector arrays 260 360 accordingly. The imaging apparatus 100 then produces a depth image at a new FOV $F_2$ about the object 150. Therefore, as described above, the FOV of the depth image produced by the imaging apparatus 100 may be controlled by controlling the steering angles of the LCPGs.

It should be appreciated that the imaging apparatus 100 is not limited to use for tracking objects. Rather, the imaging apparatus 100 may be used to produce a depth image at any FOV different to the native or full FOV of the imaging apparatus 100, by controlling the steering angles of the LCPGs. In such examples, the methods described above apply mutatis mutandis.

Although operation of the imaging apparatus 100 in two dimensions has been described, it should be appreciated that the imaging apparatus 100 may be configured to operate in three dimensions. In particular, it should be appreciated that the LCPGs and LCPG controllers may be arranged to steer the sensing beams in three dimensions.

Various further examples of the fourth aspect of the disclosure will be apparent from the following features, defining further examples of the disclosure. Where a feature of a later example refers to one or more earlier examples, the examples may be considered in combination to provide further examples.

A first example comprises an imaging apparatus for measuring depth images of an environment, the apparatus comprising at least two imaging units and each imaging unit comprises: at least one LCPG; a light source arranged to output an electromagnetic sensing beam through the LCPG, the LCPG being arranged to steer the sensing beam by a steering angle; a detector array arranged to detect a reflected sensing beam received through the LCPG, wherein the imaging apparatus is arranged to measure a depth image based on the reflected sensing beams, the depth image having a field of view (FOV) determined by the steering angles of the LCPGs.

In a second example, the apparatus of the previous example further comprises an LCPG controller configured to control the steering angles of the LCPGs so as to control the FOV of the depth image.

In a third example, the LCPG of the first example further comprises multiple gratings arranged in a stack to permit for a greater number of available steering angles of the beam than available from a single grating.

The apparatus of the previous example may further comprise 2, 3, or 4 LCPGs arranged in the stack.

The LCPG controller of the second example may be further configured to coarsely control the steering angles of the LCPGs by applying control signals to the LCPGs.

The LCPG controller of the second example may be further configured to finely control the steering angles by controlling the wavelengths of the sensing beams emitted by the light sources.

Further to the apparatus of example 2, the LCPG controller may be configured to control the steering angles to provide a FOV that corresponds to a predetermined region of interest in the environment.

The LCPG controller of the previous example may be further configured to receive data indicative of a location of the region of interest, and control the steering angles based on the received data.

The sensing beam of the first example may be any one of an infra-red, visible light or ultra-violet beam.

A tenth example comprises an imaging unit for use in an imaging apparatus for measuring depth images of an environment. The imaging unit comprising: at least one LCPG; a light source arranged to output an electromagnetic sensing beam through the LCPG, the LCPG being arranged to steer the beam of light by a steering angle; a detector array arranged to detect a reflected sensing beam so as to enable the imaging unit to measure a depth image based on the detected sensing beam, the depth image having a field of view (FOV) determined by the steering angle of the LCPG.

An eleventh example comprises a method of measuring depth images of an environment. The method comprises: emitting at least two electromagnetic sensing beams from at least two light sources; steering each sensing beams by a respective steering angle using at least one LCPG; detecting reflected sensing beams; and measuring a depth image based on the detected sensing beams, the depth image having a field of view (FOV) determined by the steering angles of the LCPGs.

Fifth Aspect of the Disclosure: Wearable Computer Glasses, Heads-Up Vehicle Display and an Image Projector Therefor With reference to FIGS. 29 and 30, the wearable computer eyeglasses 5001 of the disclosure comprises an eyeglasses structure and optical components 5010.

The eyeglasses structure comprises a pair of rims 5002 to which a pair of optical combiners (lenses) 5004 are mounted, a bridge 5006 connecting the rims 5004 and a pair of temples 5008, each temple 5008 extending rearwardly from the rims/lenses 5002, 5004 to allow the eyeglasses 5001 to be worn by the user in the same manner as standard eyeglasses. The eyeglasses 5001 may also include end pieces, pad arms and nose pads, as is known in the art. The skilled person will appreciate that in other examples of the disclosure the temples 5008, rims 5002 and bridge 5006 may be formed from a unitary piece which wraps around the front of the user's head.

Figure 30:
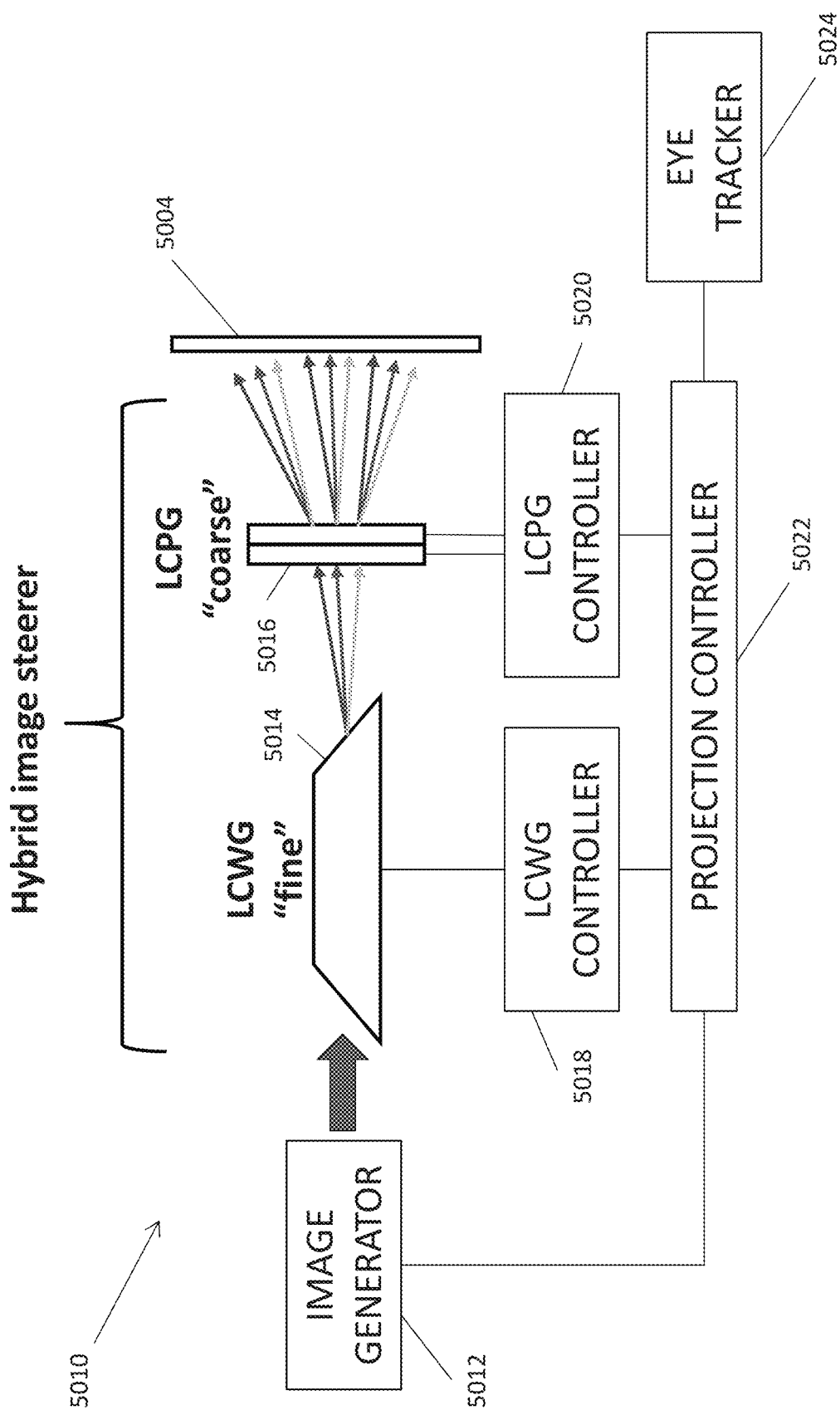
FIG. 30 is a partial system block diagram of an example of the wearable computer glasses of FIG. 29 related to the fifth aspect of the present disclosure.

With reference to FIG. 30, the optical components 5010 of the wearable computer eyeglasses 1 comprise four primary components, namely an image generator 5012, first and second image steerers 5014, 5016, an optical combiner 5004 and an eye tracker 5024.

Figure 31:
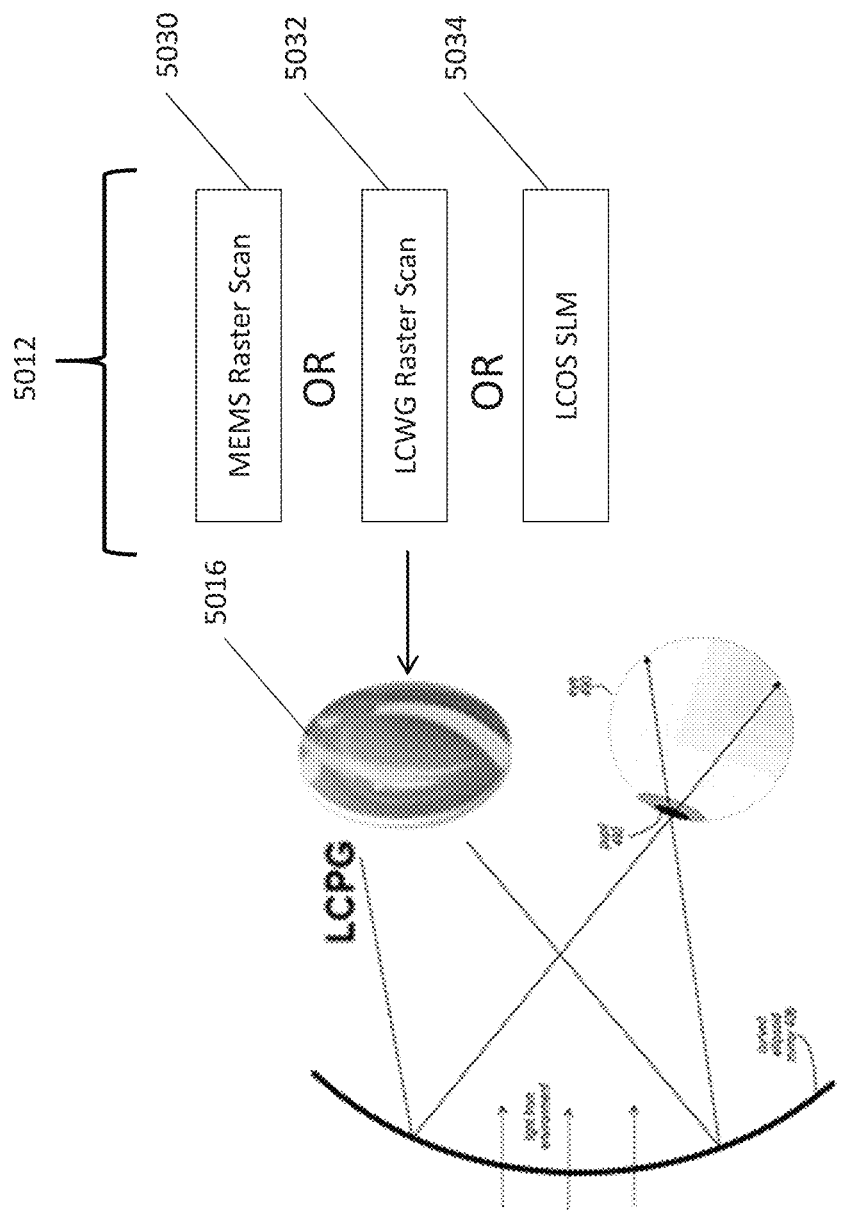
FIG. 31 is a block diagram of part of part of the optical components of the wearable computer glasses of FIG. 29, showing details of the image generator related to the fifth aspect of the present disclosure.

As shown in FIG. 31, the image generator 5012 may include a microelectromechanical systems (MEMS) raster scanner 5030, a liquid crystal waveguide (LCWG) raster scanner 5032 or a liquid crystal on silicon (LCOS) spatial light modulator (SLM) 5034. When the image steerer 5014 is a liquid crystal waveguide (LCWG) or a microelectromechanical systems (MEMS) raster scanner 5030, the image generator 5012 may be one or more lasers, and in such a case the image generator 5012 may be integral with the LCWG or MEMS raster scanner 5030. A single laser may be used to produce monochrome light and multiple lasers may be used to produce color light (e.g., RGB). When a laser is used, the intensity of the laser beam(s) may be modulated at the same time that the LCWG is scanned to generate an image. This would provide a map of angle vs, intensity vs, color to make an image. The image generator 5012 produces the generated image at its output for input to the image steerer 5014, 5016.

The image steerer 5016 shown in FIG. 31 is one or more liquid crystal polarization grating (LCPG) 5016. In other examples of the disclosure one or more liquid crystal waveguide (LCWG) 5014 may be used as the image steerer. Where multiple lasers (e.g., RGB) are used as the image generator 5014 with the LCWG image steerer 5014, all color channels may be steered simultaneously. FIG. 30 shows a hybrid image steerer, comprising an LCWG 5014 in series with an LCPG 5016. Whether one or both of an LCWG 5014 and an LCPG 5016 are used, each will have an associated controller 5018, 5020, as well as there being an overall projection controller 5022. In other examples controllers 5018, 5020, 5022 may be consolidated into a single or multiple controllers.

The image steerer 5014, 5016 receives the image which is output from the image generator and uses one or more of the LCPGs 5016 and the LCWGs 5014 to alter the direction of the image which is output from the image steerer's output, relative to the direction of the input image.

An LCWG 5014 is able to provide fine control of the direction of a beam of light being passed therethrough. Conversely, by stacking multiple LCPGs 5016 one on top of the other, alternating orthogonally, then wide angle beam steering capabilities can be obtained, but with only very coarse control of the resultant beam steering angle that is obtained. Even though the LCPG 5016 is typically used to provide "coarse" steering, fine steering may be effected via the LCPG 5016 by controlling the wavelength of the image generated by the image generator 5012. This can be achieved by generating images at variable wavelengths, for example by using a thermal electric controller (TEC) as the wavelength source.

An advantage of using wavelength tuneability in addition to steering using one or more LCPGs is that fewer LCPGs in the stack may be used to achieve the desired degree of control over steering of the electromagnetic beam. Better optical efficiency may be achieved since some light is lost as it passes through each LCPG and so a LCPG stack with fewer LCPGs in the stack permits more light to reach the object or scene being illuminated.

The LCPG 5016 may be a multiple layer LCPG 5016 with orthogonally stacked gratings to permit two-dimensional beam steering of a beam of light passing through the LCPG 5016. Multiple orthogonal grating layers may be stacked in the LCPG 5016, to increase the field of view.

The optical combiner 5004 may be one of the lenses 5004 of the eyeglasses 5001 which may have a coating that reflects the light projected onto the lens 5004 from the output of the image steerer 5014, 5016 while allowing all other wavelengths of light to pass through. In some examples, a reflective coating may not be used. In other examples the optical combiner 5004 may be a wave guide.

The eye tracker 5024 may use eye tracking techniques such as pupil centre corneal reflection or other tracking techniques that are known in the art. The eye tracker 5024 produces an output which describes the path of the eye relative to the glasses 5001 to determine the direction in which the user is gazing.

The projection controller 5022 takes as its input the eye tracking data output by the eye tracker 5024 and the image/data to be projected on the optical combiner and provides inputs to the image generator 5012 and the image steerer 5014, 5016 so as to project the image onto the image combiner 5004 in manner whereby the projected image will always remain within the field of view of the user, irrespective of the direction being gazed at by the user.

Figure 32:
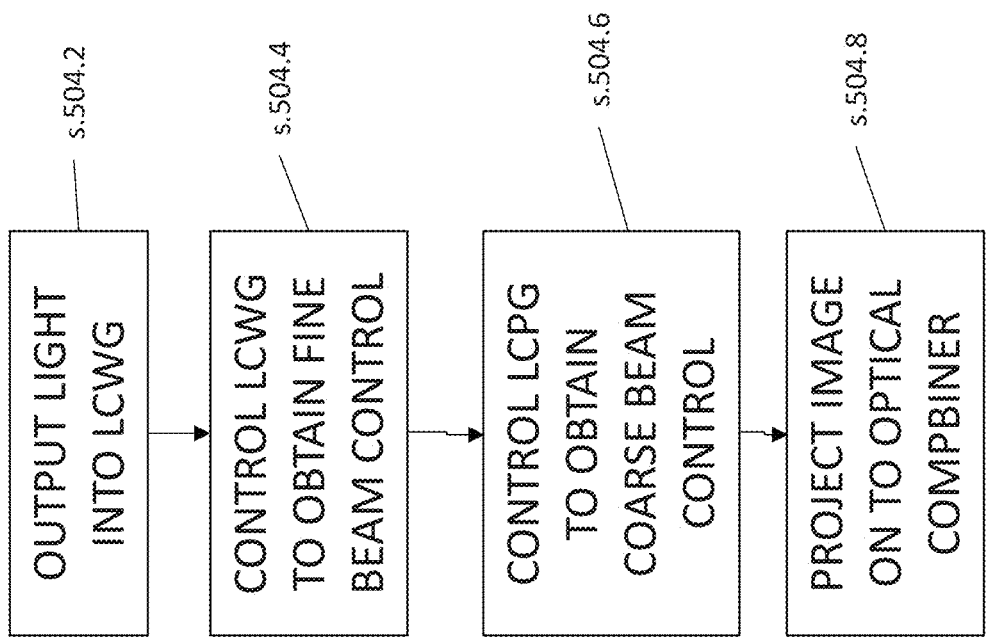
FIG. 32 is a flow diagram illustrating the operation of the optical steerer of the glasses related to the fifth aspect of the present disclosure.

FIG. 32 shows the operation of the hybrid image steerer of FIG. 30. At s.504.2 the image generator 5012 outputs the image into the LCWG 5014, which is controlled at s.504.4 by the LCWG controller 5018 to obtain fine angular beam control. That is, the LCWG 5014 is able to finely control the beam angle and direction output therefrom in very fine increments, for example 0.05°, 0.1°, 0.2° and 0.5°, to give fine directional control. The beam output from the LCWG 5014 is received at and passes through the LCPG 5016, which is controlled by the LCPG controller 5020 at s.504.6 to apply a further beam angle displacement thereto. However, in contrast to the LCWG 5014, the LCPG 5016 applies a much larger angular displacement to the beam, for example up to as much as 40° or 50°, with a greater displacement being obtainable from a grating having a larger number of individual LCPGs stacked together. However, the control available over the LCPG 5016 in terms of the selectable angular resolution obtainable from the LCPG 5016 component is much less than is obtainable from the LCWG 5014.

However, by controlling both the LCPG 5016 and the LCWG 5014 simultaneously using their respective controllers 5018 and 5020, under the overall control of projection controller 5022, it becomes possible to project the image s.504.8 on to the optical combiner 5004 across a wide field of view within the field of view of the wearer of the glasses.

Figure 33:
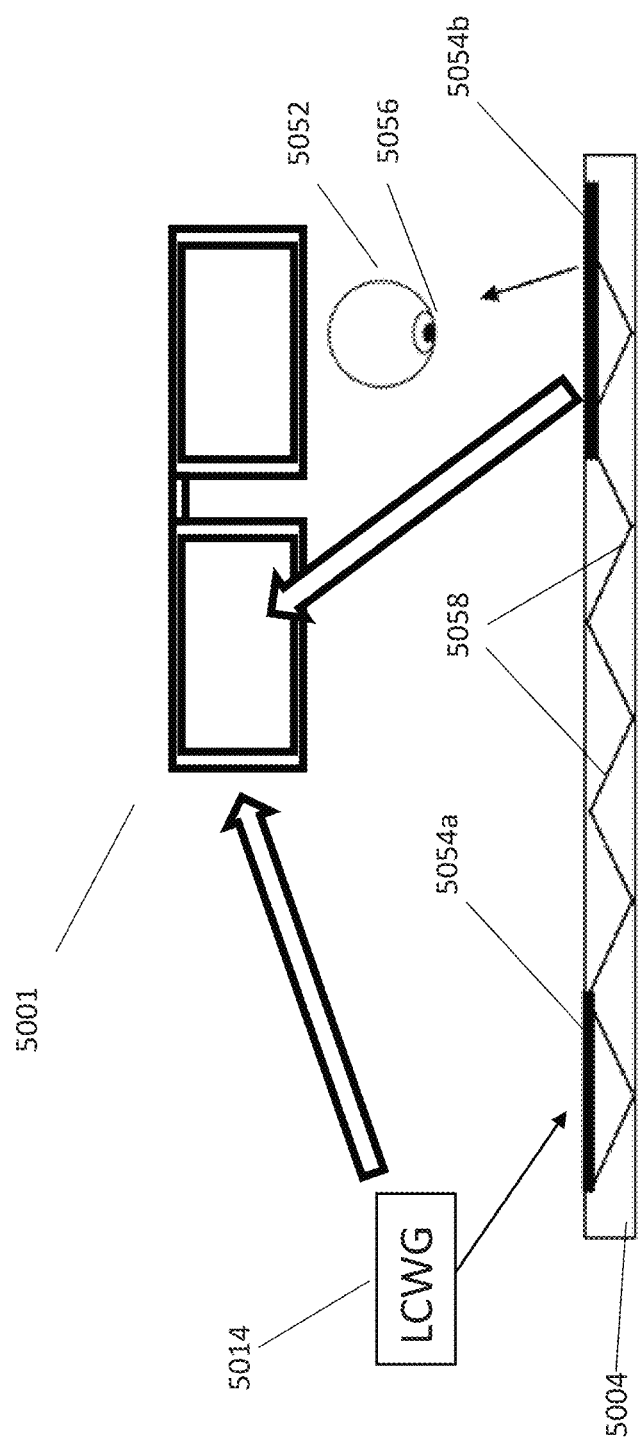
FIG. 33 is a system block diagram of an LCWG projecting onto an optical combiner in a glasses related to the fifth aspect of the present disclosure.

FIG. 33 is a system block diagram of an LCWG 5014 projecting onto an optical combiner 5004 in a pair of eyeglasses 5001 to provide a heads-up display. The eyeglasses 5001 include a LCWG 5014 which projects onto the lenses/optical combiner 5004, shown in cross-section. Alternatively the block 5004 may represent a multimode waveguide deposited on top of the glasses lens 5004. The lens/multimode waveguide 5004 incorporates optical couplers 5054a,b for getting light into and out of the multimode waveguide 5004. The optical couplers 5054a,b may be grating couplers. A first coupler 5054a is positioned proximal to the output of the LCWG 5014 to allow the light to enter into the lens 5004. The second coupler 5054b is positioned close to the user's eye 5052 and is used to direct the image into the pupil 5056. After the light enters the waveguide 5004 via the first coupler 5054a the internal light 5058 is reflected along the waveguide 5004 towards the second coupler 5054b. In operation, there will be many rays 5058 being reflected back and forth, and all of them will together constitute the image that is meant to be seen by the user's eye 5052.

The laser's intensity will need to be modulated while the LCWG 5014 scans so that an image can be generated. To make an RGB image, three different lasers will be needed, and they will all need to be modulated separately. One set of optical components is shown in FIG. 33 and a second set of optical components may be deployed in the eyeglasses 5004, to project an image for viewing by each eye 5052.

Figure 34:
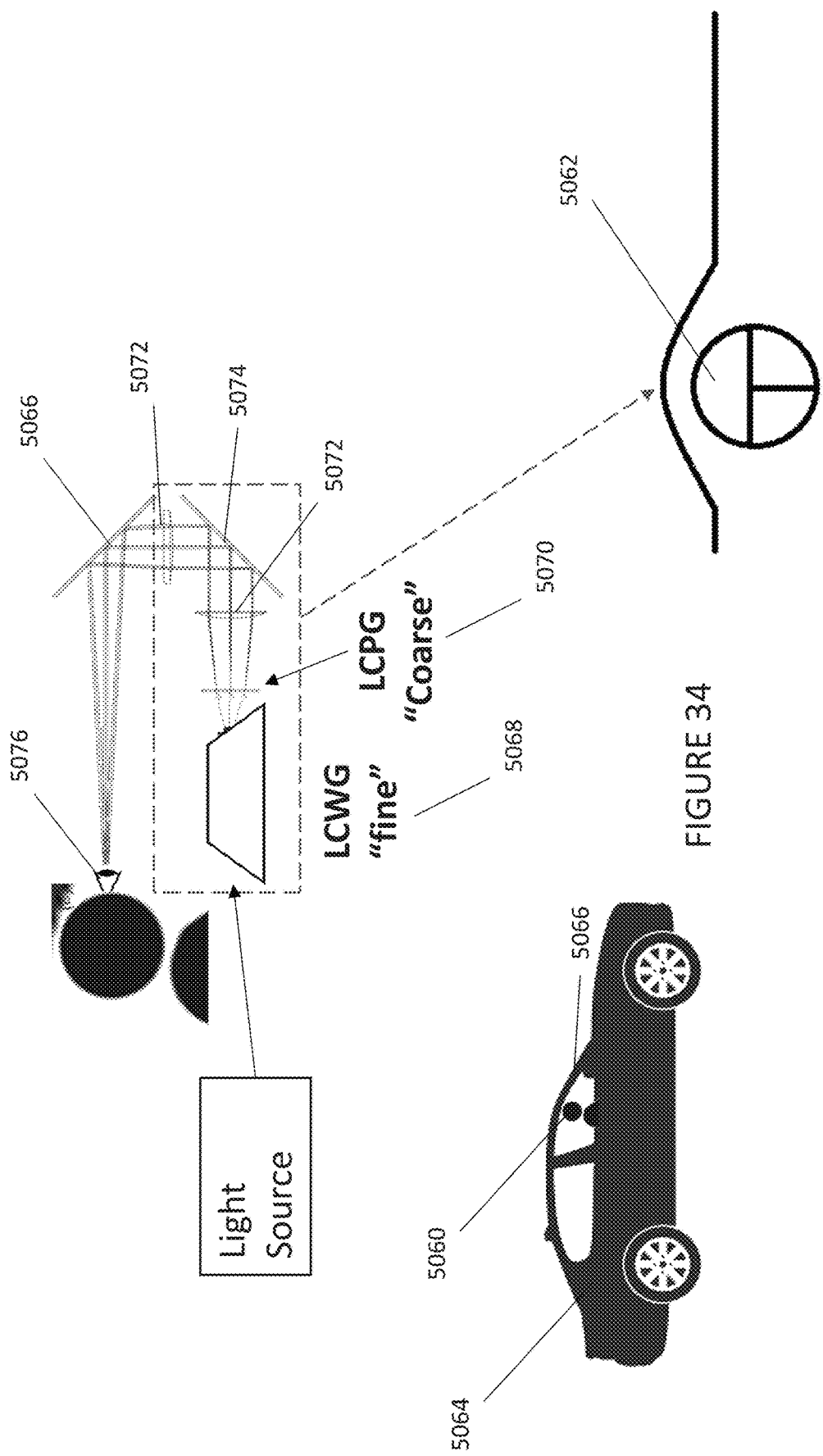
FIG. 34 is a representation of a vehicle heads-up display in accordance with an example of the fifth aspect of the present disclosure.

FIG. 34 is a representation of a vehicle heads-up display in accordance with an example of the present disclosure. In this example a driver 5060 is seated at the controls 5062 of a vehicle 5064 and is gazing forward through the windshield 5066. A first optical steerer, in the form of a liquid crystal waveguide (LCWG) raster scanner 5068 is used to project an image via a second optical steerer, in the form of a more liquid crystal polarization grating (LCPG) 5070, in a similar manner as described above. As above, instead of using an LCWG a microelectromechanical systems (MEMS) raster scanner or a liquid crystal on silicon (LCOS) spatial light modulator (SLM) may be used in other examples of the disclosure.

Figure 35:
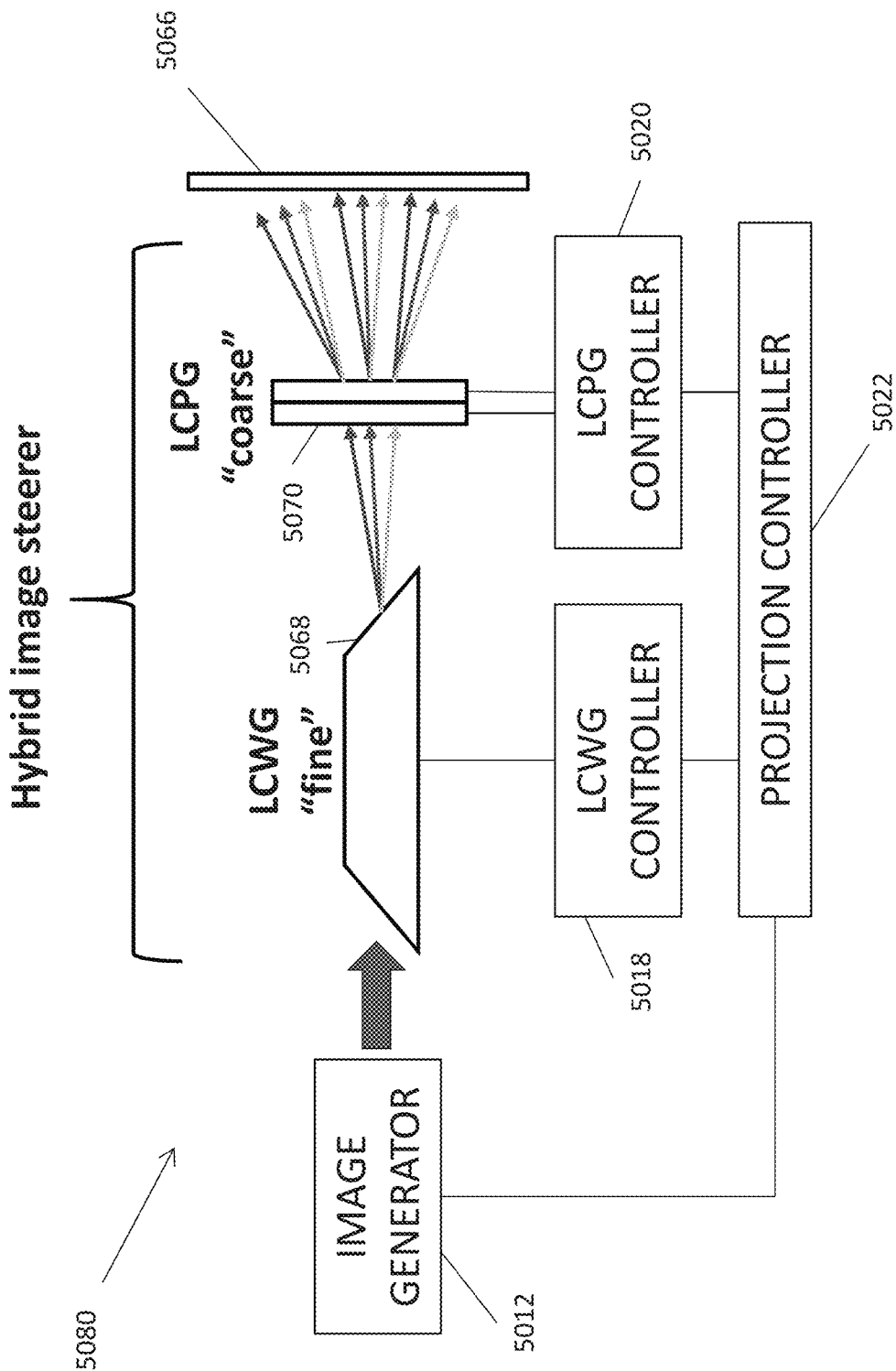
FIG. 35 is a partial system block diagram of an example of vehicle heads-up display of FIG. 34 related to the fifth aspect of the present disclosure.

FIG. 35 is a partial system block diagram of an example of the vehicle heads-up display of FIG. 34 and shows the optical components 5080 of the vehicle heads-up display, comprising three primary components, namely an image generator 5012, first and second image steerers 5068, 5070, and an optical combiner/windshield 5066. As with the eyeglasses described above the LCWG 5014 and an LCPG 5016 have an associated controller 5018, 5020, as well as there being an overall projection controller 5022. In other examples controllers 5018, 5020, 5022 may be consolidated into a single or multiple controllers.

As shown in FIG. 34, the output of the LCPG 5070 is steered towards further optical components, such as one or more lenses 5072 and one or more partially reflecting mirrors 5074 until it is projected onto the windshield 5066. The first 5068 and second 5070 optical steerers are used primarily to alter the vertical position of the projected image on the windshield 5066. This is required to accommodate the heights of different drivers 5060 of the vehicle 5064 (in particular, the height of the drivers' eyes 5076), in order to project the image on to the windshield 5066 so that it falls within the field of focus of the driver 5064. This height adjustment may be made manually by the driver 5064 when entering the car by operating a switch or knob (in the same manner that a driver adjusts the position of the mirrors or seat of a vehicle when entering the vehicle) or by using a device to detect the height of the eyes 5076 of the driver 5060 in order to automatically adjust the vertical position of the projected image when it is projected onto the windshield 5066.

As with the eyeglasses described above the windshield 5066 may have a coating that reflects the light projected onto the windshield 5066 from the output of the image steerer 5068, 5070 while allowing all other wavelengths of light to pass through. In some examples, a reflective coating may not be used.

An advantage of using the first 5068 and second 5070 image steerers for the heads-up vehicle display is that they can be installed in a very compact and discrete manner within the dashboard of the car without requiring a significant redesign of the dashboard, unlike known heads-up displays.

Various modifications, whether by way of addition, deletion, or substitution may be made to the above mentioned examples to provide further examples, any and all of which are intended to be encompassed by the appended non-limiting numbered list of illustrative aspects of the present subject matter.

Figure 29:
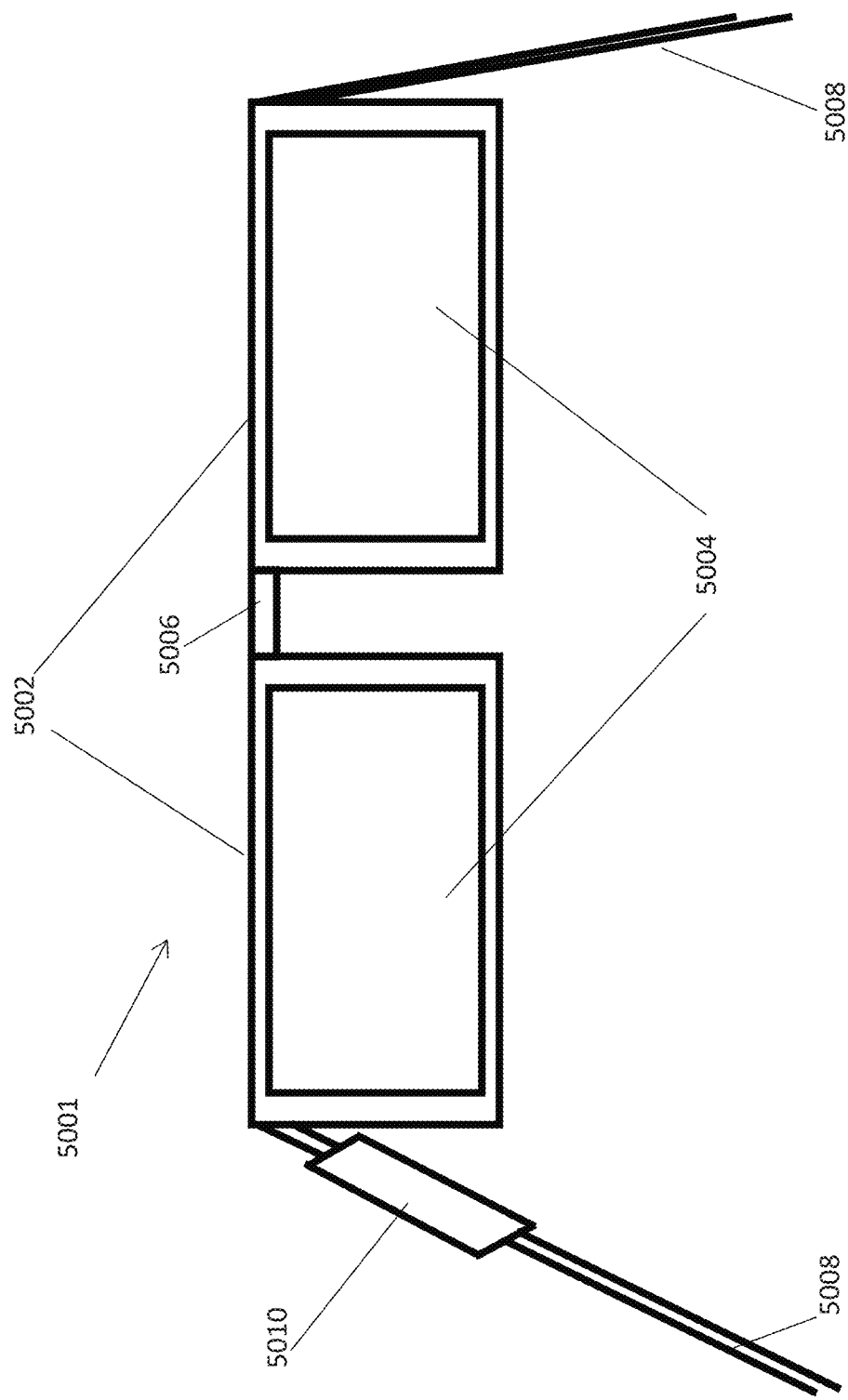
FIG. 29 is a wearable computer glasses in accordance with a first example of the fifth aspect of the present disclosure.

For example, FIG. 29 shows the use of a single set of optical components 5010 for steering an image onto one lens 5004 of a pair of eyeglasses 5001. In another example of the disclosure two sets of optical components 5010 may be deployed on a single pair of glasses, one set associated with one lens 5004 and a second set associated with the second lens 5004. When operated as a pair, both sets of optical components 5010 can be synchronised to form a stereo image with slightly different parallax values. This can be used to recreate a sense of depth which is natural to the human vision system overcoming vergence and accommodation issues common to many 3D display technologies.

Various further examples of the fifth aspect of the disclosure will be apparent from the following features, defining further examples of the disclosure. Where a feature of a later example refers to one or more earlier examples, the examples may be considered in combination to provide further examples.

A first example comprises an image projector for projecting an image on an optical combiner. The image projector comprises: an image generator for generating an image; one or more of first image steerer and one or more second image steerer, each having an input and an output and for receiving at their input an input image and adjusting a deflection of the image which is output at the output, relative to the input image, as a deflected image; and a controller for controlling the image generator and the one or more first image steerer and second image steerer to adjust the deflection of the output image.

The first image steerer of the image projector according to the previous example may be one or more of: a liquid crystal waveguide (LCWG) raster scanner 5032; a microelectromechanical systems (MEMS) raster scanner 5030; and a liquid crystal on silicon (LCOS) spatial light modulator (SLM).

The second image steerer of the image projector according to the previous examples may be a liquid crystal polarization grating (LCPG).

The one or more first image steerers of any previous example may apply a fine deflection to the image, and the one or more second image steerers of any previous example apply a coarse deflection to the image, relative to each other.

The one or more first image steerers of any previous example may be arranged in series prior to the one or more second image steerers of any previous example.

In a sixth example, the image projector according to any of the previous examples comprises one or more first image steerers and further comprises a wavelength adjuster for adjusting a wavelength of the image generated by the image generator to effect fine deflection via the one or more first image steerers.

The image projector of any previous example may comprise a plurality of LCPGs, wherein the LCPGs comprise multiple gratings arranged in a stack, to permit for greater angular deflection of the beam than available from a single grating.

In an eighth example there may be 2, 3, or 4 LCPGs arranged in the stack of the seventh example.

The image generator in the image projector of the sixth example may be one or more lasers.

A tenth example comprises an image projector according to the previous example, wherein the image generator may comprise RGB lasers to produce color light.

The image projector according to any previous example, wherein in an eleventh example, the optical combiner may form a first lens of a pair of eyeglasses; the image projector further comprises an eye tracker for tracking a path of an eye of a user; and the controller is arranged to control the image generator and the one or more first and second image steerers to adjust the deflection of the output image so that it follows the path of the eye.

In a twelfth example, the optical combiner of the image projector according to any previous example may form a windshield of a vehicle.

Wearable computer eyeglasses may comprise: a rim; an optical combiner mounted to the rim, the optical combiner being capable of reflecting projected images and allowing light to pass there through; first and second temples mounted to the rim; and an image projector according to any of the first to the eleventh examples, wherein the one or more of the first image steerer and second image steerer are mounted on one of the first and second temples and the eye tracker is mounted on one of the rim or optical combiner or on one of the first and second temples.

A vehicle may comprise: a dashboard; a windshield; and an image projector according to any of the first to the tenth and the twelfth examples, wherein the one or more of the first image steerer and second image steerer are mounted in the dashboard and are arranged to project the image onto the windshield at a variable height.

Sixth Aspect of the Disclosure: Liquid Crystal Polarization Grating Based Object Tracking In order to track the motion of detailed objects, such as the human hand, accuracies of up to 60 pixels per degree are required for human visual system stability. In this manner, it is possible to present a mixed reality (MR) or augmented reality (AR) system in which a human hand is able to interact with virtual objects in a visually comfortable way. In combination with tracking the motion of the object itself, inertial measurement units (IMU) are used to detect the motion of the object relative to the environment in which it is located. Using the hand example, motion sensors may be used to monitor movement of individual fingers of the hand, whereas an IMU will detect rotation of the hand. A recently developed optical component, the LCPG, provides beam steering capabilities, such that a light beam (used for sensing motion) received at the LCPG can be steered over a wide angle using non-mechanical means. Embodiments of the present disclosure provide an improved motion tracking device, or simultaneous localisation and mapping (SLAM) device, which is capable of steering received light toward an object to be tracked and toward the environment in which it is located in order to track the motion of the object relative to the environment.

Figure 36:
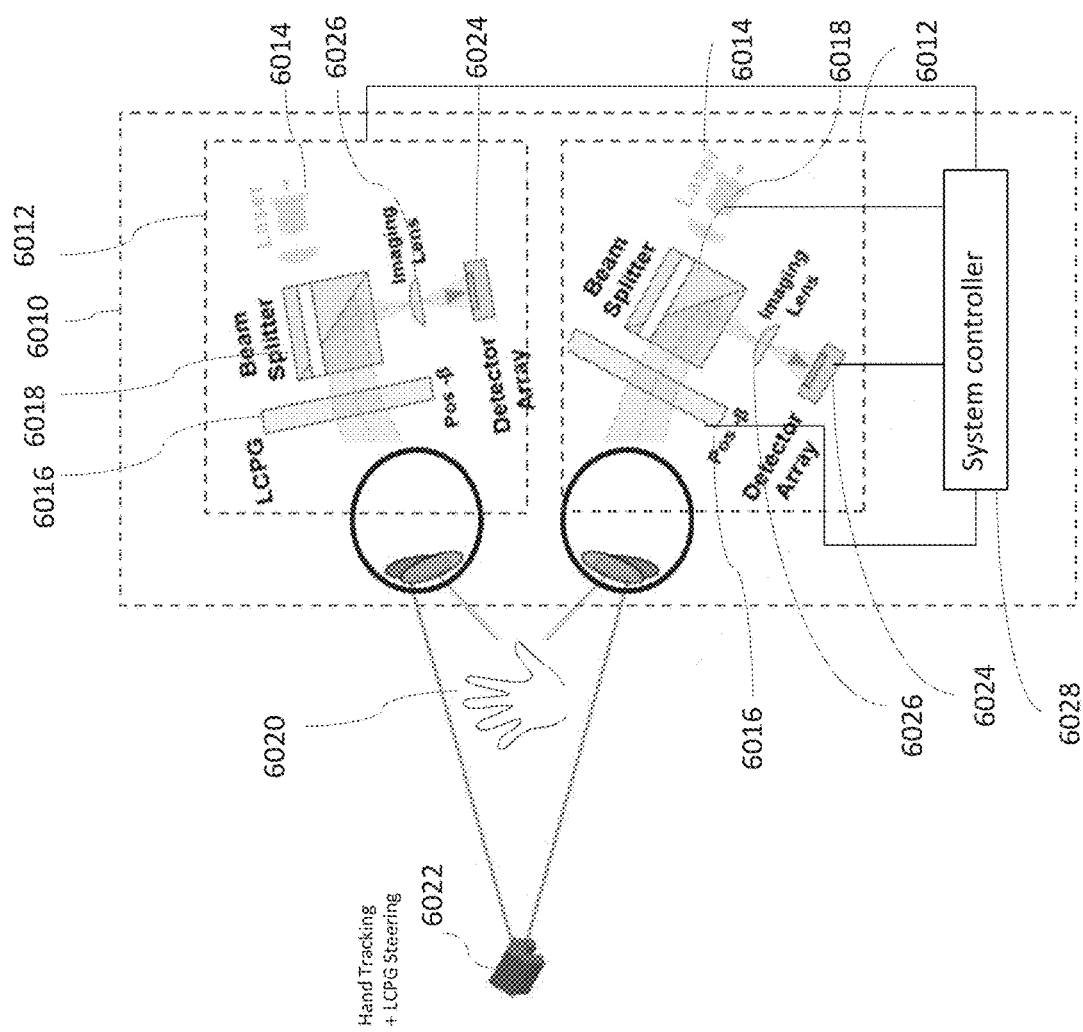
FIG. 36 is a system block diagram of a motion tracking device in accordance with an example of the sixth aspect of the present disclosure.

FIG. 36 illustrates an example of the present disclosure, being a motion tracking device 6010 comprising two imaging arrays 6012. Each imaging array 6012 comprises a light source 6014, such as, for example, a laser diode, that directs a beam of light into an LCPG 6016 via a beam splitter 6018. Various forms of electromagnetic radiation, such as ultraviolet light or infrared light or visible light may each be used as a sensing beam.

Each imaging array 6012 also comprises an imaging lens 6026 and a detector array 6024 positioned such that light received from outside the imaging array 6012 (such as reflected light) is directed through the LCPG 6016, via the beam splitter 6018, toward the imaging lens 6026 in order to impact upon the detector array 6024. In this manner, each imaging array 6012 is arranged to output an electromagnetic sensing beam, such as light, through the LCPG 6016 such that a reflected sensing beam is directed toward the detector array 6024 via the beam splitter 6018.

The two imaging arrays 6012 are located within a housing, which forms a part of the motion tracking device 6010. The housing enables the two imaging arrays 6012 to be held at a constant position relative to each other, such that they can be used in cooperation to track an object. Where the motion tracking device 6010 is arranged to monitor the motion of a hand, the housing may be attached to a glove or mounted on the wrist of a user, in order to enable the hand to be monitored.

The two imaging arrays 6012 are mounted within the housing such that they have an overlapping field of view (FOV). In this manner, the FOV of both imaging arrays 6012 is arranged to include the object to be tracked and the environment in which the object is located. The portions of the environment included in the FOVs at least partially overlap, in order that the imaging arrays can use those overlapping portions of the environment as a common reference point.

The LCPG permits beam steering of a beam of light passing through it in order to increase the FOV of the imaging array 6012. The LCPG applies a large angular displacement to the beam, for example up to as much as 40° or 50°, with a greater displacement being obtainable from a grating having a larger number of individual LCPGs stacked together.

The motion tracking device 6010 also comprises a system controller 6028, which itself comprises one or more processors and memory, in order that it can perform the necessary calculations to track the motion of an object. The system controller 6028 may be located within the housing or external to the device, depending on the structural requirements of the motion tracking device 6010. The system controller 6028 is communicatively coupled to at least the LCPG 6016, the detector array 6024 and the light source 6014, in order to enable the system controller 6028 to control and receive data from these components. In order to improve the clarity of FIG. 36, the system controller 6028 is shown as being generally communicatively coupled to one of the two imaging arrays 6012, however, it is to be understood that the system controller 6028 is communicatively coupled to the LCPG 6016, the detector array 6024 and the light source 6014 of both imaging arrays 6012.

Figure 37:
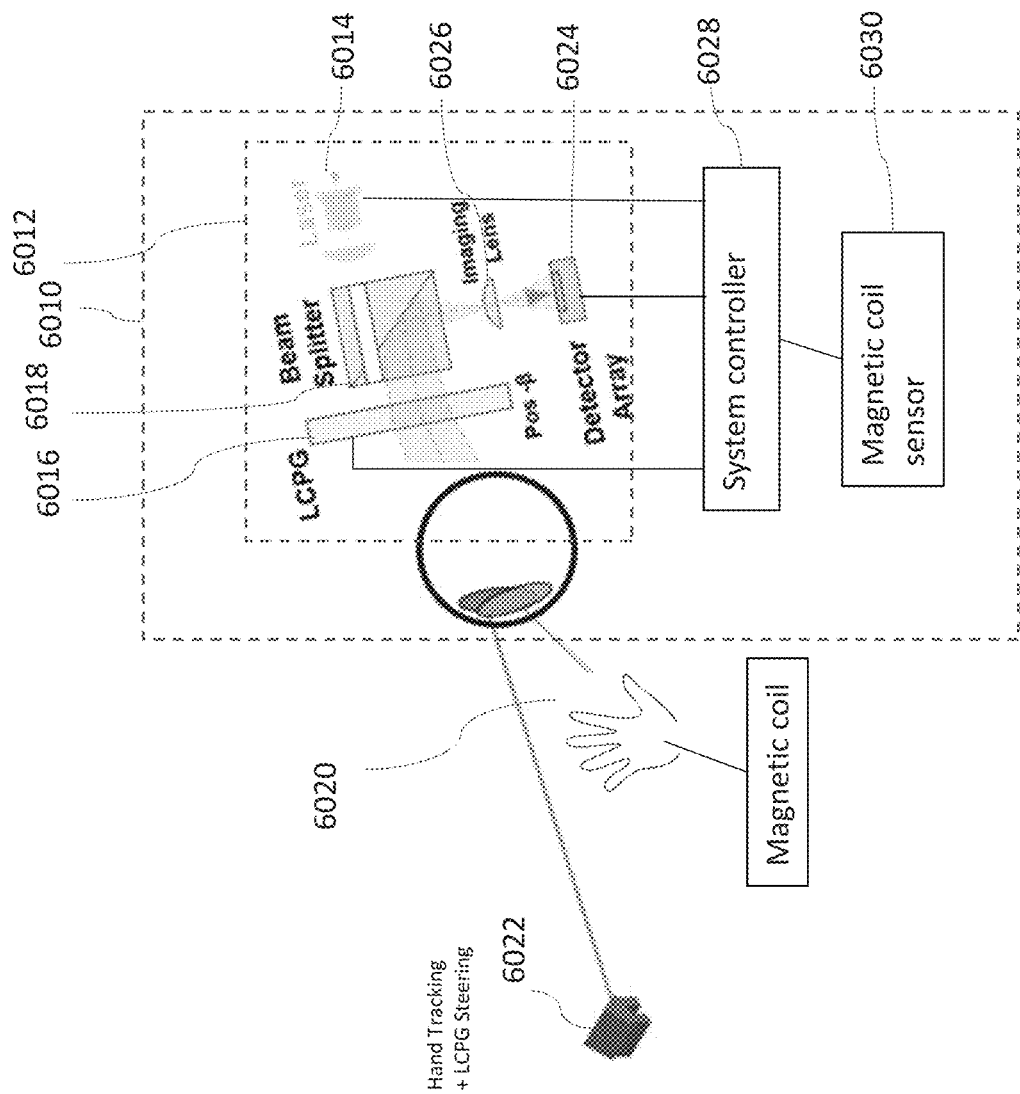
FIG. 37 is a system block diagram of a motion tracking device in accordance with another example of the sixth aspect of the present disclosure.

Referring now to FIG. 37, there is shown another example of the present disclosure. In the example of FIG. 37, instead of two imaging arrays 6012, the motion tracking device 6010 comprises only one imaging array 6012.

In the example described with reference to FIG. 36, having two imaging arrays enables the system controller 6028 to determine a distance between an orientation point 6022 and the tracked object 6020, for example, using parallax calculations. In the example disclosed in FIG. 37, instead of using two imaging arrays 6012, the position of the tracking device 6010 can be determined using a magnetic coil sensor 6030 in conjunction with a single imaging array 6012. The magnetic coil sensor 6030 comprises three orthogonally arranged coils arranged to measure magnetic field fluctuations in three dimensions as the tracking device 6010 moves. In this manner, the system controller 6028 is able to determine movement of the tracking device 6010 without requiring a second imaging array 6012.

Figure 38:
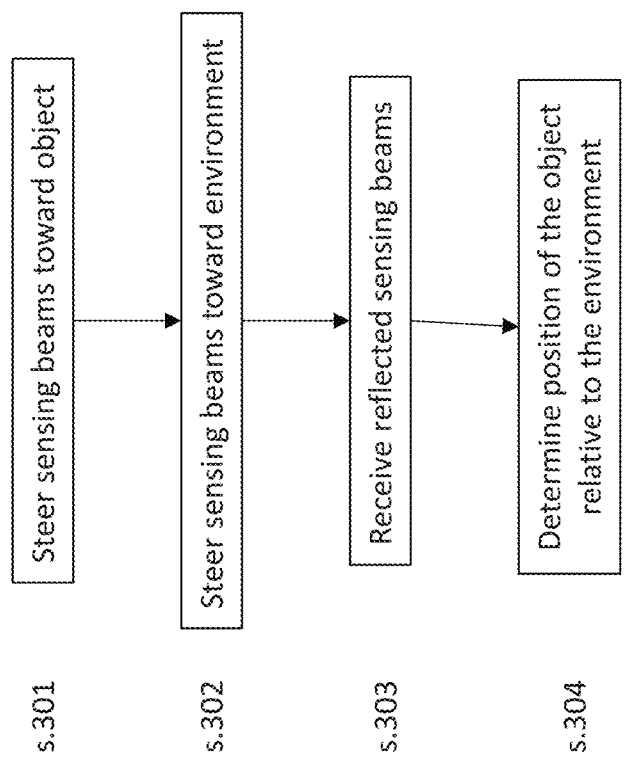
FIG. 38 is a flow diagram of a method in accordance with an example of the sixth aspect of the present disclosure.

Therefore, in the manner described above, and as shown in FIG. 38 at s.301, the LCPG 6016 is arranged to receive a beam of light from the light source 6014 and via the beam splitter 6018. The LCPG 6016 is then arranged to steer the beam of light toward an object 6020, such as a hand, when it is in a first state. Further, at s.302, the LCPG 6016 is also arranged to steer the beam of light toward a point in the environment in which the object 6020 is located, when it is in a second state. Switching of the LCPG 6016 between the first and second state is controlled by the system controller 6028. The point in the environment is used to determine the position or orientation of the object 6020 relative to the environment and, as such, will be referred to hereafter as the orientation point 6022.

When in the first state, the LCPG 6016 will steer the beam of light toward the object 6020. At s.303, the object 6020 will reflect the beam of light back toward the LCPG 6016 which will steer it toward the beam splitter 6018. The beam splitter 6018 then directs the beam of light toward a detector array 6024, via an imaging lens 6026.

Similarly, when in the second state, the LCPG 6016 will steer the beam of light toward the orientation point 6022 associated with the environment in which the object 6020 is located. At s.303, the point 6022 will reflect the beam of light back toward the LCPG 16 which will steer it toward the beam splitter 6018. The beam splitter 6018 then directs the beam of light toward the detector array 6024, via the imaging lens 6026.

At s.304, the motion tracking device 6010 is able to determine, using appropriate logic in the system controller 6028, the position of the object 6020 relative to the orientation point 6022. For example, with reference to the example of FIG. 36, in a similar manner to how human eyes work, parallax enables the motion tracking device 6010 to determine the position of both the object 6020 and the orientation point 6022, such that variations in those positions can be used to determine relative movement between the object 6020 and the orientation point 6022. With reference to the example FIG. 37, at s.304, the system controller 6028 uses the magnetic sensor readings of the magnetic coil sensor 6030 in conjunction with one imaging array 6012 to determine the position of the object 6020 relative to the environment.

Of course, the examples of FIGS. 36 and 37 may be combined, such that the tracking device 6010 comprises two imaging arrays 6012 and a magnetic coil sensor 6030, in order to provide improved motion tracking.

The present motion tracking device 6010 may be used in combination with an IMU in order to compensate for drift in the relative positioning between the object 6020 and the environment. In this manner, the motion tracking device 6010 may be switched off when the IMU is not attempting to account for possible drift in relative positions.

Alternatively, the example described with reference to FIG. 37 may account for drift without the need of an IMU. For example, if the imaging array 6012 determines that motion relative to the environment has occurred, but the magnetic coil sensor detects no change in the magnetic field, it can be inferred by the system controller 6028 that some level of drift has occurred and, therefore, the motion detected by the imaging sensor 6012 can be ignored.

As described above, LCPGs 6016 generally apply a large angular displacement to a received light beam, this enables each imaging array 6012 to quickly switch between imaging an object 6020 and an orientation point 6022 in the environment. This is especially so in the field of hand motion tracking, as motion tracking devices are required to be relatively close to the hand, in order to achieve a high spatial resolution in imaging of the hand's motion. Therefore, a large angular displacement is required in order to ensure that imaging which is intended to be directed toward the orientation point 6022 does not unintentionally image the hand.

The specific location of the orientation point 6022 is not important. It is simply required that the point 6022 remains stationary while object 6020 is in motion, in order that it can act as a reference point for translational motion. In this manner, it may be that some aspects of the environment remain static while other aspects are dynamic (for example, if people are located in the environment). In these situations, it is possible for the motion tracking device 6010 to determine that the orientation point 6022 is a dynamic point and switch to a different orientation point which appears to be static. For example, if the system controller 6028 determines that the object 6020 is moving through the environment in an unusual manner (such as passing through apparently solid objects or simply moving in an erratic way), the device 6010 may react by attempting to locate an alternative orientation point 6022 with respect to which the object 6020 is not moving unusually. Similarly, if the magnetic coil sensor 6030 determiners that there are no variations in the magnetic field, but the imaging array 6012 determines that motion is occurring, it may be inferred that the orientation point is part of a dynamic object and should, therefore, be changed. The location of a new orientation point 6022 can be achieved by changing the field of view of the imaging array(s) 6012.

Resolution of the steering may be enhanced by modifying the wavelength of the beam of light impinging on the LCPG 6016 using the system controller 6028. This is because the output angle of the LCPG 6016 is sensitive to the wavelength of the light. Alternatively, the steering resolution may be enhanced by placing a liquid crystal wave guide (LCWG) between the light source 6014 and LCPG 6016 and using the system controller 6028 to control the LCWG.

The above mentioned disclosure in which a pair of imaging arrays 6012 tracks motion of an object 6020 provides an improved means of tracking motion of the object 6020 with respect to the environment in which it is located. However, although the above-described examples disclose tracking the motion of an object using two imaging arrays, or one imaging array in combination with a magnetic coil sensor, it is to be understood that these examples relate to exemplary embodiments, and that the motion of an object may be tracked using a single imaging array 6012. In this manner, the single imaging array 6012 may determine the relative movement between the object 6020 and the orientation point 6022 by recording changes in the position of the orientation point 6022. The system controller 6028 may then calculate relative movement using appropriate logic. As described above, examples comprising a single imaging array, without the assistance of further components, may find it difficult to account for drift in the tracking device 6010.

In a similar manner to the above example comprising only one imaging array 6012, in examples comprising two imaging arrays (such as that described with reference to FIG. 36), the imaging arrays 6012 may be arranged to monitor the object 6020 and the orientation point 6022 respectively and separately. That is to say, a first imaging array 6012 may be arranged solely to image the object 6020, whereas a second imaging array 6012 may be arranged solely to image the orientation point 6022. In this manner, the system controller 6028 is able to use appropriate logic to determine motion of the object 6020 relative to the environment. The LCPG of each imaging array 6012 allows the imaging arrays 6012 to change which part of the object 6020 or orientation point 6022 they are imaging without mechanical means.

Although described with reference to tracking a hand as part of a hand tracking device, it is to be understood that the present disclosure may relate to the tracking of the motion of any object. For example, the motion tracking device 6010 may be mounted on the torso, head or legs of an individual. Further, the device may be attached to any object for which a user may wish to track specific motion of the object as well as its relative motion to an environment (for example an animal, a vehicle or other such motion-capable objects). Further, the motion tracking device 6010 described herein may be attached directly to an object (such as a wrist-worn or chest-mounted device) or may be held by a user in order to track part of their body (such as a controller).

Various further examples of the sixth aspect of the disclosure will be apparent from the following features, defining further examples of the disclosure. Where a feature of a later example refers to one or more earlier examples, the examples may be considered in combination to provide further examples.

A first example comprises an object tracking device for tracking the motion of an object in an environment, the object tracking device comprising an imaging array. The imaging array comprises: a liquid crystal polarization gratings (LCPG), arranged to steer an electromagnetic sensing beam based upon a state of the LCPG; a light source, arranged to direct the electromagnetic sensing beam through the LCPG; and a detector array, arranged to detect a reflected electromagnetic sensing beam which passes through the LCPG, wherein the imaging array is arranged to repeatedly alter the state of the LCPG such that the object tracking device alternately images the object and an orientation point which forms at least part of the environment.

The object tracking device of the first example may further comprise at least two imaging arrays, and each of the at least two imaging arrays may be arranged to concurrently steer the electromagnetic sensing beam toward the object to be tracked and concurrently steer the electromagnetic sensing beam toward the orientation point. This results in each imaging array imaging the object simultaneously and each imaging array imaging the orientation point simultaneously.

Each imaging array of the previous example may further comprise a controller arranged to modify a wavelength of the electromagnetic sensing beam.

In a fourth example, the object tracking device of the first example may be arranged to determine a position of the object relative to the orientation point.

The determination of the position of the object in the previous example may be performed using parallax.

Wherein further to the object tracking device of the fourth example, in a sixth example the determination of the position of the object is performed using a magnetic coil sensor.

The object tracking device of the first example may be further arranged to determine whether the orientation point is associated with a dynamic object and, if the orientation point is associated with a dynamic object, adjust a field of view of the imaging array in order to determine a new orientation point.

In an eighth example, the object tracking device of the first example may be arranged to track the motion of a hand of a user.

The object tracking device of the previous example may be wrist-mounted.

The object tracking device of the eighth example may be glove-mounted.

The electromagnetic sensing beam source of the object tracking device of the first example may be any of an infra-red, visible light, or ultra-violet beam.

A twelfth example comprises a method of tracking the motion of an object in an environment. The method comprises: steering an electromagnetic sensing beam, using liquid crystal polarization gratings (LCPG), from an imaging array, toward the object; steering the electromagnetic sensing beam, using LCPGs, from the imaging array, toward an orientation point; receiving reflected electromagnetic sensing beams at the imaging array; and determining, based on the reflected electromagnetic sensing beams, the position of the object relative to the orientation point.

The method of the previous example may further comprise performing the steering and receiving steps using two imaging arrays, wherein each of the at least two imaging arrays is arranged to concurrently steer the electromagnetic sensing beam toward the object to be tracked and concurrently steer the electromagnetic sensing beam toward the orientation point. This ensures that each imaging array images the object simultaneously and each imaging array images the orientation point simultaneously.

Steering the light in the twelfth example may comprise modifying a wavelength of the electromagnetic sensing beam.

The determination of the position of the object in the twelfth example may be performed using parallax.

The determination of the position of the object in the twelfth example may alternatively be performed using magnetic field measurements in a sixteenth example.

The method of example twelve may further comprise: determining whether the orientation point is associated with a dynamic object; and, if the orientation point is associated with a dynamic object, adjusting a field of view of the imaging array in order to determine a new orientation point.

The device of the twelfth example may be arranged to track the motion of a hand of a user.

The method of the previous example may further comprise: mounting the device on a wrist of the user, or mounting the device on a glove arranged to be worn by the user.

The electromagnetic sensing beam of the twelfth example may be any of an infra-red, visible light, or ultra-violet beam in a twentieth example.

Seventh Aspect of the Disclosure: Beam Steering Device Using Liquid Crystal Polarization Gratings Beam steering devices are used to enable one or more input light beams to be output across a range of angles. Liquid crystals can be used in such beam steering devices to act as a half wave plate to change the polarization direction of light, from linear polarization to circular polarization, or from right handed circular polarization to left handed circular polarization, and vice versa. Liquid crystals can also be used as a polarization grating to change the angle of light from an initial input angle to a different output angle, based on the input polarization. I.e. right handed circular polarization input light will be output at a first angle, and left handed circular polarization input light will be output at a second (different) angle. Therefore, in combination, a liquid crystal half wave plate and a liquid crystal polarization grating can selectively steer a beam of input light between two output angles. In addition, liquid crystal half wave plates and liquid crystal polarization gratings can be stacked to expand the number of steering angles through which light can be steered.

The output angle of a liquid crystal polarization grating is dependent on the orientation of the liquid crystals that the light beam passes through. The alignment of liquid crystals may be set by mechanical rubbing of the surface, ion beam buffing, or using photoalignment techniques. Among these approaches, photoalignment is the most capable of achieving varying alignment across a substrate. This enables a liquid crystal surface to be modulated, as is necessary to form a polarization grating. The technique can be extended to partition the surface partitioned into a number of different (distinct) polarization gratings by selectively varying the orientation pattern of the liquid crystal surface. Once produced, these partitioned polarization gratings enable light beams to be steered through an even greater number of beam steering angles for a given number of liquid crystal surfaces. Embodiments of the present disclosure provide improved beam steering devices which make use of these partitioned polarization gratings.

FIGS. 39A and 39B illustrate a half wave plate 7110. The half wave plate 7110 may be made from a liquid crystal cell. The liquid crystal cell can be switched from a first state (illustrated in FIG. 39A) in which the polarization of an input light beam is not affected by the liquid crystal cell, to a second state (illustrated in FIG. 39B). The liquid crystal cell of the half wave plate 7110 may be switched from the first state to the second state (and vice versa) by applying (or removing) a voltage across the liquid crystal cell.

In the second state, the liquid crystal cell acts as a half wave plate 7110 and switches the handedness of any input circularly polarized light. Any input light beam with left handed circular polarization will be output with right handed circular polarization. Similarly, any input light beam with right handed circular polarization will be output with left handed circular polarization. FIG. 39B, illustrates this switch of handedness of the polarization of an input light beam by the half wave plate 7110. Consequently, depending on the voltage applied to the liquid crystal cell, the handedness of an input circularly polarized light beam can be switched at will.

Figure 40A:
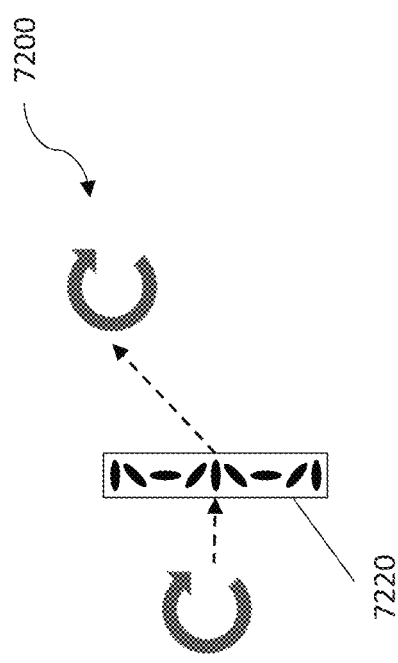
FIGS. 40A and 40B are schematic representations of a polarization grating related to the seventh aspect of the present disclosure.
Figure 40B:
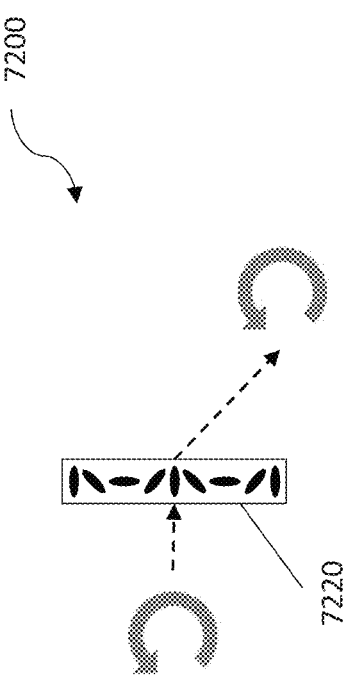

FIGS. 40A and 40B illustrate a polarization grating 7220. The polarization grating 7220 may be formed of a polymerized liquid crystal. The polymerized liquid crystal changes the angle of an input circularly polarized light beam depending on the handedness of the input light beam, FIG. 40A illustrates the change of angle of a left handed circularly polarized light beam as it passes through the polarization grating 7220. FIG. 40B illustrates the change of angle of a right handed circularly polarized light beam as it passes through the polarization grating 7220.

The change of angle caused by the polarization grating 7220 is dependent on the pitch grating of the polarization grating and the wavelength of the input light. The output angle of a given polarization grating 7220 can be calculated by the following formula:

$$\text{Angle } \theta_{out} = \sin^{-1}\left(\frac{\pm \lambda}{\Lambda} + \sin\theta_{in}\right),$$

where λ=wavelength, Λ=grating pitch, m=+1 or −1 depending on input state—right hand circular polarization or left hand circular polarization.

FIG. 41A illustrates a beam steering device 7300 which comprises both a half wave plate 7110 and a polarization grating 7220. Based on the state of the half wave plate, the handedness of an incoming circularly polarized light beam is either switched or not switched. Thereafter, depending on the handedness of the circularly polarized light beam entering the polarization grating, the output beam is deflected to one of two output angles. The skilled person would also understand that the output angles of the beam steering device are also dependent on the wavelength of the incoming light beam (as shown in the above formula).

FIG. 41B illustrates a beam steering device 7300 which is formed from a stack of three half wave plates 7110 and three polarization gratings 7220. For simplicity, the combination of one half wave plate 7110 and one polarization grating 7220 may be referred to as a "stage". Hence, FIG. 41B illustrates a beam steering device with three stages. Each stage of the beam steering device shown in FIG. 41B operates in the manner shown in FIG. 41A. However, by stacking multiple stages, the number of angles between which an input beam can be steered multiplies by a factor of $2^N$, where N is the number of stages.

In other words, for beam steering devices with 2 stages, there are 4 possible steering angles for a given wavelength of input light. For 3 stages, there are 8 possible steering angles, and for 4 stages there are 16 possible stages.

FIG. 42 illustrates a first example of the present disclosure. FIG. 42 illustrates a beam steering device 7400 in which the half wave plate layer has been partitioned into three sections 7110a, 7110b, 7110c. The sections may be partitioned by using any known applicable photo alignment process. Photo alignment processes enable liquid crystals to be orientated in any preferred angle. By applying different orientations to the liquid crystals in different sections of the half wave plate layer, distinct sections (7110a to 7110c) of half wave plate may be formed. This enables a single voltage applied across the entirety of the half wave plate layer to produce different switching effects in different sections (7110a to 7110c). For example, 2 sections of the half wave plate layer may be orientated such that they are "on" at a set voltage, whilst the third section is switched "off".

Alternatively, the half wave plate sections (7110a to c) may be formed by providing separate control electronics (not shown) to each section, enabling each section to be switched from their first ("off") state to their second ("on") state independently.

Beam steering device 7400 also comprises a polarization grating layer that has been partitioned into three sections 7220a, 7220b, 7220c. The half wave plate layer and the polarization grating layer are arranged in series such that each half wave plate section (7110a to c) is aligned with one of said polarization grating sections (7220a to c). This alignment is also such that a light beam passing through a half wave plate section (7110a to c) also passes through a corresponding polarization grating section (7220a to c).

In the present example, each section is provided with a distinct light beam which is arranged to pass through just one half wave plate section and one polarization grating section. In an alternative, fewer light beams than the number of sections in each layer may be provided.

The polarization grating layer may be formed from a polymerized liquid crystal which, when photoaligned, forms a polarization grating. A polymerized liquid crystal will maintain its orientation after the photoaligning process is complete. As shown in FIG. 42, each section (7220a to c) of the polarization grating layer may be photo aligned to have a different orientation pattern, thereby having a different grating pitch. Consequently, each section (7220a to c) may have a different set of output angles (in accordance with their grating pitch).

As shown in FIG. 42, each stage (when partitioned into three sections) can steer light beams through 6 different output angles. If more sections are provided, additional output angles may be provided (2 additional angles per stage).

As with FIG. 41B, the present example of a beam steering device may be formed from a stack of the partitioned half wave plates (7110a to c) and partitioned polarization gratings (7220a to c). However, whereas in FIG. 41B the number of angles between which an input beam can be steered multiplies by a factor of $2^N$, the number of angles between which an input beam can be steered in the present example multiplies by a factor of $L*2^N$, where L is the number of sections in the layers and N is the number of stages.

Therefore, in both stacked and non-stacked beam steering devices, the provision of partitioned polarization grating layers and half wave plate layers can increase the number of angles between which an input beam can be steered.

Figure 43:
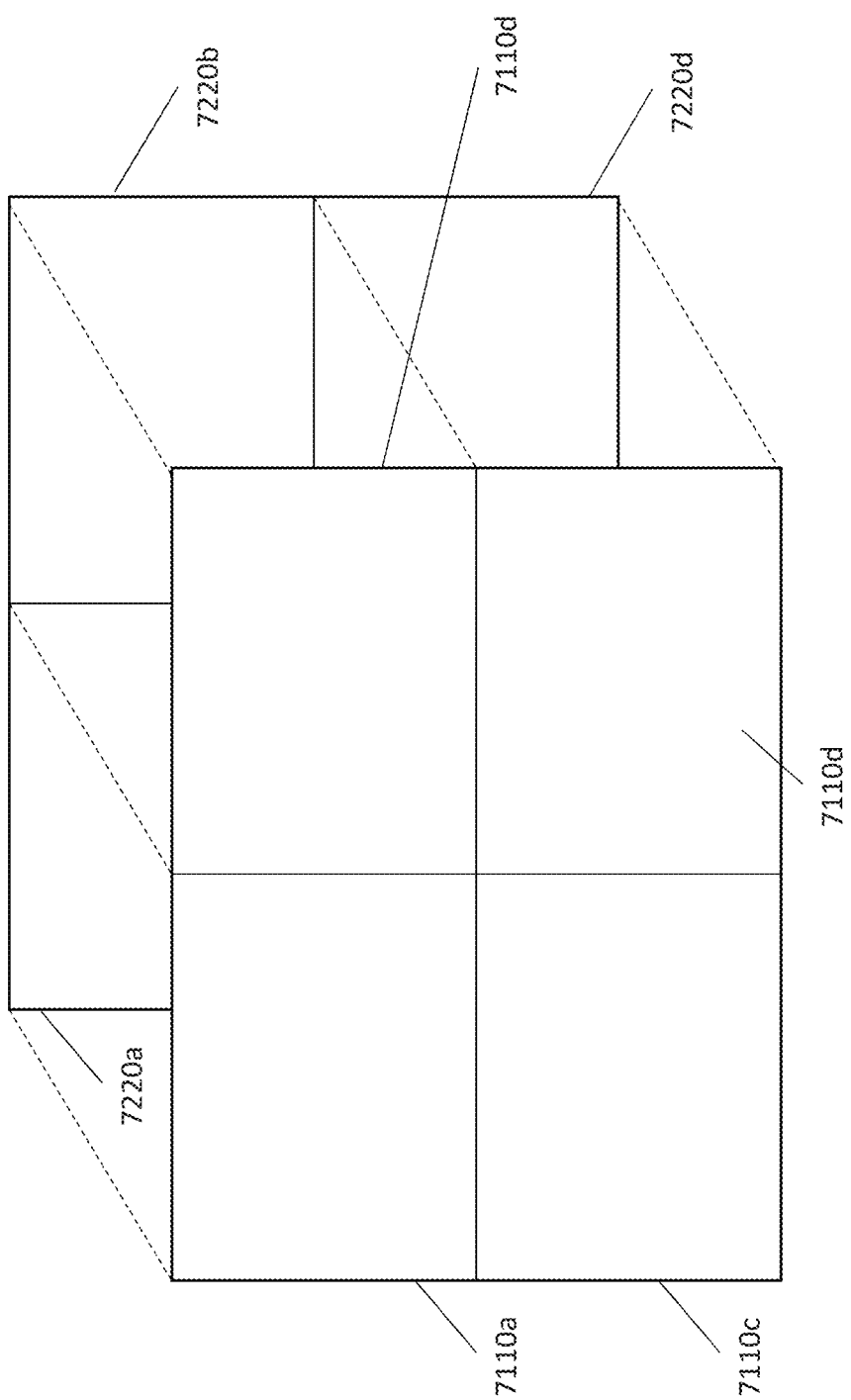
FIG. 43 is a schematic representations of a beam steering device in accordance with a first example of the seventh aspect of the present disclosure.

It would be evident to the skilled person that each half wave plate layer and polarization grating layer may be divided into any number of sections, dependent on the size of the layers and the resolution of the photoaligning process. FIG. 42 illustrates layers which each have three sections set out in a one-dimensional array. However, the present example may include any number of sections. In addition, the layers may be partitioned into a two-dimensional array. FIG. 43 illustrates such an example two-dimensional array which has four sections (set out in 2 by 2) in each layer. In FIG. 43, the four sections of half wave plate (7110*a* to *d*) are visible, and three of the underlying aligned polarization grating sections (7220*a*, *b* and *d*) are visible.

In the above example, the polarization grating layer may be formed as a "fixed" grating by use of, for example, a polymerized liquid crystal. In an alternative, the polarization grating layer may be formed with one or more liquid crystal cells, which provide a "switchable" polarization grating layer. Wherein, in a first state, the liquid crystal cell does not deflect an incoming light beam from its incident angle. In a second state, the liquid crystal cell may act as a polarization grating layer as described above, causing an incident light beam to be deflected by an angle in accordance with the following formula:

$$\text{Angle } \theta_{out} = \sin^{-1}\left(\frac{m\lambda}{\Lambda} + \sin\theta_{in}\right),$$

where $\lambda$=wavelength, $\Lambda$=grating pitch, m=0 (grating off), +1 or −1 depending on input state—grating on, right hand circular polarization or left hand circular polarization.

Figure 44A:
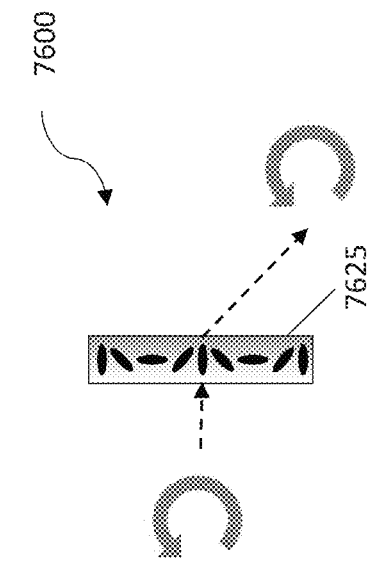
FIGS. 44A to 44D are schematic representations of a switchable polarization grating related to the seventh aspect of the present disclosure.
Figure 44B:
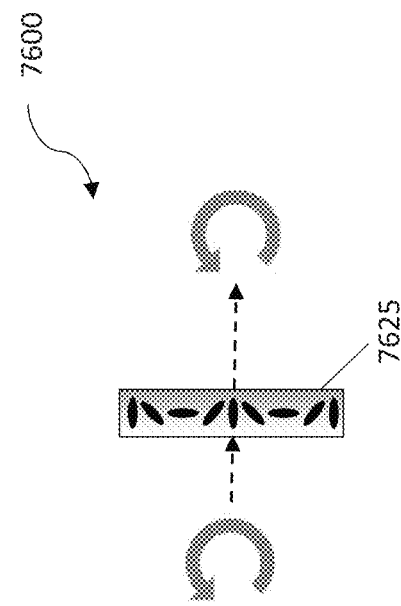
Figure 44C:
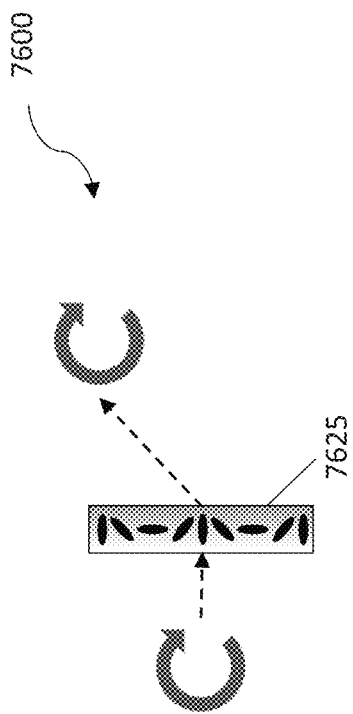
Figure 44D:
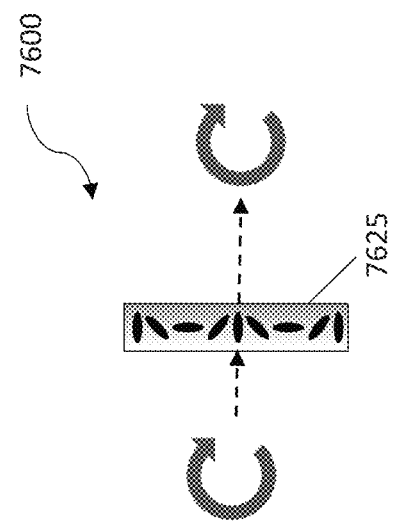

An advantage of using a switchable polarization grating layer is that the number of steering angles for a given polarization grating layer increase from 2 to 3. The three possible steering angles are shown in FIGS. 44A to 44D. In FIG. 44A, polarization grating 7625 is switched on and a left handed circular polarized input beam is deflected at a first angle. In FIG. 44B, the polarization grating 625 is switched on and a right handed circular polarized input beam is deflected at a second angle. In FIGS. 44C and 44D, polarization grating 7625 is switched off and neither a left handed circular polarized input beam (FIG. 44C) nor a right handed circular polarized input beam (FIG. 44D) is deflected from their incident angle. Hence the three steering angles of a switchable polarization grating layer are: +θ, −θ or 0.

Figure 45A:
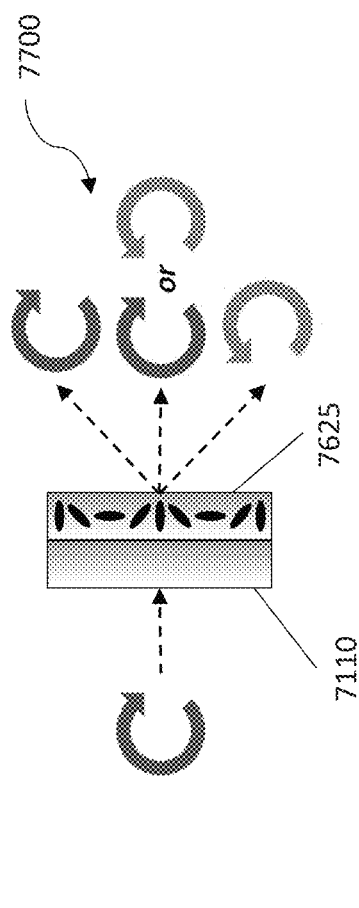
FIG. 45A is a schematic representations of a beam steering device comprising a switchable half wave plate and a switchable polarization grating related to the seventh aspect of the present disclosure.
Figure 45B:
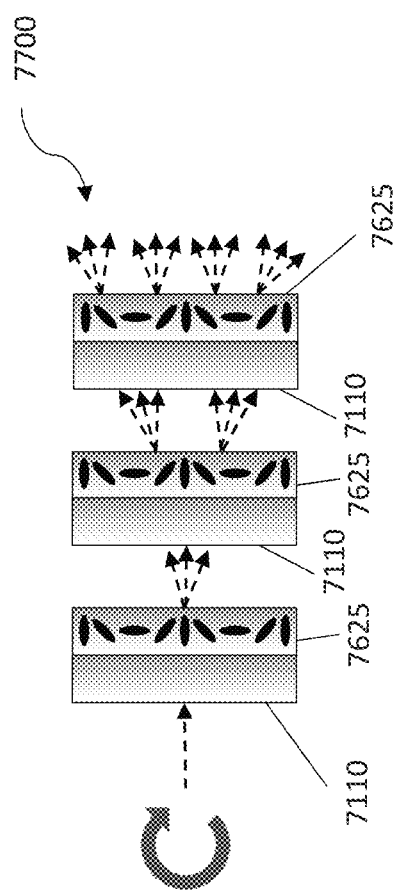
FIG. 45B is a schematic representations of a beam steering device comprising a stack of three switchable half wave plates and three switchable polarization gratings related to the seventh aspect of the present disclosure.

As with the non-switchable polarization layer, a beam steering device 7700 may be formed from a stack of stages of half wave plates 7110 and switchable polarization gratings 7625. FIG. 45B illustrates a beam steering device 7700 which is formed from a stack of three such stages (three half wave plates 7110 and three switchable polarization gratings 7625). Each stage of the beam steering device shown in FIG. 45B operates in the manner shown in FIG. 45A. However, by stacking multiple stages, the number of angles between which an input beam can be steered multiplies by a factor of $3^N$, where N is the number of stages. The steering angle for each stage should be chosen so as to avoid angle duplication of the combined output beam.

In other words, for beam steering devices with 2 stages, there are 9 possible steering angles for a given wavelength of input light. For 3 stages, there are 27 possible steering angles.

Figure 46:
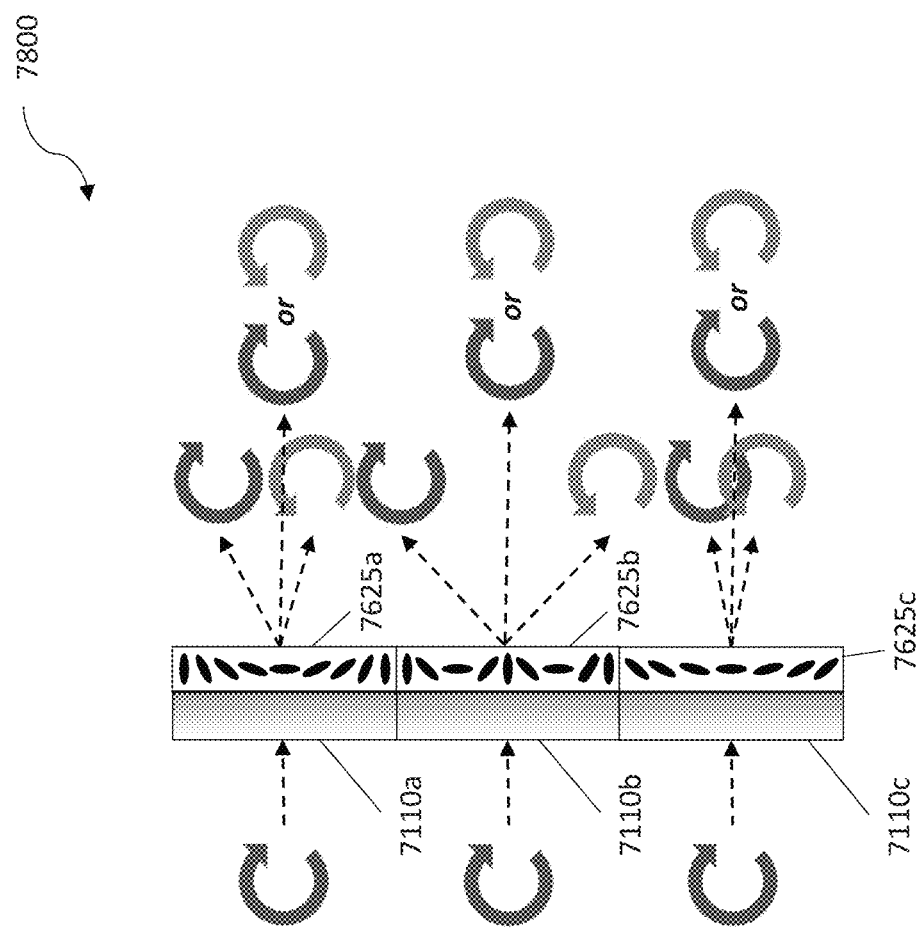
FIG. 46 is a schematic representations of a beam steering device in accordance with a second example of the seventh aspect of the present disclosure.

FIG. 46 illustrates a second example of the present disclosure. FIG. 46 illustrates a beam steering device 7800 in which the half wave plate layer has been partitioned into three sections 7110*a*, 7110*b*, 7110*c*. The sections may be partitioned by using any known photo alignment process. By applying different orientations to the liquid crystals in different sections of the half wave plate layer, distinct sections (7110*a* to 7110*c*) of half wave plate may be formed. This enables a single voltage applied across the entirety of the half wave plate layer to produce different switching effects in different sections (7110*a* to 7110*c*). For example, two sections of the half wave plate layer may be orientated such that they are "on" at a set voltage, whilst the third section is switched "off".

Alternatively, the half wave plate sections (7110*a* to *c*) may be formed by providing separate control electronics (not shown) to each section, enabling each section to be switched from their first ("off") state to their second ("on") state independently.

Beam steering device 7800 also comprises a switchable polarization grating layer that has been partitioned into three sections 7625*a*, 7625*b*, 7625*c*. The half wave plate layer and the switchable polarization grating layer are arranged in series such that each half wave plate section (7110*a* to *c*) is aligned with one of said switchable polarization grating sections (7625*a* to *c*). This alignment is also such that a light beam passing through a half wave plate section (7110*a* to *c*) also passes through a corresponding switchable polarization grating section (7625*a* to *c*).

In the present example, each section is provided with a distinct light beam which is arranged to pass through just one half wave plate section and one polarization grating section. In an alternative, fewer light beams than the number of sections in each layer may be provided.

The switchable polarization grating layer may be formed from one or more liquid crystal cells which, when aligned, form a polarization grating. The liquid crystal cell(s) may be switched between non-deflecting and deflecting states as described previously. Moreover, the liquid crystal cells may be photo aligned to have a particular grating pitch in their "deflecting state". As shown in FIG. 46, each section (7625*a* to *c*) of the switchable polarization grating layer may be photo aligned to have a different orientation pattern when in their deflecting state, thereby having a different grating pitch. Consequently, each section (7625*a* to *c*) may have a different set of output angles (in accordance with their grating pitch).

As shown in FIG. 46, each stage (when partitioned into three sections) can steer light beams through 9 different output angles. If more sections are provided, additional output angles may be provided (3 additional angles per stage).

As with the first example, the present example of a beam steering device may be formed from a stack of the partitioned half wave plates (7110*a* to *c*) and partitioned switchable polarization gratings (7625*a* to *c*). However, whereas in the first example the number of angles between which an input beam can be steered multiplies by a factor of $L*2^N$, the number of angles between which an input beam can be steered in the present example multiplies by a factor of $L*3^N$, where L is the number of sections in the layers and N is the number of stages.

Therefore, in both stacked and non-stacked beam steering devices, the provision of partitioned switchable polarization grating layers and half wave plate layers can further increase the number of angles between which an input beam can be steered.

In each of the above described examples, the beam steering device may further comprise one or more quarter wave plates. The quarter wave plate(s) being arranged in between the light source(s) and the half wave plate layer.

The quarter wave plates may function to convert incident linearly polarized light into circularly polarized light.

In the above described examples, the half wave plate layer(s) have been described as having an equivalent number of sections as the sectioned polarization grating layer(s). In an alternative, the half wave plate layer(s) may have only a single "section", or a reduced number of sections as compared to the number of sections of the polarization grating layer(s).

In all of the above examples, control over which angle(s) the beam steering device outputs light may be achieved by selective control of a corresponding array of input light sources, such as an array of lasers (for example a vertical-cavity surface-emitting laser (VCSEL) or edge emitting laser (EEL)).

Figure 63B:
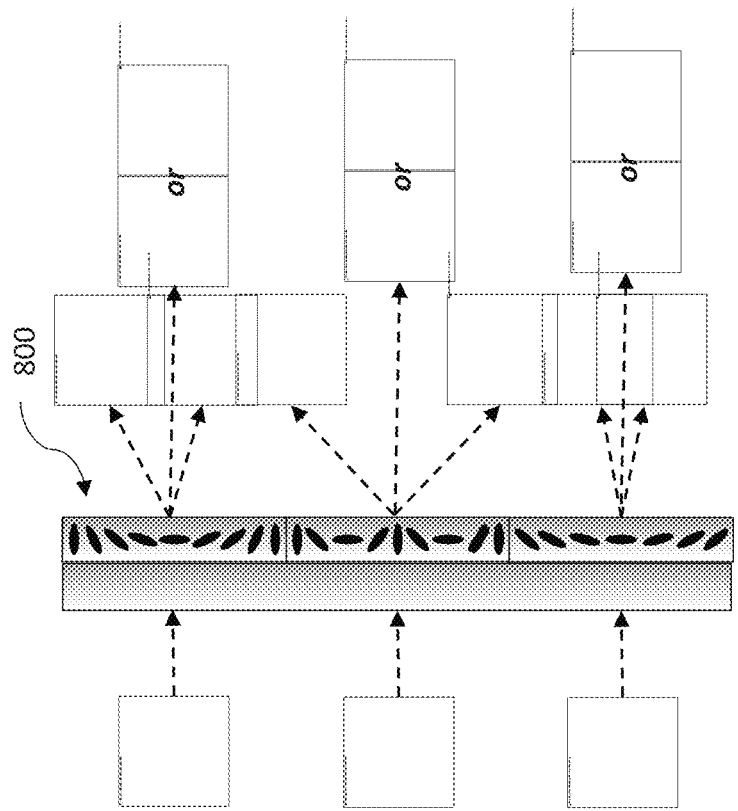
FIGS. 63A and 63B are schematic representations of beam steering devices in accordance with the seventh aspect of the present disclosure.
Figure 63A:
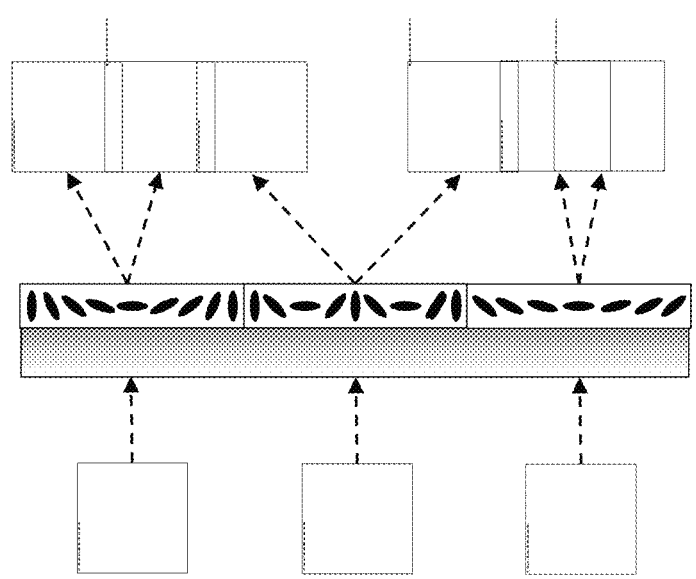

Provision of an array of light source(s) which can be selectively controlled enables the provision of a beam steering device with only a single half wave plate section to control multiple sections of a polarizing grating layer. FIGS. 63A and 63B illustrate two such beam steering devices.

FIG. 63A illustrates a beam steering device (7900) comprised of a half wave plate layer (7110) in a single section, in conjunction with a non-switchable polarization grating layer divided into three sections (7220a to c).

FIG. 63B illustrates an alternative beam steering device (7950) comprised of a half wave plate layer (7110) in a single section, in conjunction with a switchable polarization grating layer divided into three sections (7625a to c).

Various further examples of the seventh aspect of the disclosure will be apparent from the following features, defining further examples of the disclosure. Where a feature of a later example refers to one or earlier examples, the examples may be considered in combination to provide further examples.

A first example comprises a beam steering device for steering light beams passing through the device. The beam steering device comprises: a half wave plate layer which is switchable between a polarization altering state and a non-polarization altering state; a polarization grating layer, partitioned into at least two polarization grating sections. Where the half wave plate layer and the polarization grating layer are arranged in series such that a light beam passing through the half wave plate layer also passes through one of said polarization grating sections.

The half wave plate layer of the beam steering device of the first example may be partitioned into at least two half wave plate sections, each of said half wave plate sections being aligned with one of said polarization grating sections.

Each of the at least two half wave plate sections of the previous example are independently controllable to switch between said polarization altering state and said non-polarization altering state.

At least one of the polarization grating sections of the beam steering device of the first example may comprise a liquid crystal cell, the liquid crystal cell being switchable between a beam deflecting state and a non-beam deflecting state.

At least two of the polarization grating sections of the beam steering device of the first example may comprise a liquid crystal cell, the liquid crystal cells being switchable between a beam deflecting state and a non-beam deflecting state, and wherein the liquid crystal cells are independently controllable to switch between said beam deflecting state and said non-beam deflecting state.

The beam steering device of the first example may further comprise multiple stages arranged in a stack. Each stage may comprise one of said half wave plate layers and one of said polarization grating layers, to permit for greater angular deflection of the beam than available from a single stage.

The polarization grating pitch angle of the first example may differ between the at least two polarization grating sections. This permits for different angular deflection of the beam from each polarization grating section.

The half wave plate layer of the beam steering device of the first example may be partitioned into an array of half wave plate sections and wherein the polarization grating layer is partitioned into a corresponding array of polarization grating sections.

A ninth example comprises the beam steering device of the eighth example, wherein both the array of half wave plate sections and the array of polarization grating sections are two-dimensional arrays with at least two sections in each dimension.

The beam steering device of the first example may further comprise at least two light sources, each light source arranged to project a light beam though said half wave plate layer and then through one of said polarization grating sections.

The beam steering device of the previous example may further comprise a quarter wave plate, the quarter wave plate arranged in between the at least two light sources and the half wave plate layer.

A twelfth example comprises a method of forming a beam steering device. This method comprises: forming a half wave plate layer; forming a polarization grating layer; applying a photo aligning process to said polarization grating layer to partition said polarization grating layer into at least two polarization grating sections, and where the half wave plate layer and the polarization grating layer are arranged in series such that a light beam passing through said half wave plate layer also passes through a corresponding polarization grating section.

The method of the previous example may further comprise the step of applying a photo aligning process to said half wave plate layer to partition said half wave plate layer into at least two half wave plate sections. Where each half wave plate section is aligned with one of said polarization grating sections.

The method of the previous example may further comprise the step of: forming a stack from multiple stages, each stage comprising one of said half wave plate layers and one of said polarization grating layers, to permit for greater angular deflection of the beam than available from a single stage.

The photo aligning process applied to the polarization grating layer in the twelfth example may cause the polarization grating pitch angle to differ between the at least two polarization grating sections. This permits for different angular deflection of the beam from each polarization grating section.

In a sixteenth example, the half wave plate layer of the twelfth example may be partitioned into an array of half wave plate sections. The polarization grating layer of the twelfth example may be also partitioned into a corresponding array of polarization grating sections.

Both the array of half wave plate sections and the array of polarization grating sections, of the previous example may be formed as two-dimensional arrays with at least two sections in each dimension.

Eighth Aspect of the Disclosure: Beam Scanner Using Liquid Crystal Polarization Grating As autonomous and computer-assisted vehicles continue to be developed the need for accurate sensors increases. In particular, for autonomous and computer assisted vehicle applications, whether ground-based, water-based or airborne, the ability to sense over as wide a field of view (FOV) as possible with the same sensor is useful, as it removes or reduces the problems of data integration from many narrow field of view sensors. Two recently developed optical components, being the liquid crystal waveguide (LCWG), and the liquid crystal polarization grating (LCPG) each provide beam steering capabilities, but with different characteristics. In particular, an LCWG is able to provide fine control of the direction of a beam of light being passed there through, but only over a narrow angle range. Conversely, by stacking multiple LCPGs one on top of the other, alternating orthogonally, then wide angle beam steering capabilities can be obtained, but with only very coarse control of the resultant beam steering angle that is obtained. Embodiments of the present disclosure provide an improved hybrid beam steering arrangement that makes use of a series combination of at least one LCWG together with an LCPG to obtain wide angle accurate beam steering for sensing purposes.

Figure 47:
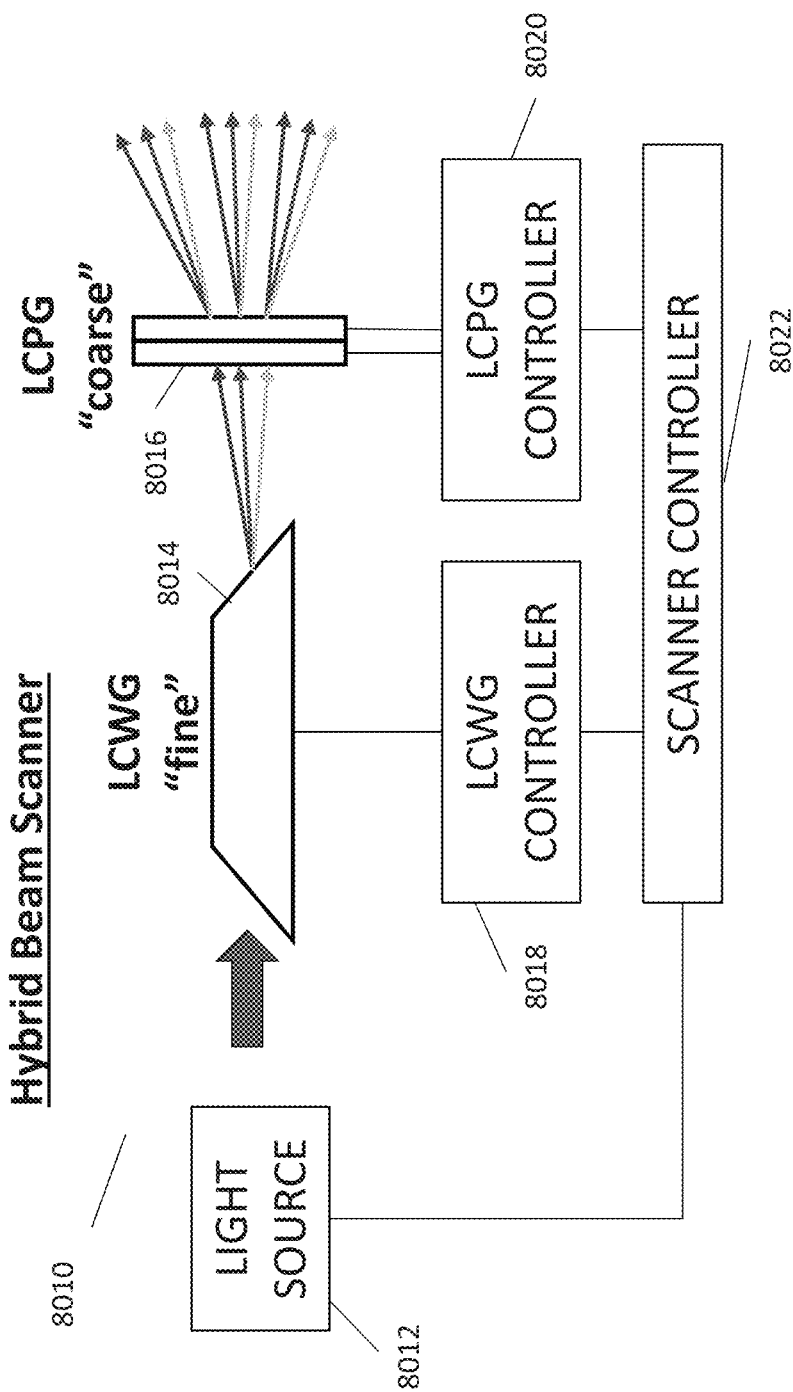
FIG. 47 is a system block diagram of a beam scanner transmitter in accordance with a first example of the eighth aspect of the present disclosure.

FIG. 47 illustrates a first example of the present disclosure, being a hybrid beam scanning transmitter 8010 comprising a LCWG 8014 in series with a LCPG 8016. A light source 8012, such as for example a laser diode, is provided, that directs a beam of light into the LCWG. Overall control of the scanner is provided by a scanner controller 8022, which in turn controls specific LCWG controller 8018 and LCPG controller 8020, which respectively control the LCWG 8014 and LCPG 8016. The LCPG is a multiple layer LCPG with orthogonally stacked gratings to permit two-dimensional beam steering of a beam of light passing through the LCPG. As will be described, multiple orthogonal grating layers may be stacked in the LCPG, to increase the field of view.

Figure 59:
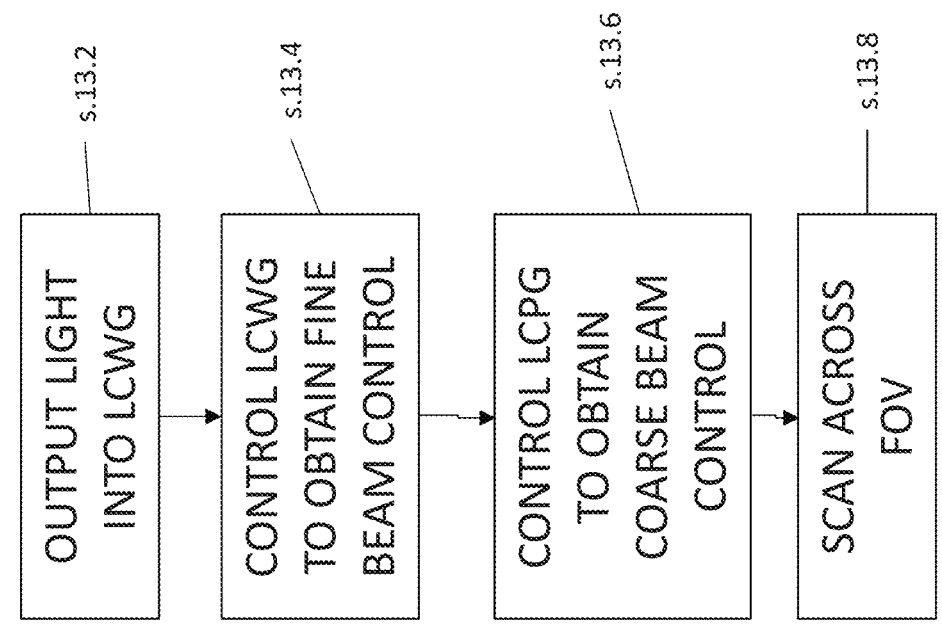
FIG. 59 is a flow diagram illustrating the operation of the beam scanner transmitter of the first example of the eighth aspect of the present disclosure.

FIG. 59 shows the operation of the hybrid beam scanning transmitter 8010 of FIG. 47. At s.13.2 the light source 8012 outputs lights into the LCWG, which is controlled at s.13.4 by the LCWG controller 8018 to obtain fine angular beam control. That is, the LCWG is able to finely control the beam angle and direction output therefrom in very fine increments, for example 0.5°, to give fine directional control. The beam output from the LCWG is received at and passes through the LCPG 8016, which is controlled by the LCPG controller 8020 at s.13.6 to apply a further beam angle displacement thereto. However, in contrast to the LCWG, the LCPG applies a much larger angular displacement to the beam, for example up to as much as 40° or 50°, with a greater displacement being obtainable from a grating having a larger number of individual LCPG stacked together. However, the control available over the LCPG in terms of the selectable angular resolution obtainable from the LCPG component is much less than is obtainable from the LCWG.

However, by controlling both the LCPG and the LCWG simultaneously using their respective controllers 8018 and 8020, under the overall control of scanner controller 8022, it becomes possible to scan across a wide field of view with accurate beam and scanning spot placement. FIGS. 48 to 51 illustrate examples.

Figure 48:
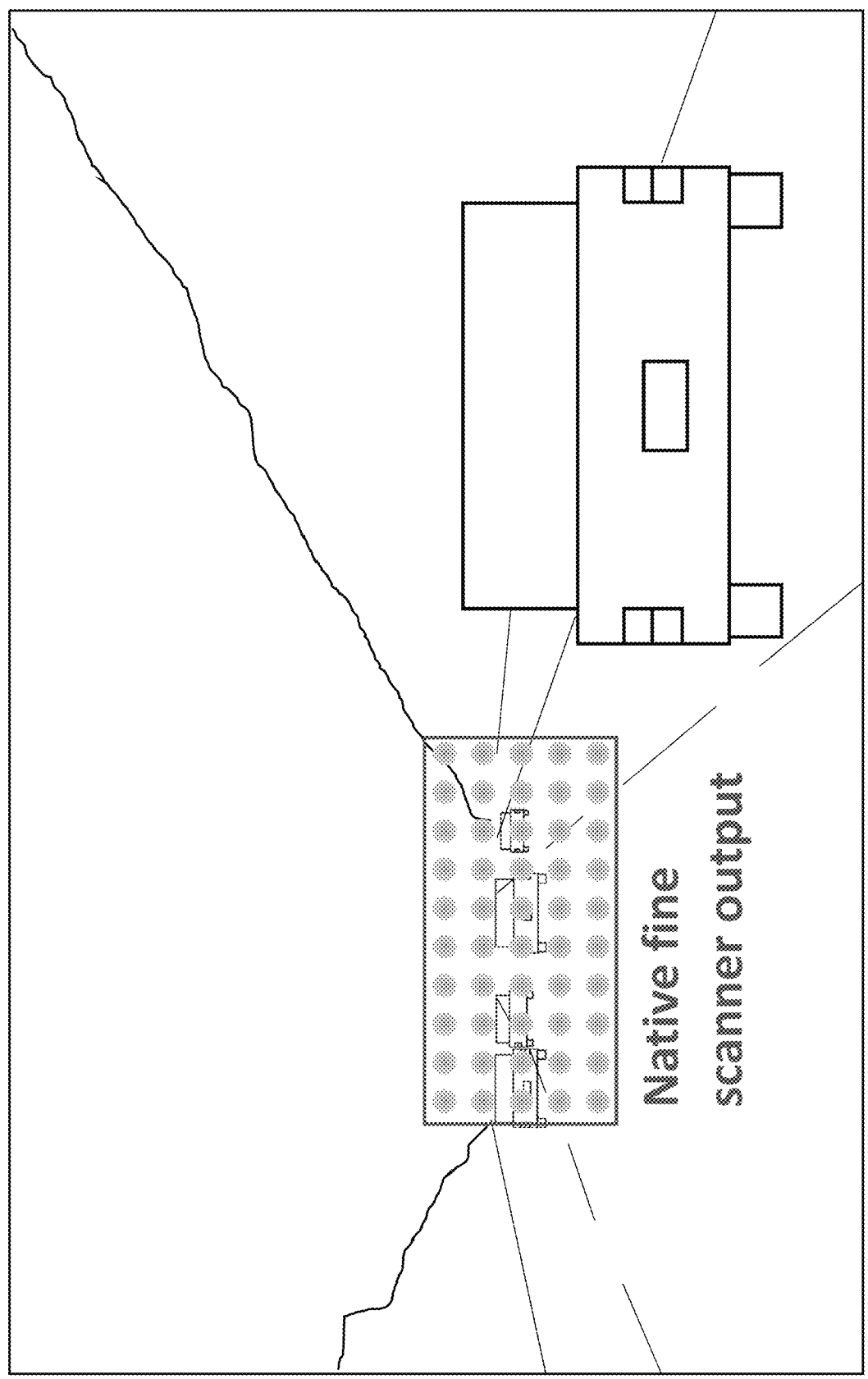
FIGS. 48 to 51 are photographs illustrating the field of view of the beam scanner transmitter of the example of the eighth aspect of the present disclosure.

Referring first to FIG. 48, this shows the field of view obtainable from a native fine-angle resolution scanner mounted on a sensor carrying car, for example a scanner which uses only a LCWG as the beam steering element. As will be seen, using only a native fine LCWG scanner, only a relatively small field of view of is obtained, which in this case is directed at the car in front which is in the same lane as the car that is carrying the sensor. However, this narrow field of view fails to capture the car in the lane next to the sensor carrying car, even though that car (the Tesla Model S) is much closer to the sensor carrying car. If the Tesla was to make a maneuver into the path of the sensor carrying car, then it may not be detected until a crash is unavoidable.

Figure 49:
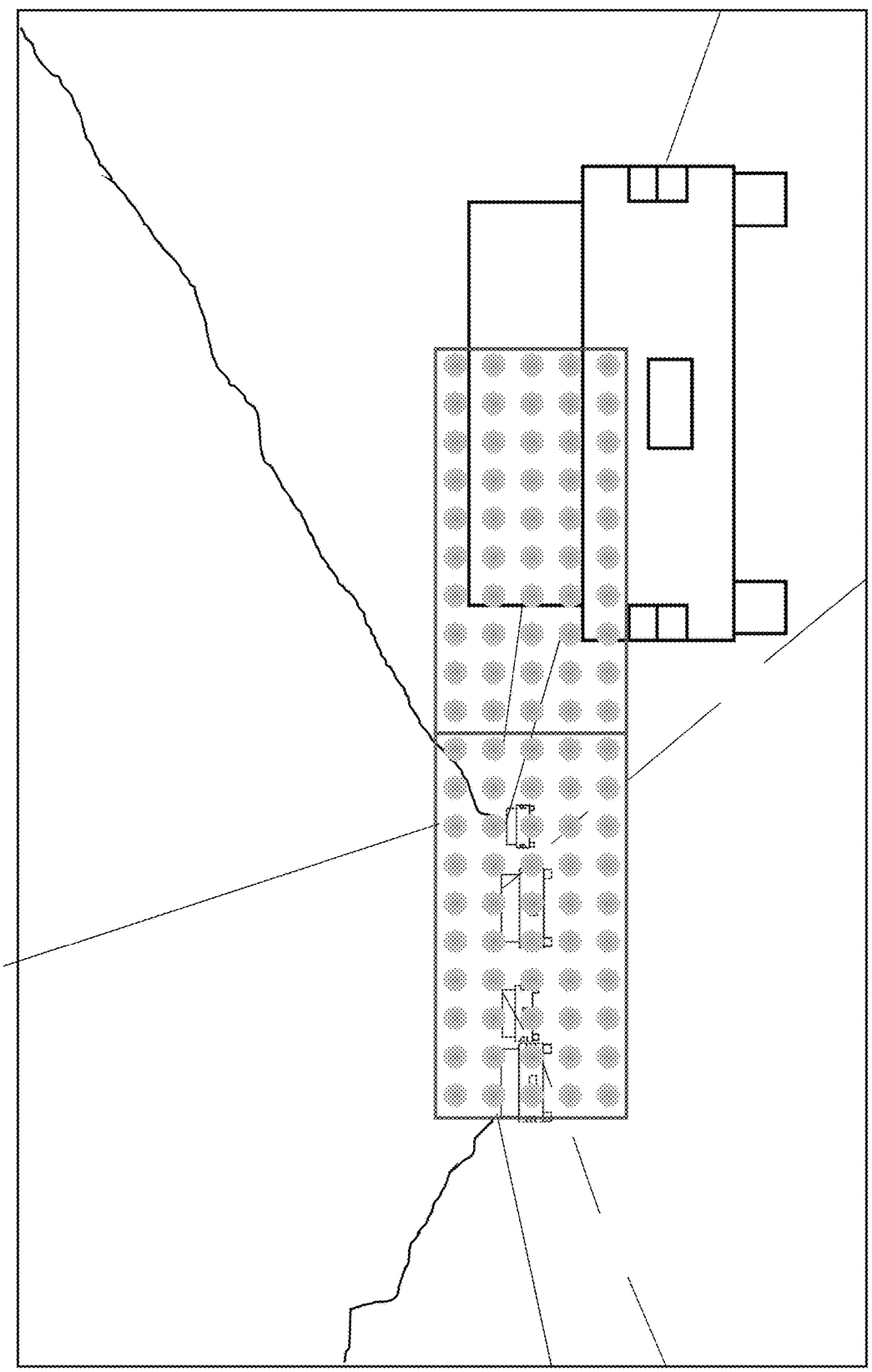

To remedy this issue, using the arrangement of the present example the LCPG is arranged to widen the field of view of the LCWG sensor. FIG. 49 shows one example where an LCPG is used that is able to widen the field of view laterally, by applying an angle to divert the sensor beam to an additional sensing area to the side of the original sensing area. However the additional sensing area encompasses the Tesla, and hence maneuvers of the Tesla would be detected.

Figure 50:
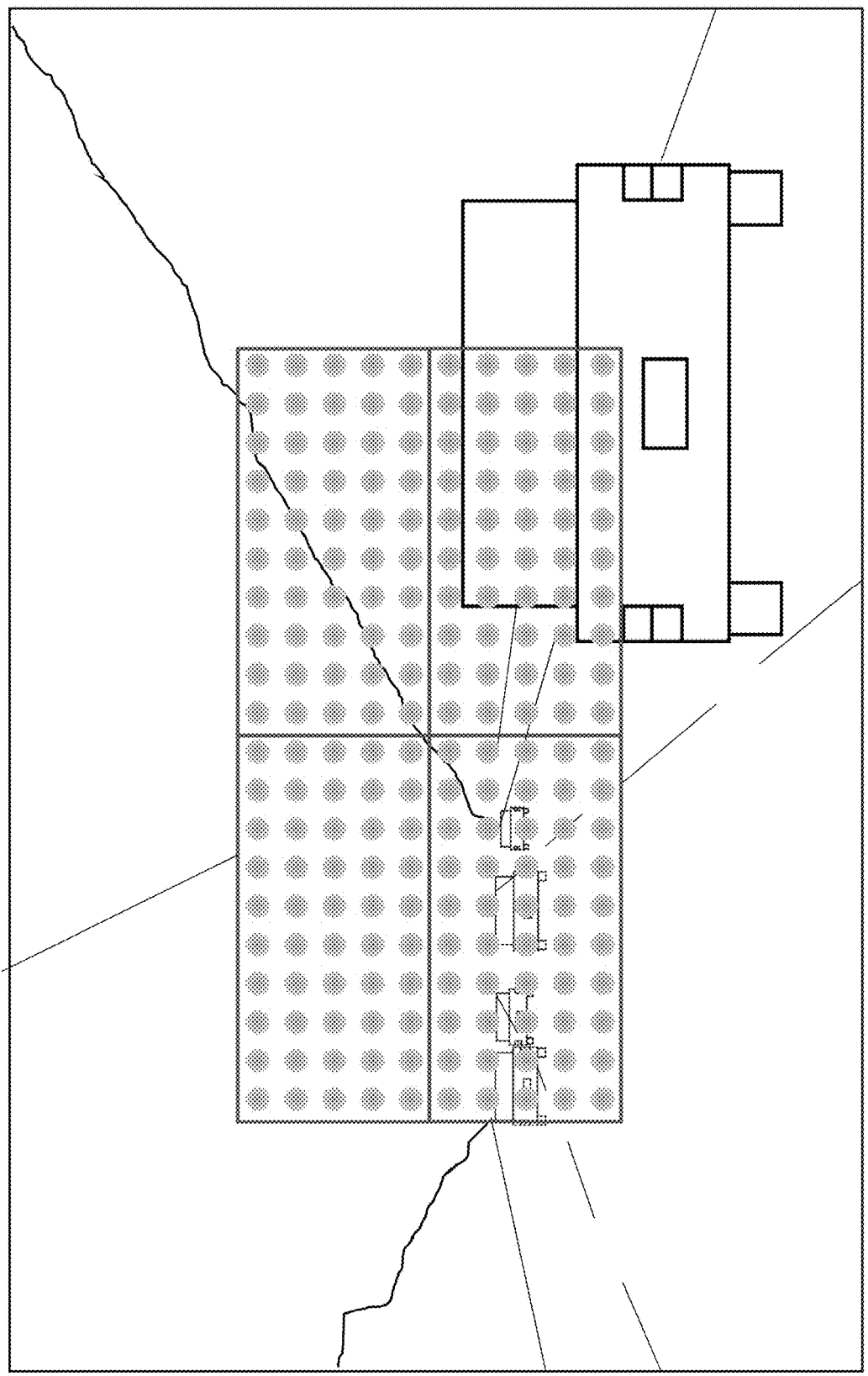
Figure 51:
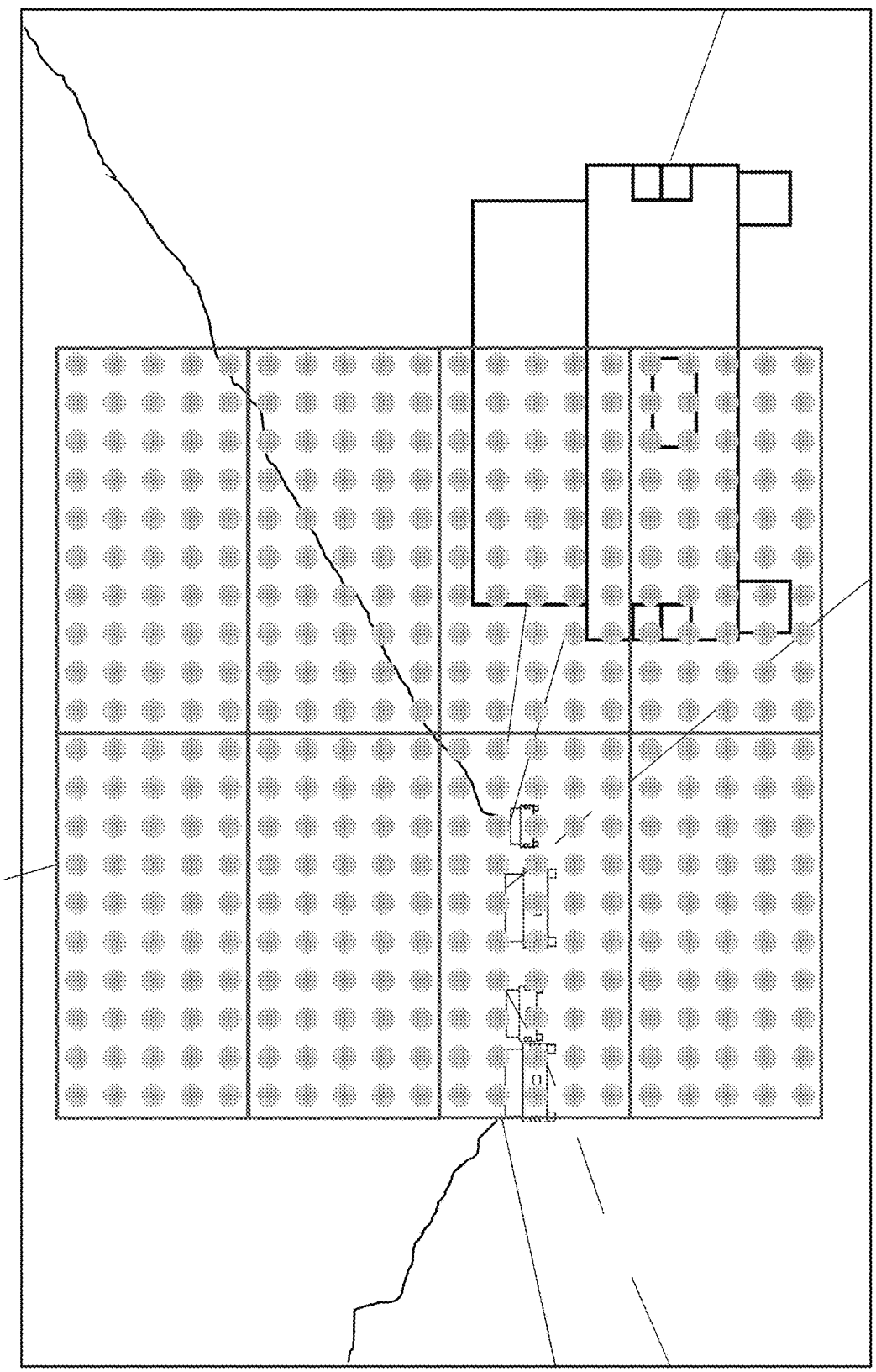

FIG. 50 illustrates a further example, where further layers are included in the LCPG stack to enable the LCPG to provide for additional beam steering in the vertical direction, as well as laterally. Providing even more layers in the LCPG stack can extend the field of view even further, for example by extending the field of view further vertically in both up and down directions, as shown in FIG. 51. As will be understood, the extent of the field of view obtainable is dependent on the number of layers in the LCPG stack that are chosen, with more layers leading to greater possible beam steering angles being obtainable.

Within the field of view (defined by the number of stacks in the LCPG, and the resulting beam angular displacement obtainable), the scanner operates to scan across the FOV on a spot by spot basis, as shown, with appropriate control of the LCPG and LCWG by their respective controllers being applied to obtain the scan.

Various spot beam scan patterns may be used to cover the whole FOV, although simple raster scan patterns may be used. For wider FOV, the individual spot sample rate will naturally be lower, with more spots to sample.

Figure 52:
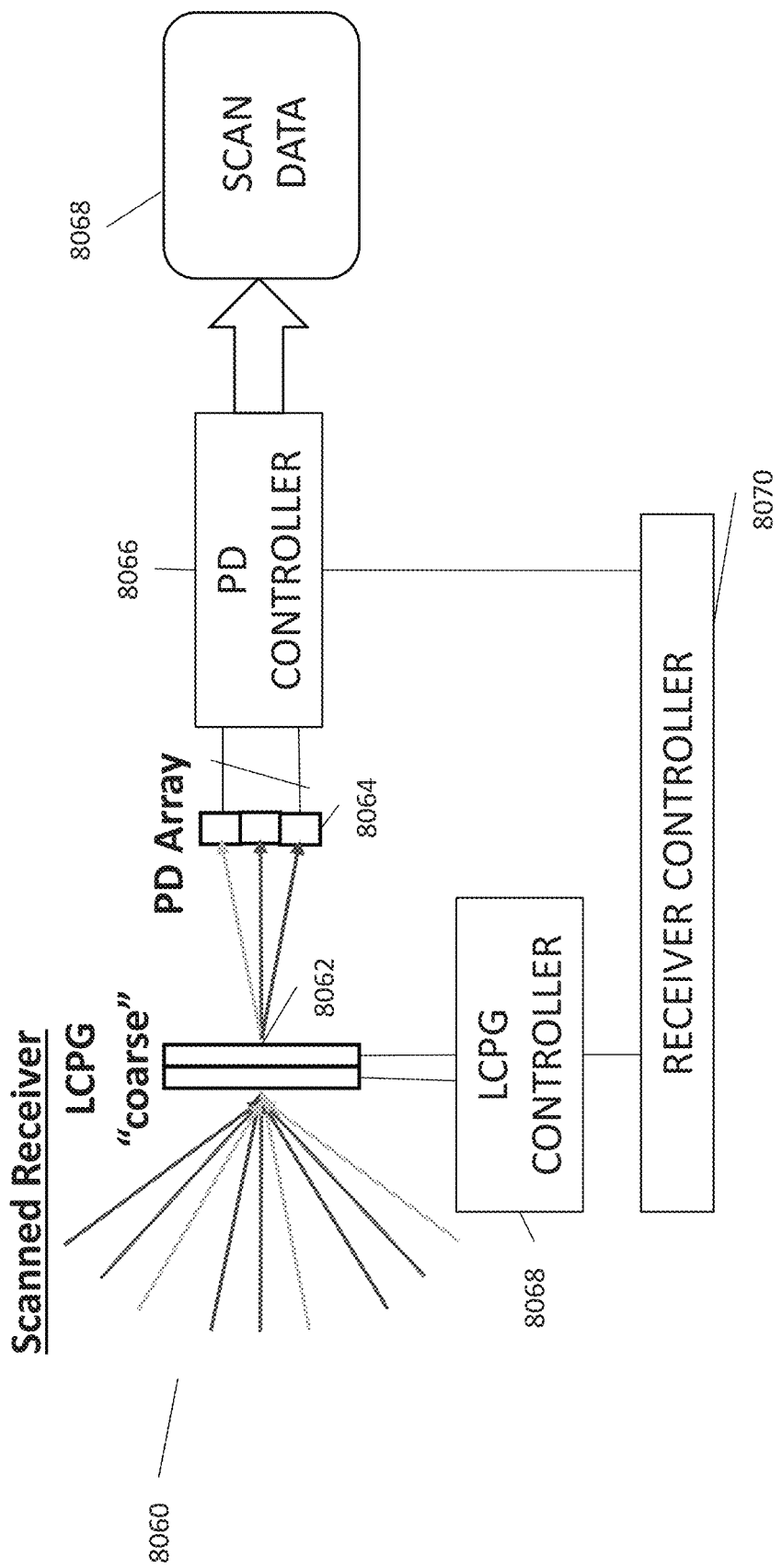
FIG. 52 is a system block diagram of a scanning receiver in accordance with a second example of the eighth aspect of the present disclosure.

Whereas FIG. 47 relates to a beam scanning transmitter that transmits sensing beams across a wide FOV, FIG. 52 shows a corresponding receiver, that receives reflected spot beams from the scan across the wide FOV. Here, a second LCPG 8062 is provided, that is controlled by a LCPG controller 8068, under the higher level control of an overall receiver controller 8070. The LCPG 8062 is controlled by the LCPG controller to scan across the field of view, and direct any reflected spot beams from the sensor transmitter onto a photo diode array 8064 for detection. The photodiode array 8064 feeds into a photodiode controller 8066, which collects the signals from across the photodiode array and compiles it into scan data 8072 to output to other system components for interpretation.

Figure 53:
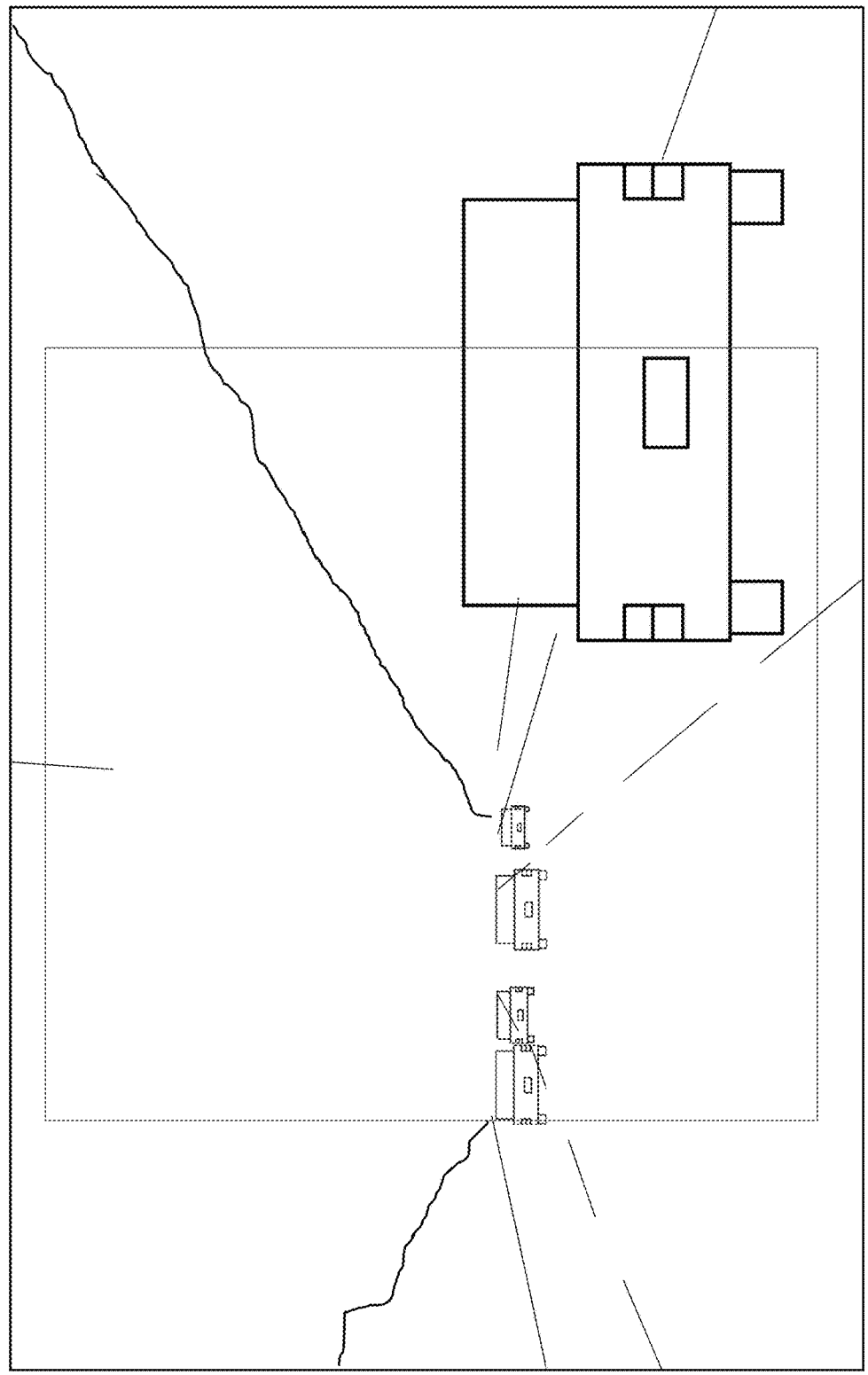
FIGS. 53 to 57 are photographs illustrating the field of view of the scanning receiver of the example of the eighth aspect of the present disclosure.
Figure 54:
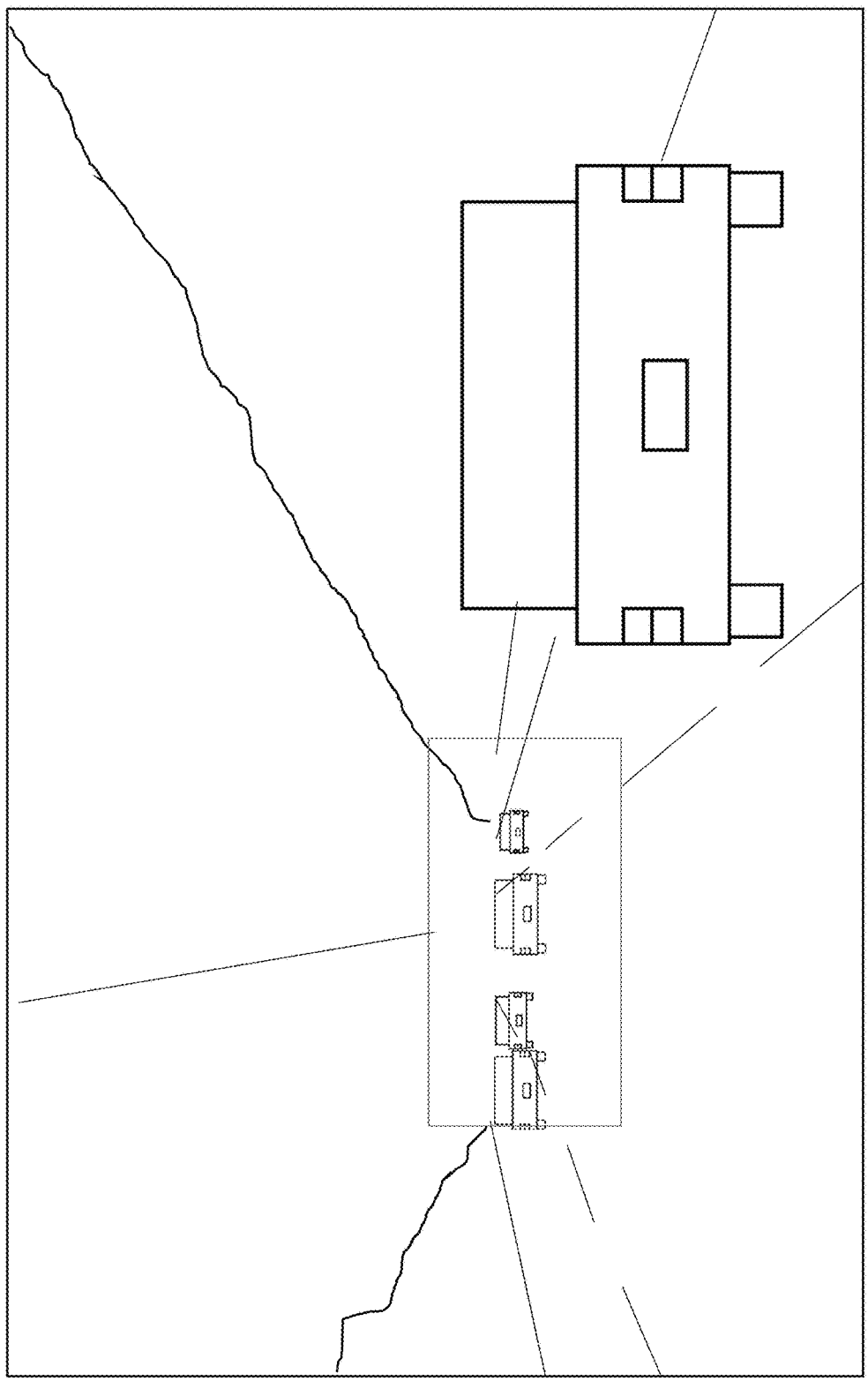
Figure 55:
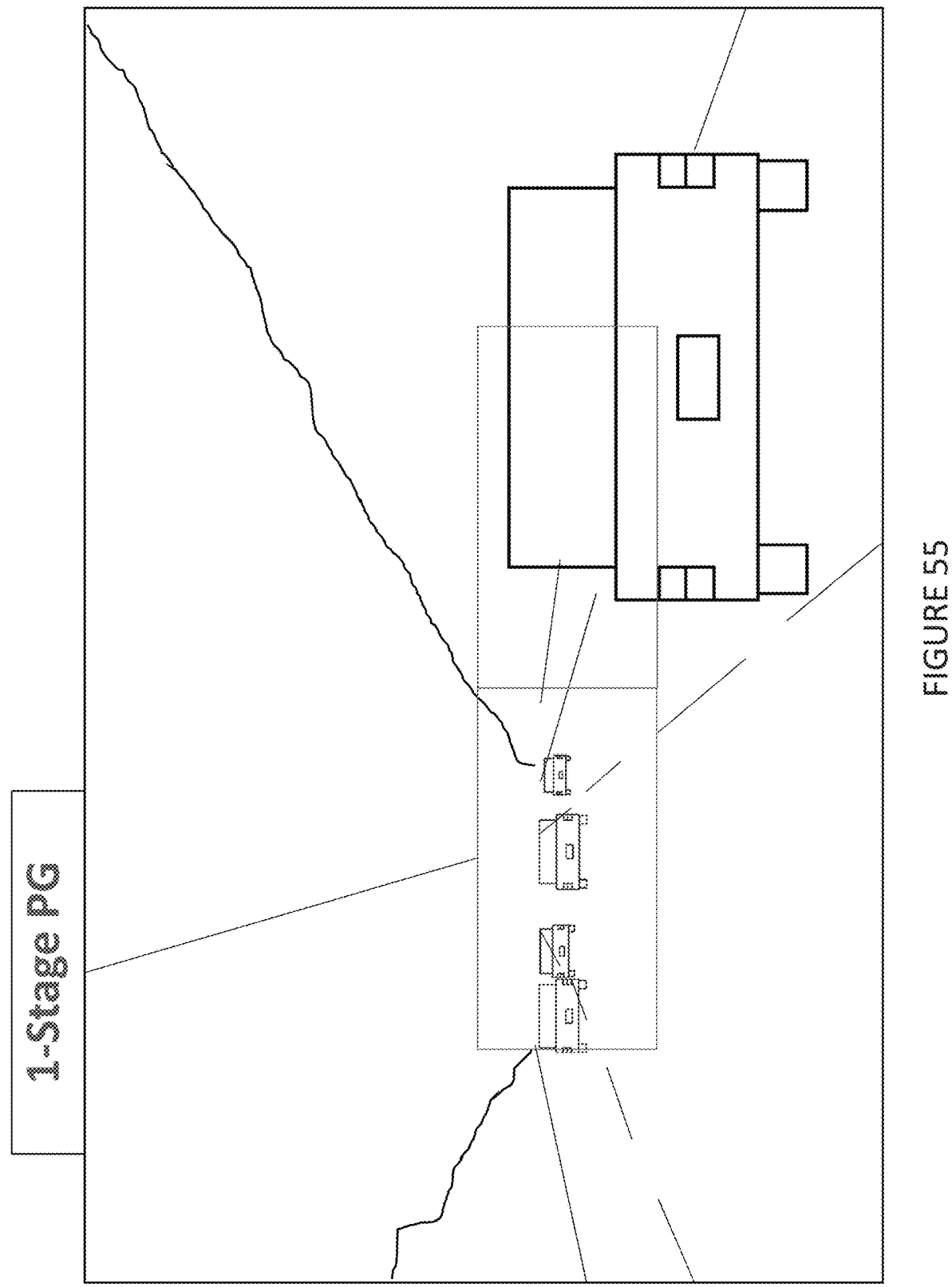
Figure 56:
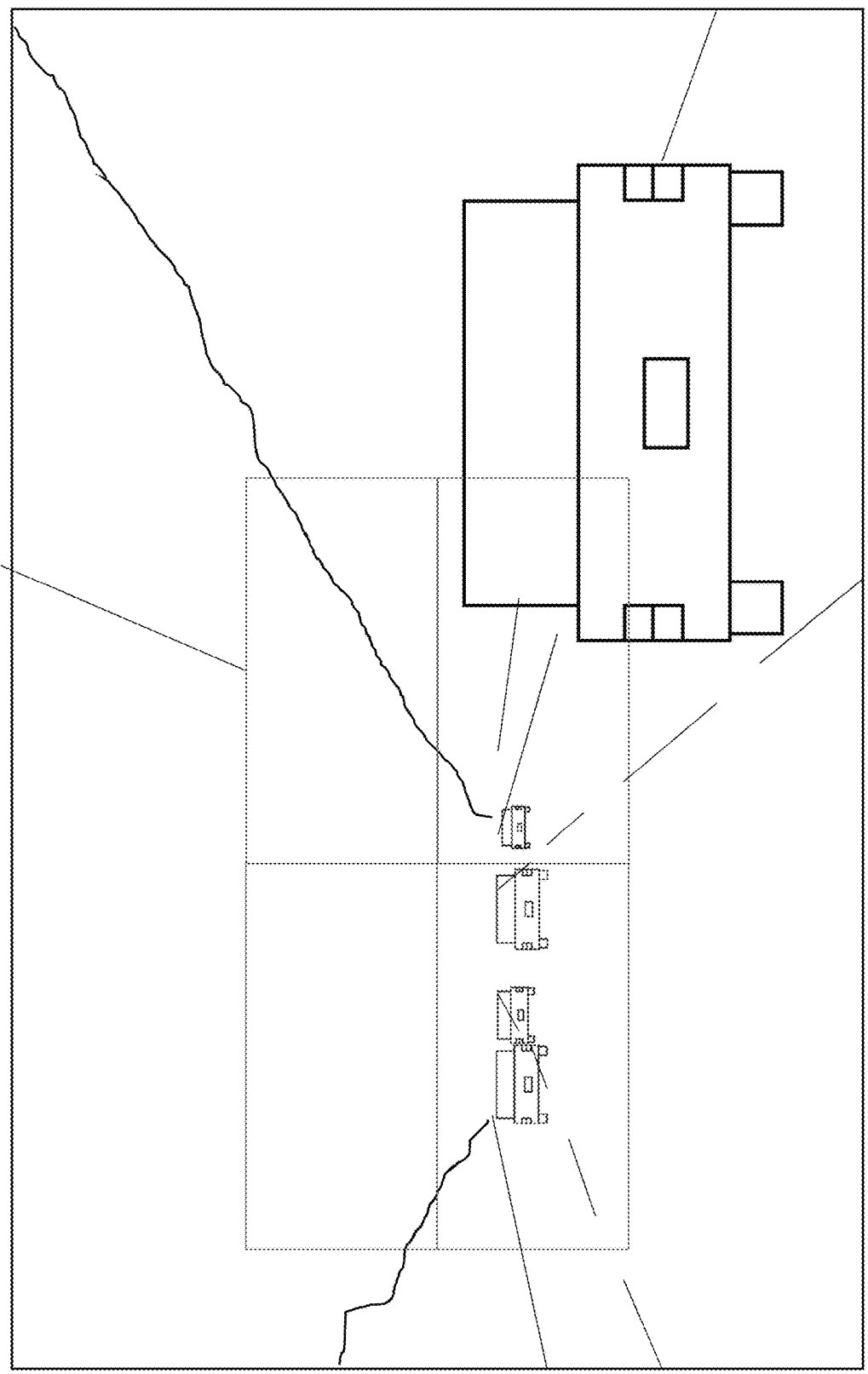
Figure 57:
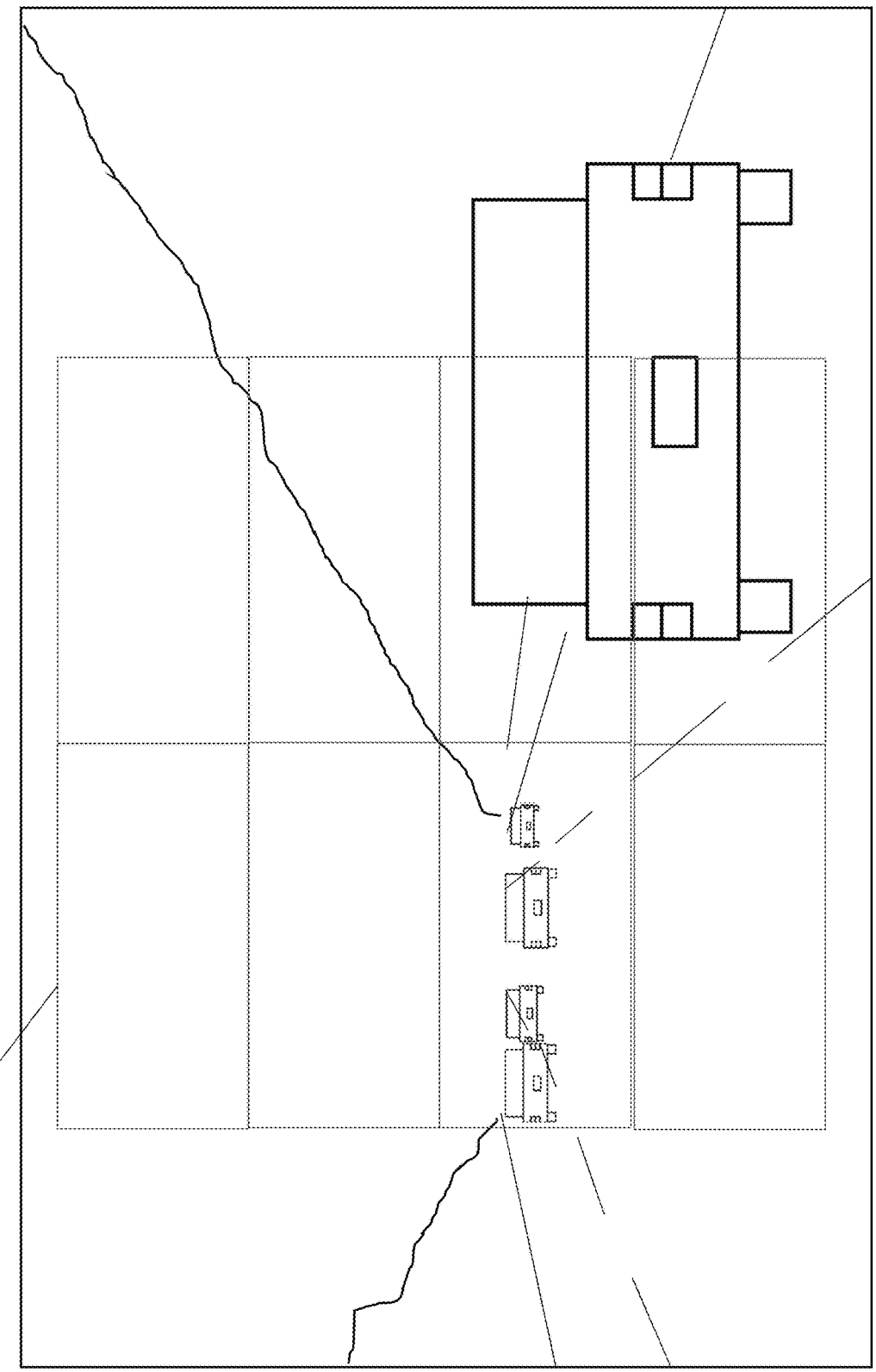

The photodiode array 8064 will have a certain size that provides, via other optics in the receiver, a native field of view. In this respect, as shown in FIGS. 53 and 54, a wide FOV requires a small lens area, which limits its light collecting ability and range of operation. A narrow FOV enables use of a large area lens and hence superior ranging. A wide FOV and large receive aperture can be simultaneously achieved using a large lens with a narrow field of view which can be steered by appropriate control of the LCPG. FIGS. 55, 56, and 57 show how the narrow field of view of the sensor can be steered to encompass additional sensing zones, with more sensing zones being possible with a greater number of individually controllable LCPGs in the LCPG stack. In this respect, the directional steerability of the sensor in terms of collecting reflected spot beams from a wide FOV both horizontally and vertically is the corollary of the ability of the LCPG in the scanner transmitter to direct beams across the FOV in the first place.

Figure 60:
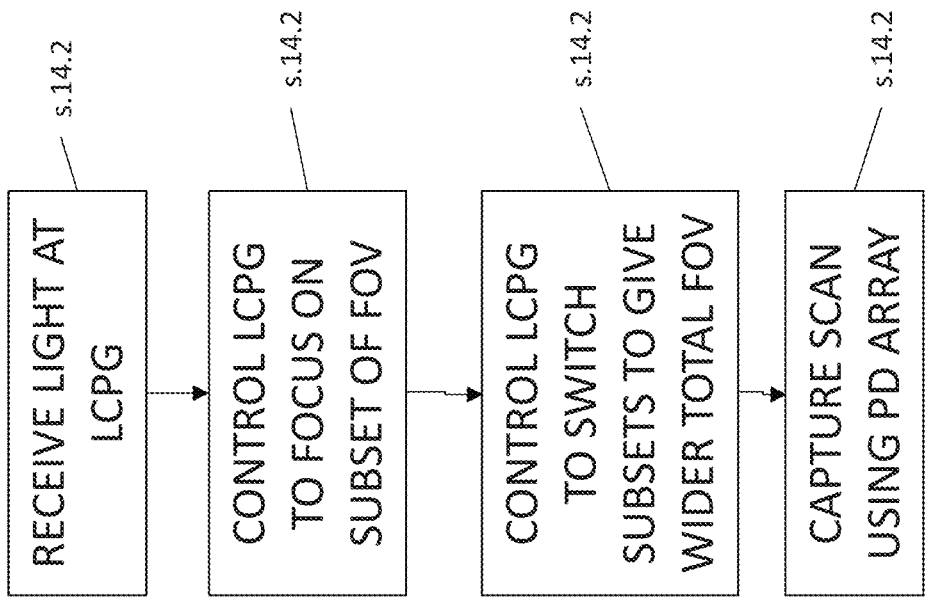
FIG. 60 is a flow diagram illustrating the operation of the scanning receiver of the second example of the eighth aspect of the present disclosure.

FIG. 60 shows the operation of the receiver 8060. At s.14.2 light is received at the LCPG, which is being controlled to receive from a particular angle to receive reflected light from a particular segment of the FOV across the wider FOV (s.14.4). The light is then directed by the LCPG onto the photodiode array for sampling (s.14.8). Once the light from a particular sector has been sampled, the LCPG is controlled to switch the subsector of the FOV that it is "pointing" at i.e. at which light therefrom will be directed by the LCPG onto the PD array 8064. By controlling the LCPG to repeatedly "aim" at each sector in turn, then an effective scan of the PD array via the LCPG is obtained across the whole extended FOV, on a sector by sector basis. As with the scanner transmitter, the LCPG may be controlled to raster scan from sensing zone to sensing zone, although other scan patterns may also be used.

It should also be noted that in some examples the receiver 8060 may be operated independently of the transmitter scanner 8010, for example with a different beam scanner transmitter, or in a different mode of operation such as a staring mode, that may be used to detect electromagnetic energy such as infra-red energy within the receiver's field of view. In such a mode the LCPG is controlled to direct incident EM energy within the (optical or near optical) wavelength band of interest from the FOV that the LCPG is presently directed at to the PD array for detection. As described, the FOV of the LCPG can be controlled such that different segments of the whole scene facing the sensor are imaged on the PD array sequentially, to allow a wide total FOV for the whole sensor. Such staring sensors, particularly using IR or UV (i.e. non-visible) wavelengths can have applications per se in security systems, as well as in guidance systems and various avionics systems.

Figure 58:
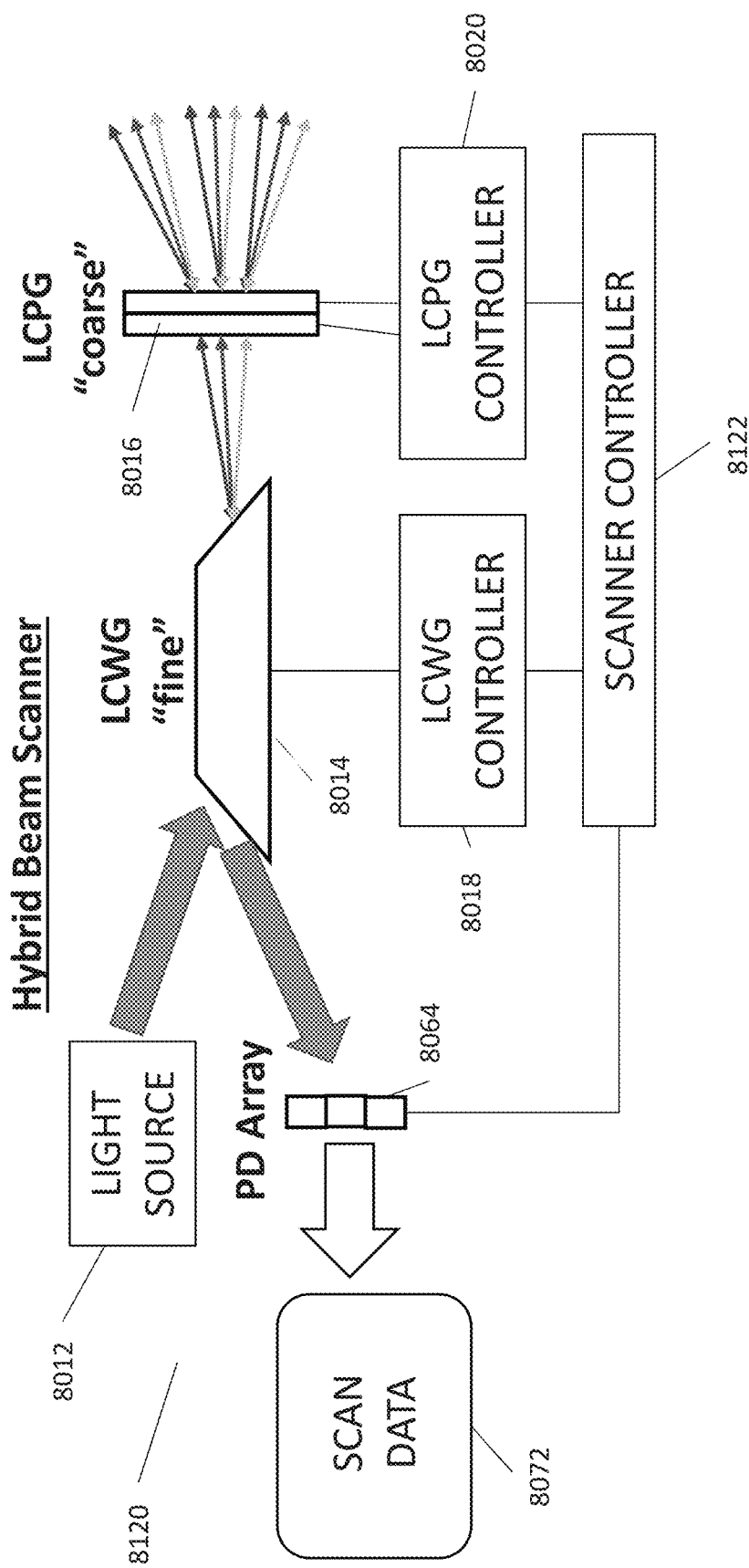
FIG. 58 is a system block diagram of a scanning transceiver in accordance with a third example of the eighth aspect of the present disclosure.

Thus far we have described an example which makes use of separate sensor transmitter and receiver modules, which have their own respective LCPG components. However, a monostatic example is also possible, where the same LCWG and LCPG components are used as both transmitter and receiver. FIG. 58 shows such an arrangement. Here LCWG 8014 is provided in series with LCPG 8016, with LCWG 8014 provided fine directional beam control, and LCPG 8016 providing coarse beam control, as previously. Respective LCPG controller 8020 and LCWG controller 8018 are provided, which in turn are controlled by overall scanner controller 8122. The LCWG 8014 receives light for onward transmission through the LCPG via a light source 8012, such as a laser diode, or LED. This light is then directed through the LCPG, with the LCWG and the LCPG being controlled as described previously to give a scanner beam spot pattern.

On the return path, reflected light from targets in the present subsector of the field of view that the LCPG is "pointing" at is received via a lens (not shown), and directed at the LCPG 8016, where it is then redirected back into the LCWG 8014. The LCWG further changes the angle of the incoming reflection beams slightly, and directs the reflected light back therethrough, where it is then input to the photodiode array 8064. Although not shown in FIG. 58, a component such as an optical circulator or the like may be used between the output of the light source 8012, the input of the LCWG 8014, and the input of the PD array 8064, to direct the transmitted and received light to the appropriate components.

At the photodiode array 8064 the incoming received light is converted into electrical scan data 8072, which is output for further processing by other system components. Such a monostatic arrangement therefore provides an integrated solution, with both sensor transmission and receiver components integrated together into the same package. In addition, use is made simultaneously of both the LCWG and the LCPG in both the transmit and receive paths.

Figure 61:
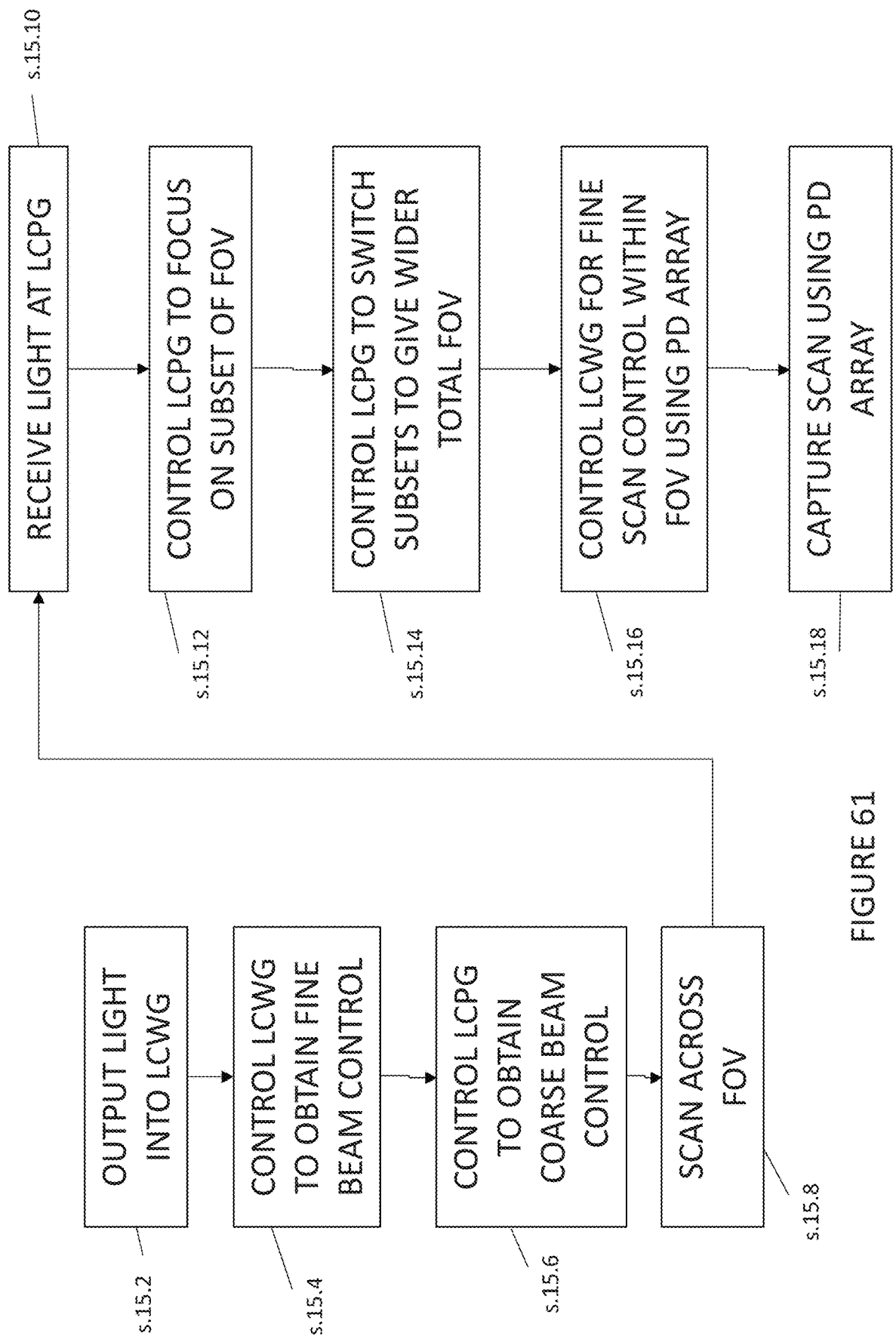
FIG. 61 is a flow diagram illustrating the operation of the scanning transceiver of the third example of the eighth aspect of the present disclosure.

FIG. 61 shows the method of operation of the monostatic arrangement. In this respect, the operation is the same as the previous examples described above with respect to FIGS. 59, and 60, but with the additional provision that during the receive signal path the LCWG may also be controlled to re-direct the received incoming reflection beams. Otherwise, the operation of the monostatic embodiment is the same as the operation of both the previous examples, but performed by the single sensor unit.

Figure 62:
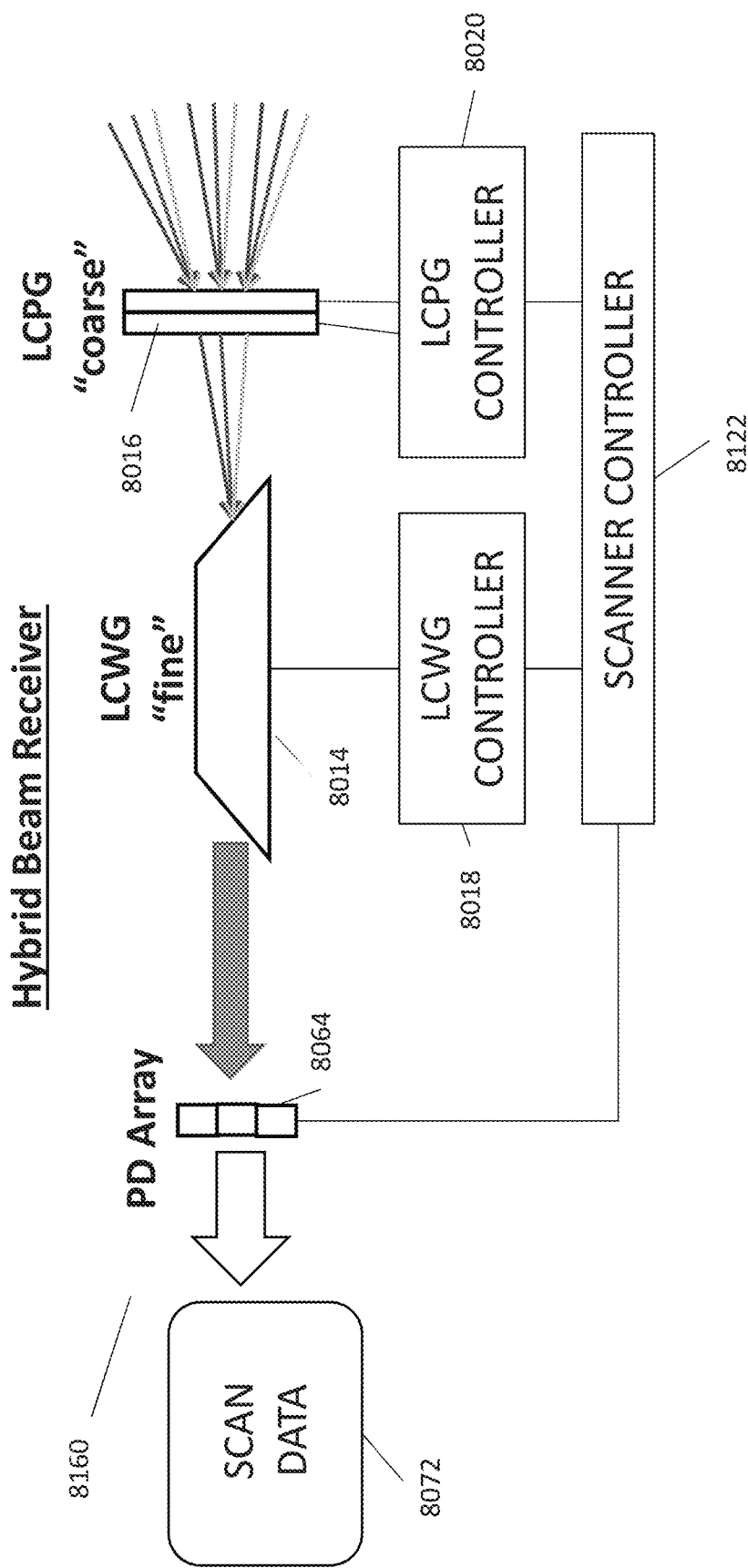
FIG. 62 is a system block diagram of a scanning receiver in accordance with a fourth example of the eighth aspect of the present disclosure.

FIG. 62 shows a further example, which is a hybrid beam scanning receiver 8160, having an LCPG 8016 in series with an LCWG 8014. The receiver 8016 is basically the receiver components of the monostatic arrangement described above, and works identically to receive incident light on the LCPG 8016, and direct it through the LCWG 8014 and onto the PD array 8064 for sampling, as described above with respect to s.15.10 to s.15.18 FIG. 61, and FIG. 58. Such an arrangement obtains the advantages described above of wide controllable FOV from the coarse and fine beam steering properties of the series LCPG and LCWG respectively, but in the form of a receiver, rather than a transmitter. Such a hybrid beam receiver 8160 may be used with other illumination components that illuminate the scene being scanned with electromagnetic illumination beams, or may be used as a passive detector, for example as a staring sensor, such as described above in respect of receiver 8060.

With respect to the electromagnetic wavelengths of operation of the beam scanner and receiver arrangements described above, anticipated wavelengths of operation extend from the infra-red (IR) band to the ultra-violet (UV) band, through the visible light spectrum. Depending on the application, non-visible wavelengths such as IR or UV can bring some advantages in that because they are not visible to humans they will not create visible distractions.

Various further examples of the eighth aspect of the disclosure will be apparent from the following features, defining further examples of the disclosure. Where a feature of a later example refers to one or more earlier examples, the examples may be considered in combination to provide further examples.

A first example comprises a scanning transmitter for transmitting an electromagnetic sensing beam for use in sensing remote objects. The scanning transmitter comprises: one or more liquid crystal waveguides (LCWG); and one or more liquid crystal polarization gratings (LCPG). The one or more LCWG and the one or more LCPG may be arranged in series such that the beam passes through them in turn. The transmitter may further comprise an LCWG controller and an LCPG controller arranged to control the LCWG and the LCPG to apply respective controllable deflections to the beam such that beam is capable of being directed to different spot parts of a field of view (FOV) of the transmitter.

The LCWG of the scanning transmitter according to the previous example may apply a fine controllable deflection to the beam, and the LCPG may apply a coarse controllable deflection to the beam, relative to each other.

The LCWG of the scanning transmitter of the first example may be arranged in the beam path prior to the LCPG.

The LCPG of the scanning transmitter according to the first example may comprise multiple gratings arranged in a stack to permit for greater angular deflection of the beam than available from a single grating.

There may be 2, 3, or 4 LCPGs arranged in the stack of the scanning transmitter of the previous example.

The scanning transmitter according to the first example may further comprise at least one electromagnetic energy source generating a beam for transmission, the source inputting the beam for transmission into the LCWG and then into the LCPG.

The LCWG and LCPG of the first example may be controlled to scan the beam to different spot parts of the field of view in turn, across the extent of the field of view.

The beam of the scanning transmitter of the previous example may be scanned across the field of view in accordance with a predetermined scan pattern, such as, for example, a raster scan.

The electromagnetic sensing beam of the scanning transmitter of the previous example is any of an infra-red, visible light, or ultra-violet beam.

A tenth example comprises a scanning receiver for receiving electromagnetic beams generated by or reflected from remote objects. The scanning receiver comprises: one or more liquid crystal polarization gratings (LCPG); and a sensor array, responsive to the electromagnetic beams directed by the one or more LCPG so as to be incident thereon to generate a scan signal representative of the incident beams. The arrangement being such that the one or more LCPG are controlled so as to direct electromagnetic beams from across a wider field of view than the native field of view of the LCPG onto the sensor array.

The LCPG of the previous example may comprise multiple gratings arranged in a stack to permit for greater angular deflection of the received beams than available from a single grating, and thus provide an even wider field of view.

There may be 2, 3, or 4 LCPGs arranged in the stack of the scanning receiver of the previous example.

The electromagnetic beams of the scanning receiver of the tenth example may be any of an infra-red, visible light, or ultra-violet beam.

The LCPG of the tenth example may be further controlled so as to redirect the native field of view of the LCPG in one or more other directions to one or more extents, to thereby give the wider field of view.

The scanning receiver of the tenth example may further comprise a liquid crystal waveguide (LCWG) arranged within the beam path between the LCPG and the sensor array. Both the LCWG and the LCPG may be controlled together so as to direct electromagnetic beams from across a wider field of view than the native field of view of the LCPG onto the sensor array.

A sixteenth example comprises a scanning transceiver for transmitting an electromagnetic sensing beam for use in sensing remote objects and detecting reflections of the beam from remote objects. The scanning transceiver comprises: one or more liquid crystal waveguides (LCWG); and one or more liquid crystal polarization gratings (LCPG). The one or more LCWG and the one or more LCPG may be arranged in series such that the sensing beam passes through them in turn when being transmitted, and reflections of the sensing beam pass through them in an opposite direction. The transceiver may further comprise a sensor array, responsive to the beam reflections, to generate a scan signal representative of the remote object from which the sensing beam is reflected.

The scanning transceiver of the previous example may further comprise an LCWG controller and an LCPG controller arranged to control the LCWG and the LCPG to apply respective controllable deflections to the sensing beam. This results in the beam being capable of being directed to different spot parts of a field of view (FOV) of the transceiver.

The LCWG of the scanning transceiver of the sixteenth example may apply a fine controllable deflection to the beam, and the LCPG of the scanning transceiver of the sixteenth example may apply a coarse controllable deflection to the beam, relative to each other.

In the scanning transceiver according to the sixteenth example, the LCWG may be arranged in the beam path prior to the LCPG for transmission of the sensing beam.

Finally, in the scanning transceiver according to the sixteenth example the LCWG and LCPG may be controlled to scan the beam to different spot parts of the field of view in turn, across the extent of the field of view.

The invention claimed is:

1. An imaging device comprising an image sensor, the imaging device comprising:
   one or more liquid crystal polarization gratings (LCPGs), wherein the one or more LCPGs are controllable to apply a deflection to an electromagnetic beam such that the electromagnetic beam is directed from a different field of view (FOV) other than a non-deflected FOV onto the image sensor;
   an image sensor comprising a plurality of pixels, responsive to electromagnetic beams directed by the one or more LCPGs so as to be incident thereon to generate a signal representative of the incident electromagnetic beams; and
   an imaging controller for controlling the one or more LCPGs so as to direct electromagnetic beams from a first and a second FOV onto each of the plurality of pixels to create a first and a second intermediate image, respectively, so as to create a combined higher resolution image output of the image sensor.

2. An imaging device according to claim 1, wherein the one or more LCPGs are controlled to cause deflection of the electromagnetic beam onto the image sensor by less than a pitch of the pixels of the image sensor.

3. An imaging device according to claim 1, wherein the one or more LCPGs are controlled to cause deflection of the electromagnetic beam onto the image sensor by a non-integer multiple of a pitch of the pixels of the image sensor.

4. An imaging device according to claim 1, wherein the imaging device further comprises an illumination source for emitting an electromagnetic beam, wherein the one or more LCPGs are arranged at the illumination source such that electromagnetic beam is capable of being directed to different parts of a scene.

5. An imaging device according to claim 4, wherein the illumination source is configured to emit structured light.

6. An imaging device according to claim 1, wherein the one or more LCPGs comprises a plurality of LCPGs arranged in a stack.

7. An imaging device according to claim 6, wherein the plurality of LCPGs comprises at least one LCPG arranged orthogonally to another LCPG to permit for two-dimensional deflection of the electromagnetic beam.

8. An imaging device according to claim 6, wherein the plurality of LCPGs comprises at least two LCPGS arranged in the same orientation to permit for greater angular deflection of the beam than available from a single grating.

9. An imaging device comprising an image sensor comprising a plurality of pixels and having a native field of view (FOV) and a native resolution, the imaging device comprising:
   an image controller;
   imaging optics including one or more controllable liquid crystal polarization gratings (LCPGs), wherein the one or more LCPGs are controllable by the image controller to steer light onto the image sensor from across a wider FOV than the native FOV to obtain images from across the wider FOV; and a determination unit for determining a region-of-interest (ROI) within the wider FOV and corresponding to a subset of the wider FOV such that the ROI can be imaged with a higher resolution than the native resolution of the image sensor.

10. An imaging device according to claim 9, wherein the image controller controls the one or more LCPGs to image the ROI with a higher resolution than the native resolution of the image sensor.

11. An imaging device according to claim 10, wherein the image sensor is responsive to electromagnetic beams directed by the one or more LCPGs so as to be incident thereon to generate a signal representative of the incident electromagnetic beams, and creates a first and a second intermediate image by reading signals representative of a first and second incident electromagnetic beam, respectively, from a first and second FOV each having the ROI and each being a subset of the wider FOV, wherein the second incident electromagnetic beam is deflected relative to a first incident electromagnetic beam, respectively, so as to create a combined higher resolution image output of the image sensor.

12. An imaging device according to claim 9, wherein the image controller controls the amount of steering provided by the one or more LCPGs for obtaining images across a wider FOV than the native FOV to be greater than the amount of steering provided by the LCPGs for imaging the ROI with a higher resolution than the native resolution of the image sensor.

13. An imaging device according to claim 12, wherein the one or more LCPGs are controlled to cause deflection of an electromagnetic beam onto the image sensor by either: less than a pitch of the pixels of the image sensor or a non-integer multiple of a pitch of the pixels of the image sensor.

14. An imaging device according to claim 9, wherein the imaging device further comprises an illumination source for emitting an electromagnetic beam, wherein the one or more LCPGs are arranged at the illumination source such that electromagnetic beam is capable of being directed to different parts of a scene.

15. An imaging device according to claim 14, wherein the one or more LCPGs are controlled to cause deflection of the electromagnetic beam onto a part of the scene such that the electromagnetic beam that is received by the image sensor shifts by either: a distance of less than a pitch of the pixels of the image sensor in order to capture the first or second FOV or a distance of a non-integer multiple of a pitch of the pixels of the image sensor in order to create the higher resolution image.

16. A method of surveillance across a field of view (FOV) wider than a native FOV of an image sensor, the image sensor comprising a plurality of pixels, the method comprising:

providing an image sensor having a native FOV and native resolution, and imaging optics to allow an image to be obtained by the image sensor, the imaging optics including one or more controllable liquid crystal polarization gratings (LCPGs);

controlling the one or more LCPGs to steer light onto to the image sensor from across a wider FOV than the native FOV to obtain images from across the wider FOV;

determining a region-of-interest (ROI) within the wider FOV and corresponding to a subset of the wider FOV; and imaging the ROI with a higher resolution than the native resolution of the image sensor.

17. A method according to claim 16, wherein imaging the ROI with a higher resolution than the native resolution of the image sensor comprises imaging using the one or more LCPGs.

18. A method according to claim 17, wherein imaging the ROI with a higher resolution than the native resolution of the image sensor comprises:

receiving a first incident electromagnetic beam generated by or reflected from remote objects at each of the plurality of pixels via one or more LCPGs;

for a first FOV having the ROI that is a subset of the wider FOV, obtaining a first intermediate image by reading a signal representative of the first incident electromagnetic beam at each of the plurality of pixels;

receiving a second incident electromagnetic beam generated by or reflected from the remote objects at each of the plurality of pixels via the one or more LCPGs that is deflected relative to the first incident electromagnetic beam;

for a second FOV having the ROI that is a subset of the wider FOV, obtaining a second intermediate image by reading a signal representative of the second incident electromagnetic beam at each of the plurality of pixels; and multiplexing the first and the second intermediate images together to create a combined higher resolution image output of the image sensor.

19. A method according to claim 18, further comprising controlling an amount of steering provided by the one or more LCPGs for obtaining images across a wider FOV than the native FOV be greater than the amount of steering provided by the LCPGs for imaging the ROI with a higher resolution than the native resolution of the image sensor.

20. A method according to claim 19, wherein controlling the one or more LCPGs causes deflection of the electromagnetic beam onto the image sensor by less than a pitch of the pixels of the image sensor.

* * * * *

UNITED STATES PATENT AND TRADEMARK OFFICE
CERTIFICATE OF CORRECTION

PATENT NO. : 11,467,327 B2
APPLICATION NO. : 16/792757
DATED : October 11, 2022
INVENTOR(S) : English et al.

Page 1 of 1

It is certified that error appears in the above-identified patent and that said Letters Patent is hereby corrected as shown below:

In the Claims

In Column 64, Line 48, in Claim 19, after "FOV", insert --to--

Signed and Sealed this
Twenty-fifth Day of July, 2023

Katherine Kelly Vidal
*Director of the United States Patent and Trademark Office*